United States Patent
Miyamoto et al.

(10) Patent No.: US 6,332,060 B1
(45) Date of Patent: Dec. 18, 2001

(54) CAMERA WITH VIBRATION COMPENSATION DEVICE VARYING THE COMPENSATING ACTION IN ACCORDANCE WITH THE FOCAL LENGTH OF A LENS AND THE DISTANCE TO THE SUBJECT

(75) Inventors: Hidenori Miyamoto, Urayasu; Yoshio Imura; Minoru Kato, both of Kawasaki; Sueyuki Ohishi, Tokyo; Nobuhiko Terui, Ichikawa; Tatsuo Amanuma, Ageo, all of (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/298,985

(22) Filed: Apr. 26, 1999

Related U.S. Application Data

(63) Continuation of application No. 08/815,681, filed on Mar. 12, 1997, now abandoned, which is a continuation of application No. 08/377,744, filed on Jan. 25, 1995, now abandoned.

(30) Foreign Application Priority Data

Feb. 4, 1994 (JP) .................................................. 6-012824
Apr. 27, 1994 (JP) .................................................. 6-090314

(51) Int. Cl.[7] .............................................. G03B 17/00
(52) U.S. Cl. .................................................. 396/55
(58) Field of Search ................... 396/52, 53, 55; 348/208; 359/813, 814

(56) References Cited

U.S. PATENT DOCUMENTS

| 4,974,006 | * | 11/1990 | Shinozaki et al. | 396/132 |
| 5,192,964 | * | 3/1993 | Shinohara et al. | 396/55 |
| 5,245,378 | * | 9/1993 | Washisu | 396/55 |
| 5,309,190 | * | 5/1994 | Shinohara et al. | 396/55 |
| 5,477,297 | * | 12/1995 | Suzuki | 396/55 |

* cited by examiner

Primary Examiner—Alan A. Mathews

(57) ABSTRACT

A camera is provided which has a vibration detection unit that detects vibration, a photographic focal length detection unit which detects the focal length of the photographic optical system, and a distance-measurement unit that measures the distance to the object being photographed. The vibration compensation device employs drive motors as a vibration compensation unit. The drive motors have a start up time which is at least as fast as the acceleration of a vibration having roughly a sine wave shape with a frequency of 10 Hz and a maximum velocity of 7.5 mm/sec. Such a motor is able to reach the maximum velocity of the vibration in under 25 ms. Additionally, a correct compensating coefficient calculation unit is provided which, from the output of the photographic focal length detection unit and the output of the distance-measurement unit, calculates a correct compensation coefficient for determining how much to change the optical axis of the photographic optical system relative to the output of the vibration detection unit. The vibration compensation device compensates for vibrations by driving the motor to change the optical axis of the photographic optical system of the camera in response to the compensation coefficient and the output of the vibration detection unit.

45 Claims, 22 Drawing Sheets

CAMERA WITH VIBRATION COMPENSATION DEVICE VARYING THE COMPENSATING ACTION IN ACCORDANCE WITH THE FOCAL LENGTH OF A LENS AND THE DISTANCE TO THE SUBJECT

This application is a continuation of application Ser. No. 08/815,681, filed Mar. 12, 1997, now abandoned, which was a continuation of application Ser. No. 08/377,744, filed Jan. 25, 1995, now abandoned.

BACKGROUND OF THE INVENTION

1. Field of the Invention

The present invention relates to a camera that is equipped with a vibration compensation device, and in particular, relates to a drive unit for a vibration compensation device in which the amount that a vibration compensation lens is driven is adjusted in accordance with a focal length of a lens and a distance to a subject.

2. Description of the Related Art

A vibration compensation device which compensates for image blur caused by roughly sine-wave shaped vibrations in a camera during photography is disclosed in Japanese Patent Publication HEI 5-40291/1993. A camera is disclosed that is equipped with a conventional vibration compensation device wherein the angular velocity and predicted angular velocity of the vibrations are derived by linear approximation from vibration variation-quantity data output by a vibration detection unit. However, there is no mention of specific vibration periods or of angular velocities or other numerical values.

A conventional vibration compensation device compensates for vibrations in a vibration compensation operation in which an optical axis of a photographic optical system is shifted to suppress the detected vibrations. For example, a vibration compensation lens, which is part of the photographic optical system, is shifted to change the optical axis. If a motor is used as the actuator to drive the compensating lens, the speed of the motor is reduced by gears, etc., and the rotation of the gears are converted to linear movement to drive the vibration compensation lens.

The vibration compensation operation is performed approximately 20 times during one vibration period. Angular velocities and predicted angular velocities of the vibrations are derived by linear approximation from vibration variation-quantity data detected by a pair of vibration detection units. The vibration compensation device compensates for the detected vibrations based on the detected vibration variation-quantities.

Typically, the period of a vibration in the camera, resulting from external forces such as hands, is on the order of 0.1 seconds. Conventional vibration compensation devices can perform 20 vibration compensation operations, approximately one every 5 msec in the vibration period. In order to perform this vibration compensation control, an actuator is needed which has a start up time that is within 5 msec. Practically speaking, small motors having such characteristics do not exist, making it impossible to drive a conventional vibration compensation device using a small motor.

Moreover, using a small motor, in cases where, for example, the movement time constant of the compensating optical system in the vibration compensation device is half the vibration period, the velocity of the compensating lens will not catch up with the angular velocity of the movement of the image, and the vibrational angular velocity decreases before the vibration compensation lens has reached maximum velocity. This may cause the vibration compensation lens to reverse direction, thereby further increasing the blur in the image.

Known vibration compensation devices start operation by reading the position of the vibration compensation lens with a vibration detection unit, such as an interrupter, and thereafter perform a centering action by moving the vibration compensation lens to roughly a center position in a shift range. Next vibration compensation control is started and the vibration compensation lens is driven so as to cancel out the vibrations in response to the output of the vibration detection unit. The vibration compensation control is performed from immediately prior to an exposure process, in which the shutter opens and exposes the film, to just after the exposure process is terminated. The vibration compensation lens is then driven to a prescribed reset position.

However, a problem exists in that a coefficient, which determines how much to change the optical axis relative to the output value from the vibration detection circuit, (termed a "correct compensation coefficient") is a constant value. As long as a subject which is being photographed is at a constant distance, the use of a correct compensation coefficient with a constant value is adequate. When, as is the case normally, the distance to the subject is not a constant value, accurate vibration compensation cannot be performed when the correct compensation coefficient is a constant. In a photographic optical system which uses multiple focal points, or a zoom lens, the correct compensation coefficient must vary with changes in the photographic focal length as well as with changes in the distance to the subject. Also, in the output of the vibration detection unit there are various gain variations, so that the output from the vibration detection unit is not constant but rather various, relative to a specified vibration. The value of the correct compensation coefficient should also be influenced by a gain variation pattern of the vibration detection circuit.

Conventionally, when the correct compensation coefficient is determined, an optical-system compensation quantity for the vibration compensation device is calculated from the correct compensation coefficient and the output of the vibration detection unit. Thereafter, the motor, or other actuator, is driven by a drive quantity that is proportional to the compensation quantity, and the optical axis is changed to compensate for vibrations. However, as set forth above, the vibration compensation device, or, alternatively, the motor or other actuator, has a response delay, or, to be more precise, a wait period from driving the actuator until the vibration compensation device obtains a targeted compensation position or speed. Alternatively, there is a wait time from the detection of the output from the vibration detection circuit until the motor or other actuator is driven. Also, there are fluctuations in a power supply (typically, batteries) that drives the vibration compensation device, characteristic variations in the vibration compensation device, and, differences in the ease with which each mechanism moves relative to a specified driving direction and speed. Such variations and fluctuations can be caused by changes over time or even temperature. Because of these problems, vibration compensation control errors can become large, and precise vibration compensation cannot be effected.

Further, conventionally, in a centering or reset action, a response delay is experienced by the vibration compensation system. Specifically, a wait is experienced from when the actuator driven until a targeted position is obtained. As above, there are fluctuations in the power supply and characteristic variation in operation due to, for example, changes over time or the temperature. As a result, precise vibration compensation control cannot be effected, and in some cases, unpleasant noises are produced due to the operating noise of the motor or actuator operating at uneven speeds. This makes it impossible to move the vibration compensation lens to the center or reset position.

The characteristics of the vibration compensation device markedly deteriorate over time, and can even result in the vibration compensation device becoming completely inoperable. In such cases, precise vibration compensation control cannot be effected, and blurring of the image can be increased. In severe cases, a position detection unit, for detecting the position of the vibration compensation lens, breaks, and the position of the vibration compensation lens can no longer be detected. In this case the vibration compensation lens can be driven beyond the shift region and the vibration compensation device can be damaged.

SUMMARY OF THE INVENTION

Accordingly, it is an object of the present invention to provide a vibration compensation device which accurately compensates for blur in an image.

It is another object of the invention to provide a camera wherein the speed of the vibration compensation lens exceeds the maximum speed of vibrations.

It is a further object of the present invention to provide a camera that is equipped with a vibration compensation device capable of adequately compensating for vibrations, irrespective of the proficiency of the photographer.

It is yet a further object of the invention to provide a vibration compensation device which facilitates precise vibration compensation, and prevents damage to the vibration compensating optical system.

It is yet a further object of the invention to provide a vibration compensation device which decreases vibration compensation control errors resulting from response delays in a motor or an actuator, the computation time, power supply fluctuation, or mechanical characteristics.

Additional objects and advantages of the invention will be set forth in part in the description which follows, and, in part, will be obvious from the description, or may be learned by practice of the invention.

Objects of the present invention are also achieved in a camera comprising an optical system having an optical axis, a drive unit which drives the optical system in a direction perpendicular to the optical axis, the drive unit having a start up time faster than the acceleration of the vibrations in the camera.

Objects of the present invention are also achieved in a camera comprising a photographic optical system having an optical axis, a vibration detection unit that outputs a signal indicative of vibrations in the camera, a photographic focal length detection unit that outputs a signal indicative of a focal length of the photographic optical system, a distance-measurement unit that outputs a signal indicative of the distance to an object being photographed, a vibration compensation unit to shift the optical axis of the photographic optical system to compensate for the vibrations detected by the vibration detection unit, and a correct compensating coefficient calculation unit that calculates a correct compensation coefficient based on the output of the photographic focal length detection unit and the output of the distance-measurement unit, the correct compensation coefficient determining an amount the vibration compensation unit changes the optical axis of the photographic optical system relative to the output of the vibration detection unit.

Objects of the present invention are also achieved in a camera comprising a photographic optical system having an optical axis, a vibration detection unit that outputs a signal indicative of vibrations in the camera, a photographic focal length detection unit that outputs a signal indicative of a focal length of the photographic optical system, a distance-measurement unit that outputs a signal indicative of the distance to an object being photographed, a vibration compensation unit to shift the optical axis of the photographic optical system to compensate for the vibrations detected by the vibration detection unit, a non-volatile rewritable memory which stores a gain-adjustment value which compensates for variation in the individual outputs from the vibration detection unit, and a correct compensating coefficient calculation unit that calculates a correct compensation coefficient based on the output of the photographic focal length detection unit, the output of the distance-measurement unit, and the gain-adjustment value stored in the non-volatile rewritable memory, the correct compensation coefficient determining an amount the vibration compensation unit changes the optical axis of the photographic optical system relative to the output of the hand-shakiness detection unit.

Objects of the present invention are also achieved in a camera comprising a photographic lens, an optical-axis variation unit for changing the optical axis of the photographic lens, an actuator which drives the optical-axis variation unit, a displacement detection unit which outputs a signal indicative of displacements in the optical-axis variation unit, an angular-velocity detection unit which outputs a signal indicative of the angular velocities of vibrations in the camera, a displacement velocity calculation unit which calculates the displacement velocity from the output of the displacement detection unit, a target displacement velocity calculation unit which calculates the target displacement velocity of the optical-axis variation unit in response to the output of the angular velocity detection unit, a velocity error calculation unit which calculates velocity errors from differences between the displacement velocity and the target displacement velocity, a basic drive quantity calculation unit that calculates the basic drive quantity by applying a certain coefficient to the target displacement velocity, a compensation drive quantity calculation unit which calculates the compensation drive quantity, having applied a certain coefficient to the velocity error, a drive unit that drives the actuator in accordance with the basic drive quantity and compensation drive quantity.

Objects of the present invention are also achieved in a camera comprising a photographic lens having an optical axis, an optical-axis variation unit for changing the optical axis of the photographic lens, an actuator which drives the optical-axis variation unit, a displacement detection unit which outputs a signal indicative of displacements in the optical-axis variation unit, an angular-velocity detection unit which outputs a signal indicative of angular velocities caused by vibrations a displacement velocity calculation unit which calculates the displacement velocity from the output of the displacement detection unit, a target displacement velocity calculation unit which calculates the target displacement velocity of the optical-axis variation unit in response to the output of the angular velocity detection unit, a velocity error calculation unit which calculates velocity errors from differences between the displacement velocity and the target displacement velocity, a velocity error integration unit which, when the absolute value of the velocity error is equal to or greater than the prescribed value, integrates the velocity error, and when the absolute value of the velocity error is less than the prescribed value, clears the integrated value, a basic drive quantity calculation unit that calculates a basic drive quantity by applying a certain coefficient to the target displacement velocity, a compensation drive quantity calculation unit which calculates a compensation drive quantity, having applied a certain coefficient to the output value of the velocity error integration unit, and a drive unit that drives the actuator in accordance with the basic drive quantity and compensation drive quantity.

Objects of the present invention are also achieved in a camera comprising a photographic lens having an optical axis, an optical-axis variation unit for changing the optical axis of the photographic lens, an actuator which drives the optical-axis variation unit, a displacement detection unit which outputs a signal indicative of displacements in the optical-axis variation unit, an angular-velocity detection unit which outputs a signal indicative of angular velocities caused by vibrations, a displacement velocity calculation unit which calculates a displacement velocity from the output of the displacement detection unit, a target displacement velocity calculation unit which calculates a target displacement velocity of the optical-axis variation unit in response to the output of the angular velocity detection unit, a target velocity differentiation unit which calculates differentials of the target displacement velocity, a basic drive quantity calculation unit that calculates a basic drive quantity by applying a certain coefficient to the target displacement velocity, a compensation drive quantity calculation unit which calculates the compensation drive quantity using a certain coefficient and the output value of the target velocity differentiation unit, a drive unit that drives the actuator in accordance with the basic drive quantity and compensation drive quantity.

Objects of the present invention are also achieved in a camera comprising a photographic lens having an optical axis, an optical-axis variation unit for changing the optical axis of the photographic lens, an actuator which drives the optical-axis variation unit, a displacement detection unit which outputs a signal indicative of displacements in the optical-axis variation unit, an angular-velocity detection unit which outputs a signal indicative of angular velocities caused by vibrations, a displacement velocity calculation unit which calculates a displacement velocity from the output of the displacement detection unit, a target displacement velocity calculation unit which calculates a target displacement velocity of the optical-axis variation unit in response to the output of the angular velocity detection unit, a velocity error calculation unit which calculates velocity errors from differences between the displacement velocity and the target displacement velocity, a velocity error integration unit which integrates the velocity error and calculates a velocity error summation value, a basic drive quantity calculation unit that calculates a basic drive quantity using a certain coefficient and the target displacement velocity a compensation drive quantity calculation unit which calculates the compensation drive quantity using a certain coefficient and the output value of the velocity error integration unit, and a drive unit that drives the actuator in accordance with the basic drive quantity and compensation drive quantity.

Objects of the present invention are also achieved in a camera comprising a photographic lens having an optical axis, an optical-axis variation unit for changing the optical axis of the photographic lens, an actuator which drives the optical-axis variation unit a displacement detection unit which outputs a signal indicative of displacements in the optical-axis variation unit, an angular-velocity detection unit which outputs a signal indicative of angular velocities caused by vibrations, a displacement velocity calculation unit which calculates a displacement velocity from the output of the displacement detection unit, a target displacement velocity calculation unit which calculates a target displacement velocity of the optical-axis variation unit in response to the output of the angular velocity detection unit, a target displacement position calculation unit which integrates the target displacement velocity and calculates a target displacement position, a displacement position error calculation unit which calculates a displacement position error from the output of the displacement detection unit and the target displacement position, a basic drive quantity calculation unit that calculates a basic drive quantity based on a certain coefficient and the target displacement velocity, a compensation drive quantity calculation unit which calculates a compensation drive quantity based on a certain coefficient and the output value of the displacement position error calculation unit, and a drive unit that drives the actuator based on the basic drive quantity and the compensation drive quantity.

Objects of the present invention are also achieved in a camera comprising a photographic lens having an optical axis, an optical-axis variation unit for changing the optical axis of the photographic lens, an actuator which drives the optical-axis variation unit, a displacement detection unit which outputs a signal indicative of displacements in the optical-axis variation unit, a displacement velocity calculation unit which calculates a displacement velocity from the output of the displacement detection unit a target displacement velocity calculation unit which calculates a target displacement velocity according to the difference between the center position that is roughly in the middle of the optical-axis displacement range and the output value from the displacement detection unit, a velocity error calculation unit which calculates a velocity error from the difference between the displacement velocity and the target displacement velocity, a basic drive quantity calculation unit that calculates a basic drive quantity by applying a certain coefficient to the target displacement velocity a compensation drive quantity calculation unit which calculates a compensation drive quantity, having applied a certain coefficient to the velocity error, and a drive unit that drives the actuator in accordance with the basic drive and compensation drive quantities to move the optical axis of the photographic lens to the center position.

Objects of the present invention are also achieved in a camera comprising a photographic lens having an optical axis, an optical-axis variation unit for changing the optical axis of the photographic lens, an actuator which drives the optical-axis variation unit, a displacement detection unit which outputs a signal indicative of displacements in the optical-axis variation unit, a displacement velocity calculation unit which calculates a displacement velocity from the output of the displacement detection unit, a target displacement velocity calculation unit which calculates a target displacement velocity according to the difference between the center position that is roughly in the middle of the optical-axis displacement range and the output value from the displacement detection unit, a velocity error calculation unit which calculates a velocity error from the difference between the displacement velocity and the target displacement velocity, a velocity error integration unit which, when the absolute value of the velocity error is at least equal to a prescribed value, integrates the velocity error, and when the absolute value of the velocity error is less than the prescribed value, clears the integrated value, a basic drive quantity calculation unit that calculates a basic drive quantity by applying a certain coefficient to the target displacement velocity, a compensation drive quantity calculation unit which calculates the compensation drive quantity, having applied a certain coefficient to the output value of the integration unit, a drive unit that drives the actuator in accordance with the basic drive and compensation drive quantities so as to move the optical axis to the center position.

Objects of the present invention are also achieved in a camera comprising a photographic lens having an optical axis, an optical-axis variation unit for changing the optical axis of the photographic lens, an actuator which drives the optical-axis variation unit, a displacement detection unit which outputs a signal indicative of displacements in the optical-axis variation unit, a displacement velocity calculation unit which calculates a displacement velocity from the output of the displacement detection unit, a target displacement velocity calculation unit which calculates a target displacement velocity according to the difference between the center position that is roughly in the middle of the optical-axis displacement range and the output value from the displacement detection unit, a target velocity differentiation unit which calculates differentials of the target displacement velocity, a basic drive quantity calculation unit that calculates a basic drive quantity by applying a certain coefficient to the target displacement velocity, a compensation drive quantity calculation unit which calculates the compensation drive quantity, having applied a certain coefficient to the output value of the differentiation unit, and a drive unit that drives the actuator at least by the basic drive and compensation drive quantities, and drives the optical axis to the center position.

Objects of the present invention are also achieved in a camera comprising a photographic lens having an optical axis, an optical-axis variation unit for changing the optical axis of the photographic lens, an actuator which drives the optical-axis variation unit, a displacement detection unit which outputs a signal indicative of displacements in the optical-axis variation unit, a displacement velocity calculation unit which calculates displacement velocity from the output of the displacement detection unit, a velocity error calculation unit which calculates a velocity error from the difference between the displacement velocity and a prescribed target displacement velocity, a basic drive quantity calculation unit that calculates a basic drive quantity by applying a certain coefficient to the target displacement velocity, a compensation drive quantity calculation unit which calculates a compensation drive quantity, having applied a certain coefficient to the output value of the velocity error, and a drive unit which drives the actuator in accordance with the basic drive quantity and the compensation drive quantity, and drives the optical axis to the reset position at one end of the range of the displacement thereof.

Objects of the present invention are also achieved in a camera comprising a photographic lens having an optical axis, an optical-axis variation unit for changing the optical axis of the photographic lens, a displacement detection unit which outputs a signal indicative of displacements in the optical-axis variation unit, a displacement velocity calculation unit which calculates a displacement velocity from the output of the displacement detection unit, a velocity error calculation unit which calculates a velocity error from the difference between the displacement velocity and a prescribed target displacement velocity, a velocity error integration unit which, when the absolute value of the velocity error is at lease as great as the prescribed value, integrates the velocity error and when the absolute value of the velocity error is less than the prescribed value clears the integrated value, a basic drive quantity calculation unit that calculates a basic drive quantity by applying a certain coefficient to the target displacement velocity, a compensation drive quantity calculation unit which calculates a compensation drive quantity, having applied a certain coefficient to the output value of the integration unit, and a drive unit which drives the actuator in accordance with the basic drive quantity and the compensation drive quantity, and drives the optical axis to the reset position at one end of the range of the displacement thereof.

Objects of the present invention are also achieved in a camera comprising a photographic lens having an optical axis, an optical-axis variation unit for changing the optical axis of the photographic lens, an actuator which drives the optical-axis variation unit, a displacement detection unit which outputs a signal in accordance with displacements in the optical-axis variation unit, a displacement velocity calculation unit which calculates a displacement velocity from the output of the displacement detection unit, a centering drive unit which drives the actuator and drives the optical axis roughly to a center position, a reset drive unit which drives the actuator and drives the optical axis to a reset position at one end of the range of the displacement thereof, a maximum displacement velocity calculation unit that calculates a maximum displacement velocity of the output value of the displacement velocity calculation unit during the operation of the centering drive unit, and wherein a limit is established for the drive quantity of the limit drive unit so that driving is inhibited above the drive quantity calculated according to the maximum displacement velocity.

Objects of the present invention are also achieved in a camera comprising a photographic lens having an optical axis an optical-axis, a variation unit for changing the optical axis of the photographic lens an actuator which drives the optical-axis variation unit, a displacement detection unit which outputs a signal indicative of displacements in the optical-axis variation unit, a centering drive unit which subjects the optical-axis variation unit to a constant-velocity control by varying a drive quantity with which the actuator is driven, an average drive quantity calculation unit which calculates an average value of the drive quantity during the constant-velocity control, a reset drive unit which drives the actuator and drives the optical axis to a reset position at one end of a range of displacement thereof, and wherein a limit is established for the drive quantity of the reset drive unit so that driving is inhibited above a drive quantity calculated according to the output value of the average drive quantity calculation unit.

Objects of the present invention are also achieved in a camera comprising a photographic lens having an optical axis, an optical-axis variation unit for changing the optical axis of the photographic lens, an actuator which drives the optical-axis variation unit, a centering drive unit which drives the actuator and drives the optical axis roughly to a center position, and a centering drive suspension unit that suspends the centering drive action when the centering action does not terminate after a prescribed amount of time has elapsed since the action of the centering drive unit began.

Objects of the present invention are also achieved in a camera comprising a photographic lens having an optical axis, an optical-axis variation unit for changing the optical axis of the photographic lens, an actuator which drives the optical-axis variation unit, a displacement detection unit which outputs a signal indicating displacements in the optical-axis variation unit, a displacement velocity calculation unit which calculates a displacement velocity from the output of the displacement detection unit, a centering drive unit which drives the actuator and drives the optical axis roughly to a center position, and a centering drive suspension unit that suspends the centering drive action when the displacement velocity is smaller than a prescribed value after a prescribed amount of time has elapsed since the action of the centering drive unit began.

Objects of the present invention are also achieved in a camera comprising a photographic lens having an optical axis, an optical-axis variation unit for changing the optical axis of the photographic lens, an actuator which drives the optical-axis variation unit, a displacement detection unit which outputs a signal indicative of displacements in the optical-axis variation unit, a displacement velocity calculation unit which calculates a displacement velocity from the output of the displacement detection unit, a centering drive unit which drives the actuator and drives the optical axis roughly to a center position, a maximum displacement velocity detection unit which detects a maximum value of the displacement velocity during the operation of the centering drive unit, and a centering drive suspension unit that suspends the centering drive action in cases where the output value from the maximum displacement velocity detection unit is smaller than a prescribed value during the operation of the centering drive action.

Objects of the present invention are also achieved in a camera comprising a photographic lens having an optical axis, an optical-axis variation unit for changing the optical axis of the photographic lens, an actuator which drives the optical-axis variation unit, a displacement detection unit which outputs a signal indicating displacements in the optical-axis variation unit, a displacement velocity calculation unit which calculates a displacement velocity from the output of the displacement detection unit, a centering drive unit which drives the actuator and drives the optical axis roughly to a center position, a maximum displacement velocity detection unit which detects a maximum value of a displacement velocity after a prescribed amount of time has elapsed since the action of the centering drive unit began, a centering drive suspension unit that suspends the centering drive action in cases where the output value from the maximum displacement velocity detection unit is smaller than a prescribed value during the operation of the centering drive action.

Objects of the present invention are also achieved in a camera comprising a photographic lens having an optical axis, an optical-axis variation unit for changing the optical axis of the photographic lens, an actuator which drives the optical-axis variation unit, a displacement detection unit which outputs a signal indicating displacements in the optical-axis variation unit a displacement velocity calculation unit which calculates a displacement velocity from the output of the displacement detection unit, a centering drive unit which drives the actuator and drives the optical axis roughly to a center position, and a centering drive suspension unit that suspends the centering drive action in cases where the displacement velocity is smaller than a prescribed value during the operation of the centering drive unit.

Objects of the present invention are also achieved in a camera comprising a photographic lens having an optical axis, an optical-axis variation unit for changing the optical axis of the photographic lens, an actuator which drives the optical-axis variation unit, a displacement detection unit which outputs a signal indicating displacements in the optical-axis variation unit, a displacement velocity calculation unit which calculates a displacement velocity from the output of the displacement detection unit, a centering drive unit which drives the actuator and drives the optical axis roughly to a center position a minimum displacement velocity detection unit which detects a minimum value of the displacement velocity during the operation of the centering drive unit, and a centering drive suspension unit that suspends the centering drive action in cases where the output value from the minimum displacement velocity detection unit is smaller than a prescribed value during the operation of the centering drive unit.

Objects of the present invention are also achieved in a camera comprising a photographic lens having an optical axis an optical-axis, variation unit for changing the optical axis of the photographic lens, an actuator which drives the optical-axis variation unit a displacement detection unit which output a signal indicating displacements in the optical-axis variation unit, a displacement velocity calculation unit which calculates a displacement velocity from the output of the displacement detection unit, a centering drive unit which drives the actuator and drives the optical axis roughly to a center position a minimum displacement velocity, a detection unit which detects the minimum value of the displacement velocity after a prescribed amount of time has elapsed since the action of the centering drive unit began, and a centering drive suspension unit that suspends the centering drive action in cases where the output value from the minimum displacement velocity detection unit is smaller than a prescribed value during the operation of the centering drive action.

Objects of the present invention are also achieved in a camera comprising a photographic lens having an optical axis, an optical-axis variation unit for changing the optical axis of the photographic lens, an actuator which drives the optical-axis variation unit, a displacement detection unit which outputs a signal indicating displacements in the optical-axis variation unit, a reset drive unit which drives the actuator and drives the optical axis to the reset position at one end of the range of displacement thereof, and a reset drive suspension unit which suspends the action of the reset drive in cases where that action has not terminated after a prescribed amount of time has elapsed since the operation of the reset drive unit began.

Objects of the present invention are also achieved in a camera equipped with a vibration compensation device which compensates for image blur comprising an optical system, and a drive unit which drives the optical system in a direction perpendicular to the optical axis, the drive unit having a startup time which is less than a prescribed time.

Objects of the present invention are also achieved in a camera equipped with a vibration compensation device which compensates for image blur comprising an optical system, and a drive unit which drives the optical system in a direction perpendicular to the optical axis, the drive unit having a startup time which is less than a time required from the activation of the drive unit until the vibration speed reaches its maximum.

Objects of the present invention are also achieved in a camera equipped with a vibration compensation device which compensates for image blur comprising an optical system, and a drive unit which drives the optical system in a direction perpendicular to the optical axis, the drive unit having a startup time which is less than 25 ms.

Objects of the present invention are also achieved in a camera equipped with an vibration compensation device which compensates for image blur comprising an optical system and a coreless motor which drives the optical system in a direction perpendicular to the optical axis, the drive unit having a startup time which is less than a prescribed time.

Objects of the present invention are also achieved in a hand-held camera comprising a vibration detection device which detects vibrations in the hand-held camera, a photographic focal length detection unit which detects the focal length of the photographic optical system, a measurement unit which detects the distance to a photographic subject, a drive unit for shifting the optical axis of the photographic optical system in response to the output of the vibration detection unit to compensate for vibrations, and a correct compensation coefficient calculation unit which calculates a correct compensation coefficient from the output of the photographic focal length detection unit and the output of the measurement unit, the correct compensation coefficient determining how much the optical axis of the photographic optical system is driven relative to the output of the vibration detection unit.

Objects of the present invention are also achieved in a camera comprising a vibration detection unit which detects vibrations in the camera, a photographic focal length detection unit which detects the focal length of the photographic optical system, a measurement unit which detects the distance to the photographic subject, a rewritable non-volatile memory to store gain adjustment values which compensate for the individual output variations of the vibration detection unit, a drive unit to change the optical axis of the photographic optical system of the camera to compensate for vibrations in response to the output of the vibration detection unit, and a correct compensation coefficient calculation unit which calculates a correct compensation coefficient from the output of the photographic focal length detection unit, the output of the measurement unit, and the gain adjustment values stored in the rewritable non-volatile memory, the correct compensation coefficient determining how much to change the optical axis of the photographic optical system relative to the output of the vibration detection unit.

Objects of the present invention are also achieved in a vibration compensation device which computes a correct compensation coefficient after the operation of the measurement unit is concluded but prior to vibration compensation.

Objects of the present invention are also achieved in camera having an optical-axis variation unit for changing the optical axis of the photographic lens, an actuator which drives the optical-axis variation unit, a displacement detection unit which detects displacements in the optical-axis variation unit, an angular-velocity detection unit which detects angular velocities caused by vibrations, a displacement velocity calculation unit which calculates the displacement velocity from the output of the displacement detection unit, a target displacement velocity calculation unit which calculates the target displacement velocity of the optical-axis variation unit in response to the output of the angular velocity detection unit, and a basic drive quantity calculation unit that calculates the basic drive quantity by applying a certain coefficient to the target displacement velocity, and a drive unit to drive the actuator in accordance with one of the compensation drive quantities, or combination thereof, calculated by using the basic drive quantity.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
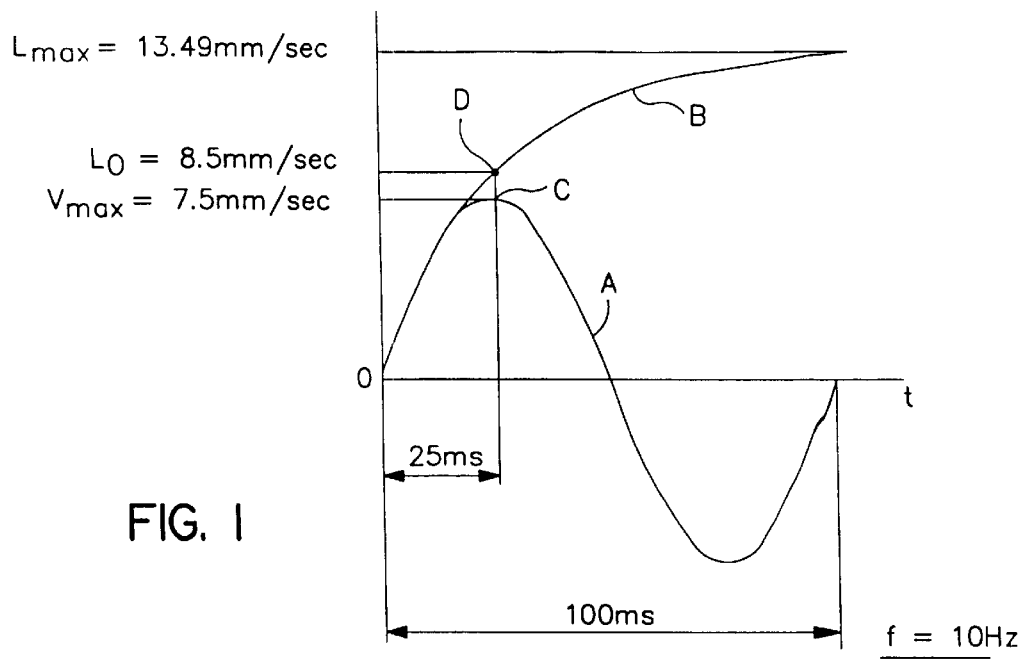
FIG. 1 is a graph of the compensation action characteristics of a vibration compensation device in accordance with a first preferred embodiment of the present invention.

Reference will now be made in detail to the present preferred embodiments of the present invention, examples of which are illustrated in the accompanying drawings, wherein like reference numerals refer to like elements throughout.

FIG. 1 is a graph of image velocity V plotted against time t showing a compensation action characteristics of a vibration compensation device in accordance with a first preferred embodiment of the present invention. A vibration wave form A represents an average vibration pattern along a y-axis in a camera. The vibration wave form A is a sine wave having a frequency f=10 Hz and a maximum image movement velocity of $V_{max}$=7.5 mm/s. In order for a vibration compensation device to track, i.e., compensate for, vibrations in a camera it must be able to reach the velocities exhibited by the vibration wave form A at the same times, or prior to, the vibration wave form A. Note, that while only the y-axis graph is shown, a similar graph would describe the characteristics of a vibration compensation device x-axis direction.

A curve B is a desired start-up characteristic curve for a vibration compensation device in accordance with the first preferred embodiment of the present invention. A point C represents the maximum vibration speed of the wave form A. A fixed point D is the compensation velocity of the curve B at the point in time when the wave form A exhibits the maximum vibration speed. The compensation velocity represented by the fixed point D coincides with 63% of the maximum compensation velocity $L_{max}$. The maximum compensation velocity $L_{max}$ exceeds the velocity exhibited by the fixed point C on the sine wave A. It therefore follows that, a vibration compensation device exhibiting the characteristics shown by the curve B is able to follow the vibration exhibited by the vibration wave form A. Accordingly, for a vibration having a vibration frequency at or below 10 Hz, a vibration compensation device which exhibits a characteristic time constant, i.e. that time in which it exceeds $V_{max}$, of 25 msec or less will be able to adequately compensate for the vibration.

Figure 2:
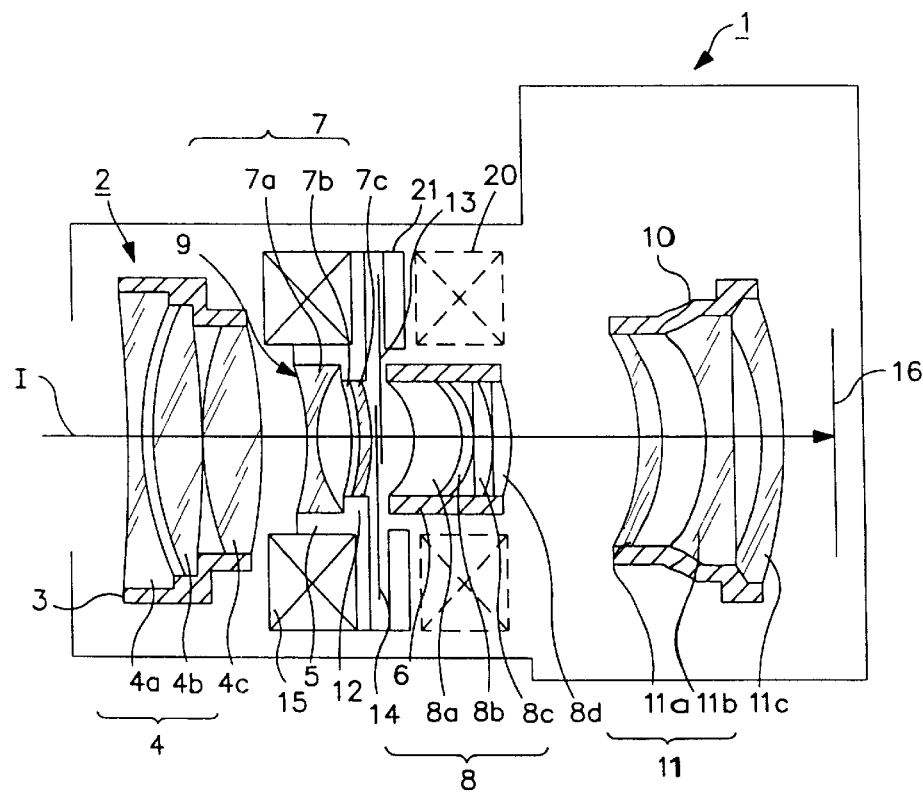
FIG. 2 is a diagram of a camera in accordance with the first preferred embodiment of the present invention.

FIG. 2 is a diagram of a camera equipped with a lens shutter in accordance with the first preferred embodiment of the present invention. A camera 1 has a zoom lens comprising a photographic lens system 2 having an optical axis I. The photographic lens system 2 generally comprises a first lens group 4, a second lens group 9, and a third lens group 11. An image of the photographic subject is formed by the first, second, and third lens groups 4, 9, and 11 on an image-formation plane 16.

The first lens group 7 comprises a set of three lenses, 4a, 4b, and 4c, which are held by a lens frame 3. The second lens group 9 comprises a front lens group 7 and a back lens group 8. The front lens group 7 comprises a set of three lenses, 7a, 7b, and 7c, which are held by a lens frame 5. The back lens group 8 comprises a set of four lenses, 8a, 8b, 8c, and 8d, which are held by a lens frame 6. The third lens group 11 comprises a set of three lenses, 11a, 11b, and 11c, which are held by a lens frame 10.

A lens shutter 12 is interposed between the front lens group 7 and the back lens groups 8 of the second lens group 9. The lens shutter 12 comprises a set of shutter curtains 13 and 14 which are positioned immediately before the back lens group 8. The lens shutter 12 is driven by a drive unit 15 positioned at the periphery of the lens frame 5.

A vibration compensation mechanism unit 20, supported by a base plate 21, moves the back lens group 8 of the second lens group 9 in a direction roughly perpendicular to the optical axis I, such that the image formed at the image-formation plane 16 is moved in response to vibrations. The vibration compensation mechanism 20 is provided in a space peripheral to the back lens group 8 of the second lens group 9.

Figure 3:
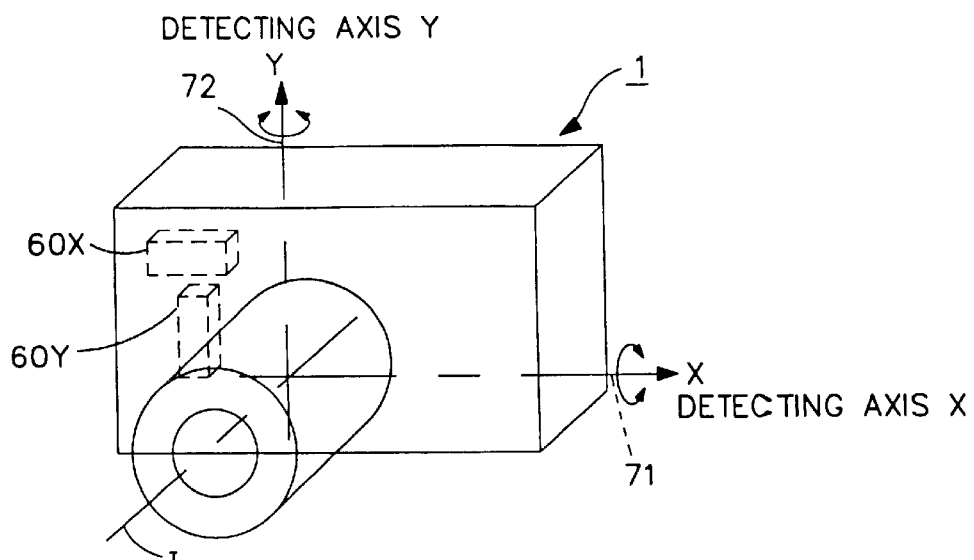
FIG. 3 is a perspective view of a camera having a vibration detection unit in accordance with the first preferred embodiment of the present invention.

FIG. 3 is a perspective view of a camera 1 having a vibration detection unit in accordance with the first preferred embodiment of the present invention. A pair of sensors 60x and 60y, forming a vibration detection unit, detect vibrations within the camera 1 and are positioned inside the camera 1. The sensor 60x detects angular velocities about an x-axis 71, perpendicular to the optical axis I, while the sensor 60y detects angular velocities about a y-axis 72, perpendicular to the optical axis I and to the x-axis 71. When an angular velocity about the x-axis is detected, the back lens group 8 is moved in the direction of the y-axis 72. Similarly, when an angular velocity is detected about the y-axis 72, the back lens group 8 is moved in the direction of the x-axis.

Figure 4:
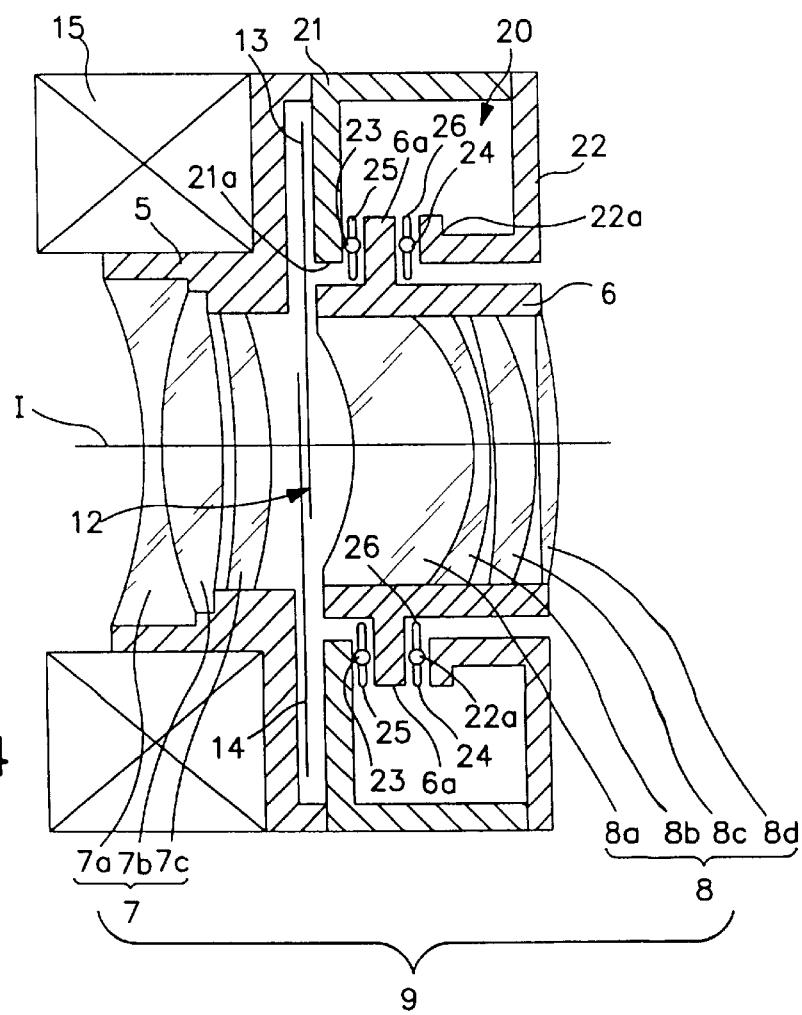
FIG. 4 is a cross-sectional view of a lens in accordance with the first preferred embodiment of the present invention taken along line B—B in FIG. 5.
Figure 5:
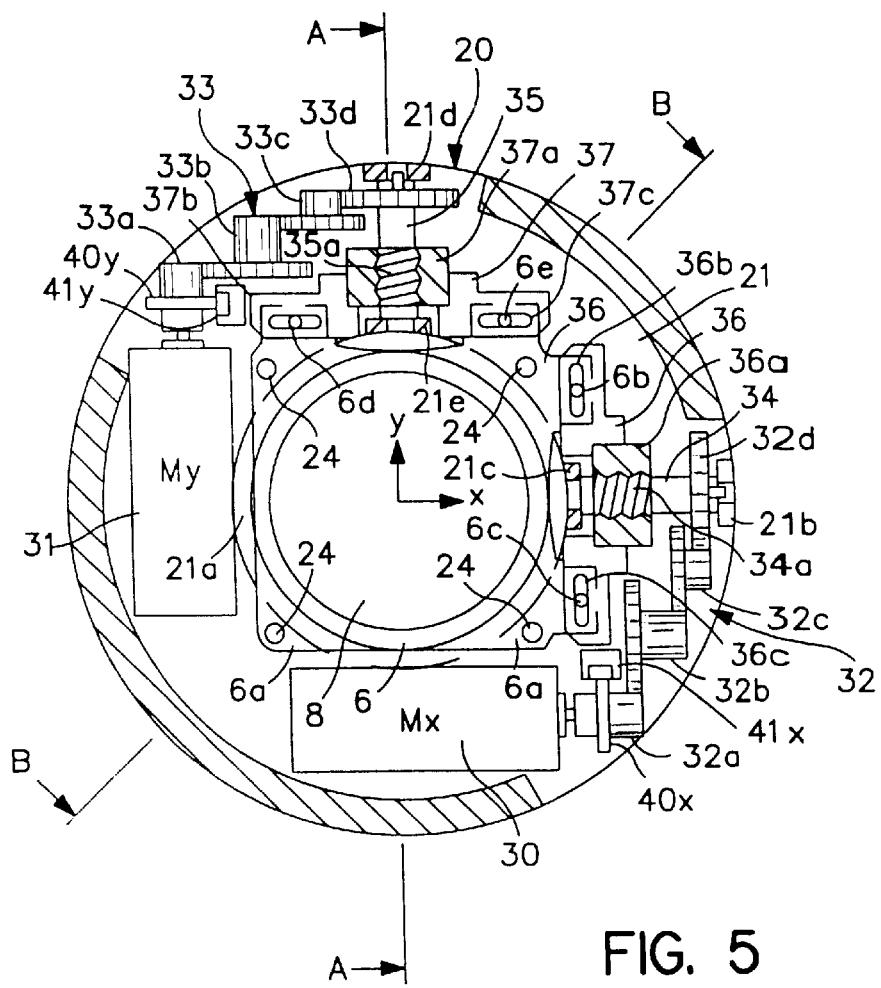
FIG. 5 is a cross-sectional view of a lens in accordance with the first preferred embodiment of the present invention.

FIG. 4 is a cross-sectional view of a lens in accordance with the first preferred embodiment of the present invention taken along line B—B plane in FIG. 5. The back lens group 8 (also called the "vibration compensation lens 8") of the second lens group 9 is held in a fixed position inside the lens frame 6. A flange 6a is provided around the periphery of the lens frame 6. The flange 6a is supported, inside an aperture 21a of a base plate 2, so that it can be moved, with a low-load, perpendicular to the optical axis I. The flange 6a is sandwiched between the base plate 21 and a set of four retention points 22a (only two of which are depicted in FIG. 4) by a set of four front ball bearings 23 and a set of four back ball bearings 24. Four pairs of retainers 25 and 26 hold the bearings 23 and 24. A cover unit 22, which supports the retention point 24, is provided at the back edge of the base plate 21 and forms a ring.

FIG. 5 is a cross-sectional view of a lens in accordance with the first preferred embodiment of the present invention. An x-axis DC motor 30 (Mx) and a y-axis DC motor 31 (My) form a drive unit for moving the vibration compensation lens 8 in the directions of the x-axis and the y-axis. The x-axis DC motor 30 and the y-axis DC motor 31 are supported by the base plate 21 so that their motor shafts are perpendicular to the direction of the optical axis, and perpendicular to each other.

The revolving shafts of the x-axis DC motor 30 and the y-axis DC motor 31 are high-density, compact units, which are situated at the outer periphery of the lens frame 6, without sticking out the side of the lens shutter 12 or the third lens group 11. Using this arrangement, the diameter required of the lens barrel is reduced.

A pair of gear trains 32 and 33 are connected to the x-axis DC motor 30 and the y-axis DC motor 31, respectively. Each gear in the gear trains 32 and 33 are preferably parallel gears, such as flat gears. The pair of gear trains 32 and 33 transmit the motor revolutions of the x-axis DC motor 30 and the y-axis DC motor 31 to a first and second lens shafts 34 and 35, respectively. The gear train 32 comprises a set of gears 32a, 32b, 32c, 32d. Similarly, the gear train 33 comprises a set of gears 33a, 33b, 33c, and 33d. The final gears 32d and 33d of the gear trains 32 and 33 are fixed to the first shaft 34 and the second shaft 35, respectively. The first shaft 34 extends in the x-axis direction and is rotatably held by a pair of bearings 21b and 21c. Similarly, the second shaft 35 extends in the y-axis direction and is rotatably supported by a pair of bearings 21d and 21e. The bearings 21b, 21c, 21d, and 21e are in turn supported by the base plate 21.

A linking member 36, positioned on the x-axis side, is provided with a pair of long holes 36b and 36c which extend in the direction of the y-axis. A pair of hubs 6b and 6c, provided on the flange 6a of the lens frame 6, engage the long holes 36b and 36c. Similarly, a linking member 37, positioned on the y-axis side, is provided with a pair of long holes 37b and 37c which extend in the direction of the y-axis. A pair of hubs 6d and 6e, provided on the flange 6a of the lens frame 6, engage the long holes 37b and 37c. The linking members 36 and 37 are provided with a set of threads 36a and 37, respectively. The threads 36a and 37a threadedly engage a pair of threads 34a and 35a, formed on the shafts 34 and 35. The threads 36a and 35a, interact with the threads 34a and 35a so as to translate the rotation of the shafts 34 and 35 into linear movement.

The vibration compensation lens 8 is driven in the direction of the x-axis, via the linking member 36, by the motor 30 on the x-axis side. Similarly, the vibration compensation lens 8 is driven in the direction of the y-axis, via the linking member 37, by the motor 31 on the y-axis side. The vibration compensation lens 8 can therefore move in all directions, perpendicular to the optical axis I, inside the aperture 21a of the base plate 21.

The detection of the position and velocity of the vibration compensation lens 8 described above is performed by a pair of holed discs 40x and 40y. The pair of holed discs 40x and 40y have multiple holes formed at equal intervals about the peripheral edge thereof. The pair of holed discs 40x and 40y are preferably provided integrally with the gears 32a and 33a, respectively. A pair of photo-interrupters 41x and 41y are provided on the base plate 21 such that they surround the peripheral edges of the pair of holed discs 40x and 40y, respectively. The turning of the motors 30 and 31 on the x-axis side and y-axis side, respectively, are detected by the photo-interrupters 41x and 41y reading the holes on the periphery of the holed discs 40x and 40y. The photo-interrupters 41x and 41y output pulse signals based on the detected numbers of holes on the sides of the discs 40x and 40y. The position and velocity can be calculated by counting the pulses in the output signal of the photo-interrupters 41x and 41y.

Figure 6:
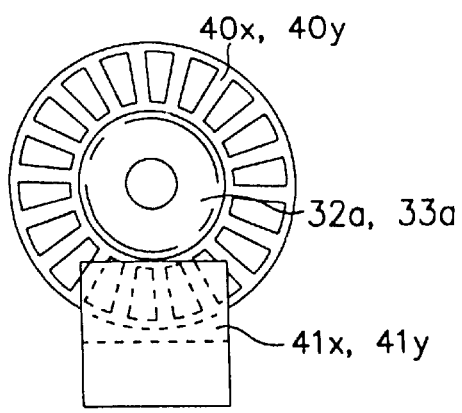
FIG. 6 is a diagram of a position detection unit in accordance with the first preferred embodiment of the present invention.

FIG. 6 is a diagram of a position detection unit in accordance with the first preferred embodiment of the present invention. Specifically, FIG. 6 is an enlarged view showing the details of the holes in the outer periphery of the holed disks 40x and 40y.

Figure 7:
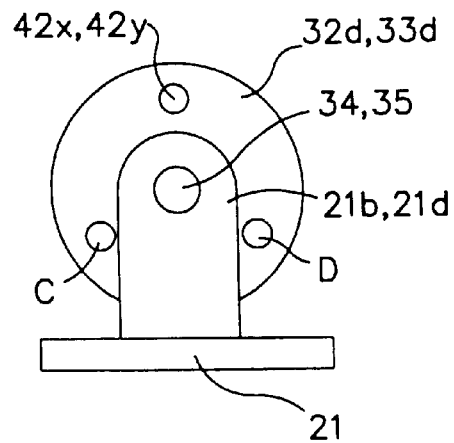
FIG. 7 is a side view of a gear used to center the vibration compensation lens in accordance with the first preferred embodiment of the present invention.

FIG. 7 is a side view of a gear used to center the correcting lens in accordance with the first preferred embodiment of the present invention. The gears 32d and 33d are provided with stopper pins 42x and 42y at eccentric positions, respectively. The stopper pins 42x and 42y strike the two edges of the bearings 21b and 21d on the base plate 21 at positions C and D. Thus, the turning of the gears 32d and 33d are restricted to the range between the positions C and D. The center of the turning range of the gears 32d and 33d are made to coincide with the center position of the vibration compensation lens 8.

Figure 8:
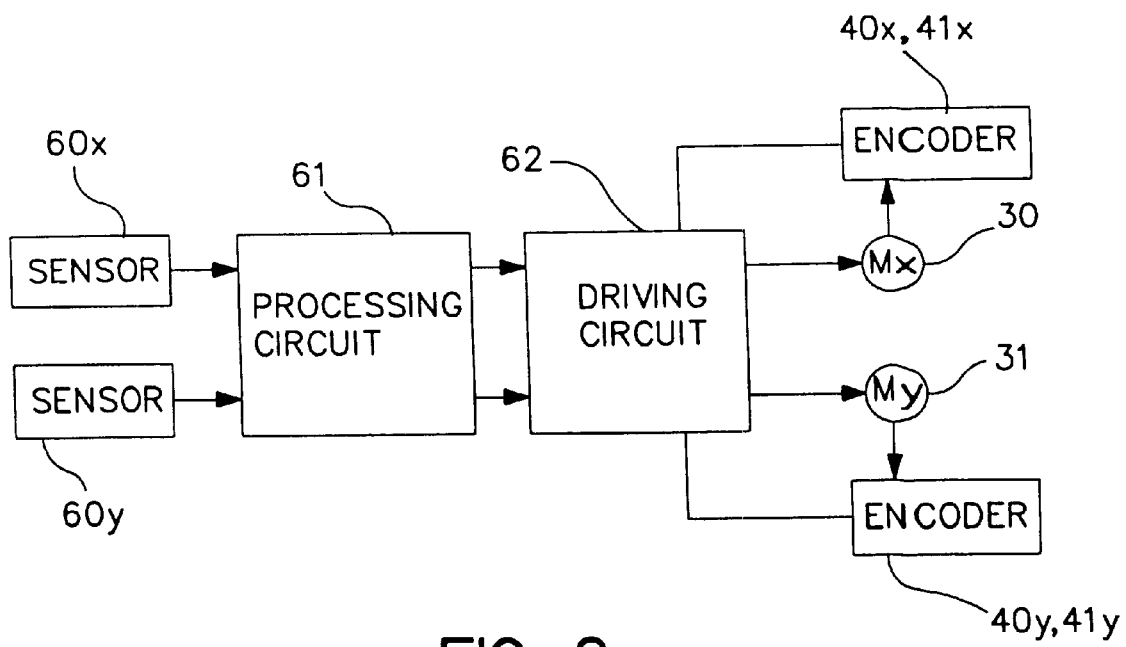
FIG. 8 is a block circuit diagram of a unit in the vibration compensation device in accordance with the first preferred embodiment of the present invention.

FIG. 8 is a block circuit diagram of a control unit in the vibration compensation device in accordance with the first preferred embodiment of the present invention. The sensors 60x and 60y detect angular velocities generated in the camera 1 (see FIG. 3), and transmit angular velocity information to a processing circuit 61. The processing circuit 61 calculates the angles at which the image moves in the image-formation plane 16 (see FIG. 2). The processing circuit 61 transmits the results of the calculations to a driving circuit 62.

The driving circuit 62 causes the x-axis DC motor 30 and the y-axis DC motor 31 to turn, thereby driving the vibration compensation lens 8 (see FIG. 2), to cancel the vibrations of the image on the x and y axes, respectively. Also, the turning angle and turning speed of the x-axis DC motor 30 are detected by an encoder on the x-axis side (comprising the disc 40x and the photo-interrupter 41x), in FIG. 5 and are supplied as feedback to the driving circuit 62. Similarly, the turning angle and turning speed of the y-axis DC motor 30 and 31 are detected by an encoder on the y-axis side (comprising the disc 40y and the photo-interrupter 41y, in FIG. 5), and are supplied as feedback to the driving circuit 62. The vibration compensation lens 8 is driven in a prescribed direction by a prescribed amount, to compensate for vibrations.

The vibration compensation lens 8 may also be moved in the direction of the optical axis along with the other lens groups, during zooming or focusing. The vibration compensation mechanism unit 20 is installed inside a moving barrel, and, by moving the moving barrel in the direction of the optical axis I, the vibration compensation lens 8 is moved in the direction of the optical axis I together with the vibration compensation mechanism 20. Accordingly, when the vibration compensation lens 8 is moving in the direction of the optical axis, there are no parts which slide in the direction of the optical axis I, inside the gear trains 32 and 33, thus making it possible to minimize backlash between the gears.

Figure 9:
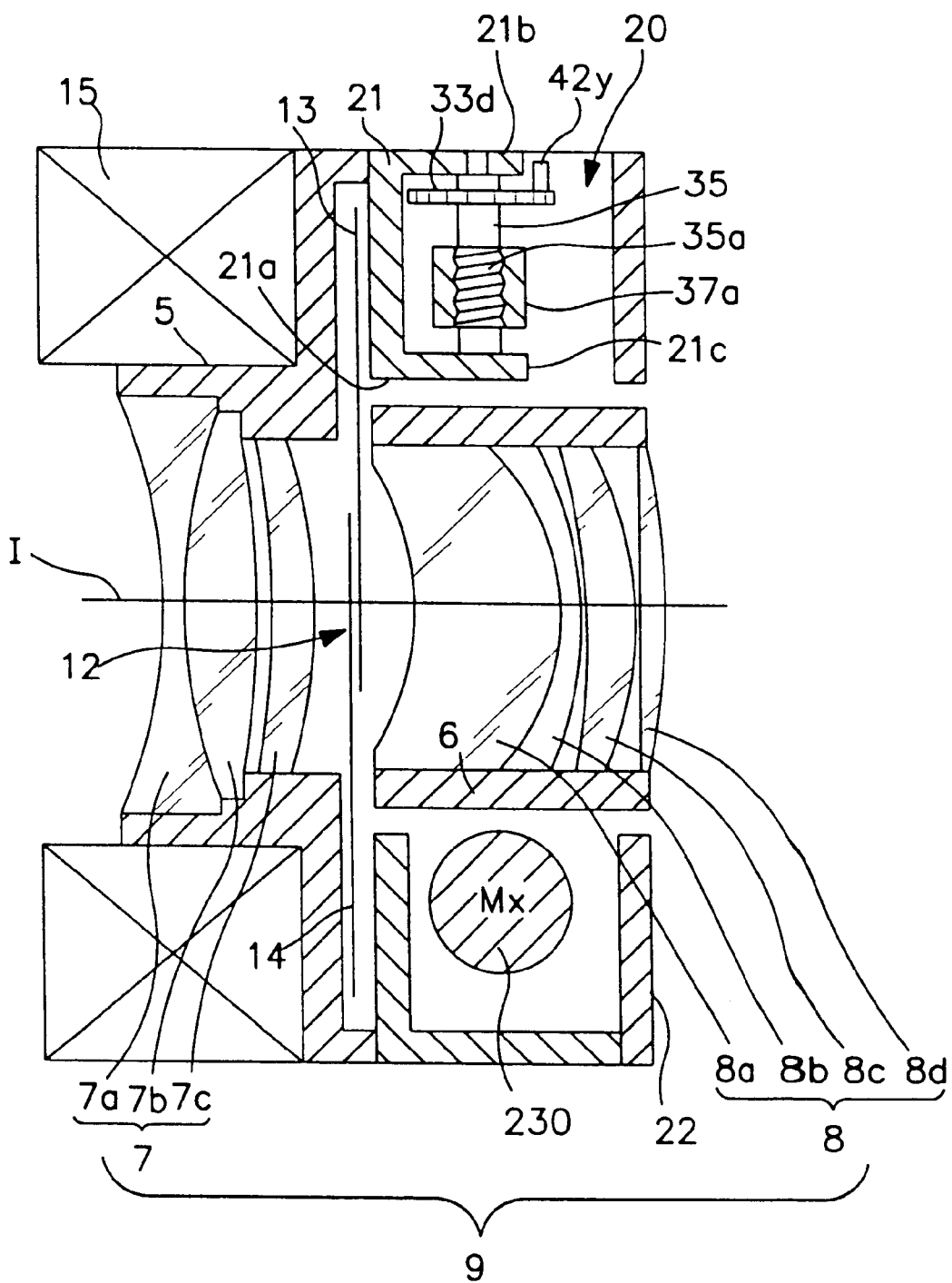
FIG. 9 is a cross-sectional view of a lens in accordance with the first preferred embodiment of the present invention taken along line A—A in FIG. 5.

FIG. 9 is a cross-sectional view of a lens in accordance with the first preferred embodiment of the present invention taken along line A—A in FIG. 5. The motors 30 and 31 are positioned within the range of the length (thickness) of the vibration compensation lens 8 in the direction of the optical axis I, so that, when the vibration compensation lens 8 moves in the direction of the optical axis I during zooming or focusing, it is possible to move the vibration compensation lens 8 in the direction of the optical axis I, without being restricted by the motors 30 and 31. Thus, the variable power ratio during zooming can be made large.

Figure 10:
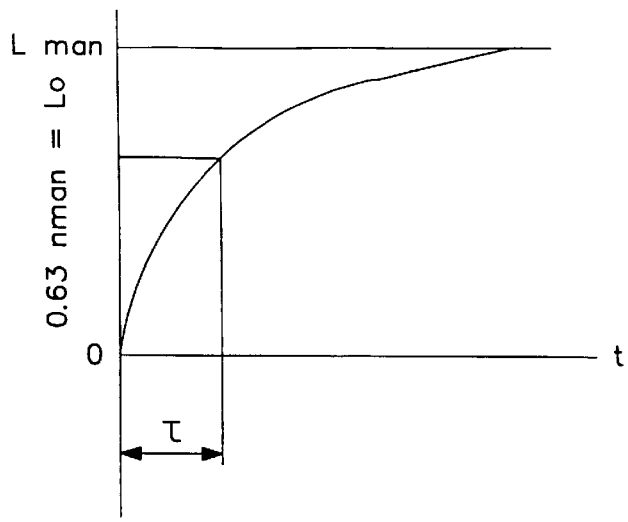
FIG. 10 is a graph of the velocity characteristic of a DC motor during a start-up period in accordance with the first preferred embodiment of the present invention.

FIG. 10 is a graph of the velocity characteristic of a DC motor during a start-up period in accordance with the first preferred embodiment of the present invention. The start-up characteristics of the vibration compensation operation in the vibration compensation device are dependent on the start-up characteristics of the motors. FIG. 10 shows a curve which represents the characteristics of a DC motor in terms of angular velocity L versus time t. With an ordinary DC motor, the more the turning angular velocity L increases, the more the turning angular acceleration drops, due to induced electromotive force. Thus, It is difficult to determine the start-up time until the maximum turning angular velocity $L_{max}$ is reached. The being so, with DC motors, the time τ that it takes for the turning angular velocity L to achieve a turning velocity $L_0$ that is 63% of the maximum turning angular velocity $L_{max}$ is called a "time constant," and is used in determining the capabilities of the start-up characteristics of DC motors.

As set forth above, the period of a vibration is usually 10 Hz or lower. Further, in hand-held photography, image blur can be prevented by photographing with a shutter speed that is one step faster than the inverse of the focal length of the photographic lens in seconds.

If it is assumed that the focal length of the photographic lens is 105 mm, and a photograph is taken at a shutter speed of 1/125 second, a maximum vibration of 30 μm may be produced in the image-formation plane. In other words, any vibrations under 30 μm will not produce image blur. The blur is the same value as the permissible circle of confusion used when determining the depth of focus. The average velocity of movement v in the image-formation plane during exposure is given by Equation 1.

$$V=30\times10^{-3}/(1/125)=3.75(mm/s) \quad \text{[Equation 1]}$$

If it is assumed that the vibration is a sine wave having a frequency f and an amplitude 2a, then the maximum movement velocity $V_{max}$ of image vibration is given by Equation 2.

$$V_{max}=2\pi fa \quad \text{[Equation 2]}$$

Accordingly, for the image movement quantity, the amplitude 2a should be minimized. Solving Equation 2 for the amplitude 2a produces Equation 3.

$$2a=V_{max}/\pi f \quad \text{[Equation 3]}$$

If it is assumed that the action of pressing the shutter release causes the camera to vibrate at a frequency of 5 Hz, then the image movement caused by the shutter manipulation is given by Equation 4.

$$2a=3.75/(\pi\times5)=0.24(mm) \quad \text{[Equation 4]}$$

If it is assumed that when the camera is held, it vibrates with a frequency of 10 Hz, then the image movement is given by Equation 5.

$$2a=3.75/(\pi\times10)=0.12(mm) \quad \text{[Equation 5]}$$

When using a lens having a focal length of 105 mm, an image movement quantity of 0.2 mm is the maximum allowable. The image compensation value is given by Equation 6.

$$2a/f=0.24/105=1/438 \quad \text{[Equation 6]}$$

Thus, a shutter speed of approximately 1/400 of the focal length or greater is needed.

Furthermore, with a novice unused to photography, it can be assumed that greater vibrations will be produced when the shutter release is manipulated. Accordingly, it may be assumed that in hand-held photography performed by a novice, image blur will be prevented if the photographs are taken at shutter speeds yet one step faster than the one step faster than the inverse of the focal length of the photographic lens in seconds. In such a situation the movement quantity is given by Equation 7.

$$v=30\times10^{-3}/(1/250)=7.5(mm/s) \quad \text{[Equation 7]}$$

At 5 Hz, the amplitude of the vibration is given by Equation 8.

$$2a=7.5/(\pi\times5)=0.48(mm) \quad \text{[Equation 8]}$$

At 10 Hz the amplitude of the vibration is given by Equation 9.

$$2a=7.5/(\pi\times10)=0.24(mm) \quad \text{[Equation 9]}$$

When a lens having a focal length of 105 mm is used, an image movement quantity of less than 0.5 mm is required. The image compensation quantity is given by Equation 10.

$$2a/f=0.48/105=1/219, \quad \text{[Equation 10]}$$

Thus, a shutter speed of approximately 1/200 of the focal length or faster is required.

In accordance with the first preferred embodiment of the present invention, the vibration compensation device is equipped with motors having a time constant of 25 msec or less.

Although the first embodiment of the present invention has been described with respect to a specific configuration, it will be recognized that the first embodiment is not limited to the specific configuration. For example a coreless motor may be used instead of the DC motor described.

Figure 11:
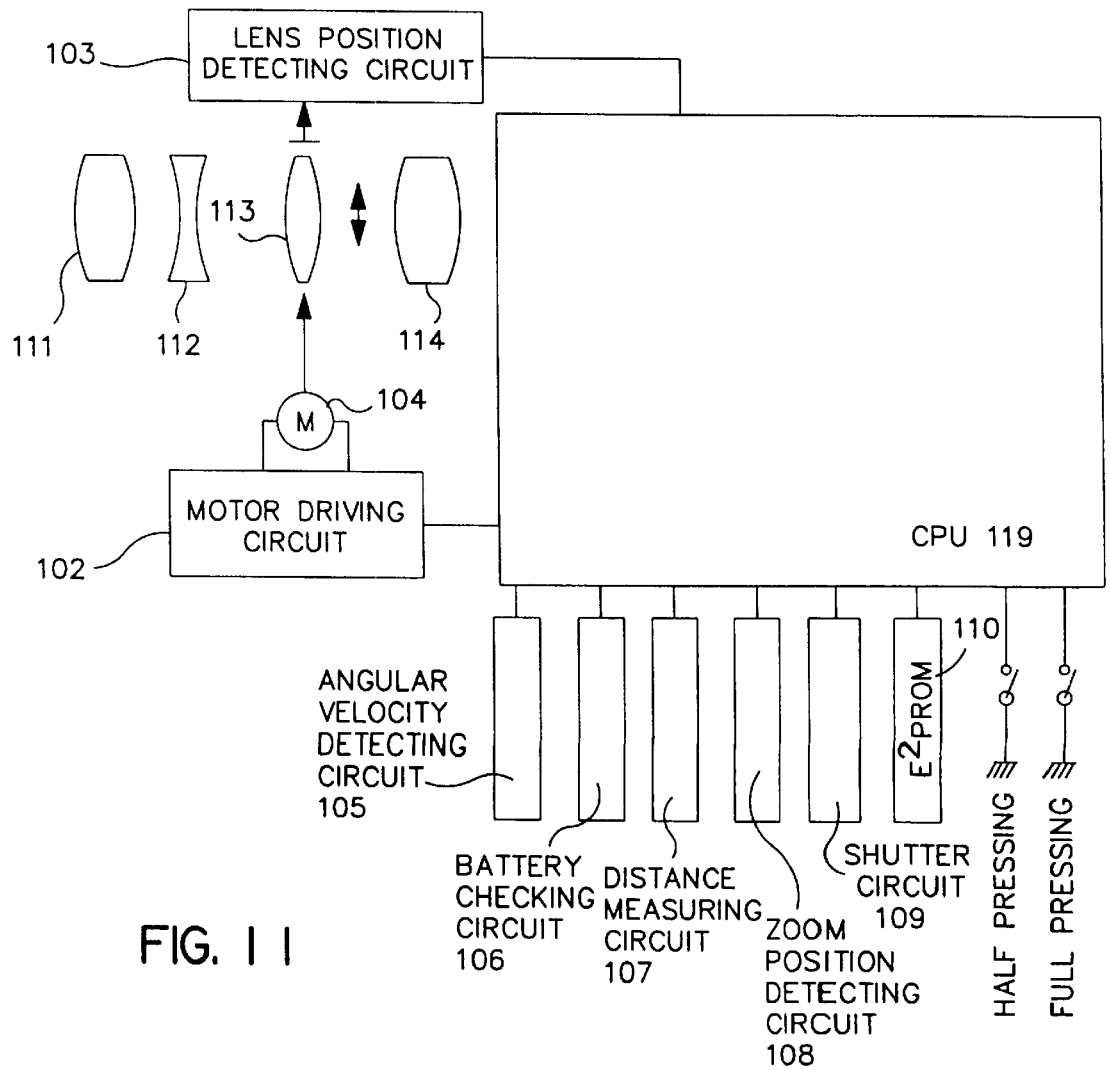
FIG. 11 is a circuit diagram of a vibration compensation system in accordance with a second preferred embodiment of the present invention.

FIG. 11 is a circuit diagram of a camera having a vibration compensation device in accordance with a second preferred embodiment of the present invention. A zoom lens having a variable focal length has a photographic optical system which comprises a set of photographic lenses 111, 112, 113, and 114. An angular velocity detection circuit 105, used as a vibration detection unit, detects angular velocities caused by vibrations and outputs a signal indicative of the angular velocities to a CPU 119. A zoom position detection circuit 108 detects a photographic focal length of the photographic optical system. A measurement circuit 107 detects the distance to the photographic subject.

Based on the output signal the angular velocity detecting circuit 105 and the focal length detected by the zoom position detection circuit 108, a set of gain adjustment values is written to a rewritable non-volatile memory $E^2$PROM 110. The gain adjustment values are correct compensation coefficients used to adjust the various gain variations of the angular velocity detection circuit 105. In other words, the gain adjustment values provide a relationship between the output signal of the angular velocity detecting circuit 105 and the amount of correction applied by the vibration compensation device.

The requisite vibration compensation computations are performed by the CPU 119, which preferably comprises a one-chip microcomputer. Vibrations in an image plane are canceled out by shifting, at a suitable speed, via a motor 104, the lens 113. The lens 113 is also known as a vibration compensation lens 113 and a vibration compensating lens 113. The vibration compensation lens is employed as an optical-axis variation unit within the photographic lenses 111, 112, 113, and 114. The motor 104 is controlled by a motor drive circuit 102.

A battery checking circuit 106, connected to the CPU 119, is provided to check either the residual capacity or the current supplying capability of a battery (not shown in the diagram) for driving the other circuitry. A shutter circuit 109 is connected to the CPU 119 for performing the exposure process. A half pressing switch, and a full pressing switch are connected to the CPU 119 to allow the user to control the functions of the camera.

The angular velocity detection circuit 105 outputs an analog signal which varies according to the angular velocities produced by the vibrations in the camera. The CPU 119 performs an A/D conversion on the analog output of the angular velocity detection circuit 105 and detects the angular velocity of the vibration compensation lens 113. The revolutions of the motor 104 are converted, by suitable gears, etc. (not shown in the diagram), into linear motion which drives the vibration compensation lens 113. The motor 104 and the suitable gears form a vibration compensation lens shifting system. The lens position detection circuit 103 functions as a displacement detection unit to detect the position of the vibration compensation lens 113 using commonly known technology.

The CPU 119 is preferably a one-chip microcomputer which controls the camera processes. The CPU 119 is provided with a timer unit to measure time, a timer interrupt unit to perform processes at constant time intervals, a PWM output unit to output a pulse width modulation duty signal, and an A/D unit to perform analog to digital conversions on the outputs of the angular velocity detection circuit 105.

The CPU 119 is configured so that it detects the angular velocity produced by vibrations, by performing A/D conversion on the output from the angular velocity detection circuit 105, and calculates a vibration compensation lens target velocity VC to obtain a speed at which to shift the vibration compensation lens 113 in order to counteract the vibrations. The CPU 119 also calculates a drive quantity for the motor 104 based on the vibration compensation lens target velocity VC and a vibration compensation lens position VR which gives a position of the vibration compensation lens 113 as determined from the output of the lens position calculation circuit 103. Based on these results the CPU 119 controls the motor 104, via the motor drive circuit 102, to shift the vibration compensation lens 113 at a suitable speed so as to change the optical axis of the photographic optical system to compensate for the detected vibrations. In accordance with the second preferred embodiment of the present invention the motor 104 is controlled using PWM (PULSE WIDTH MODULATION) control. Usually, PWM control involves varying the electrical conducting time over a certain period, and more specifically with regard to controlling the motor 104, by varying the duty with which the motor is turned on.

To calculate the lens target velocity conversion coefficient A0 (sometimes called the angular velocity detection circuit output-vibration compensation lens target velocity conversion coefficient), the CPU 119 performs distance-measurement (sometimes called AF) processing, at a prescribed timing, via the distance-measuring circuit 107. Thereafter, the CPU directs the zoom position detection circuit 8 to detect the focal length at which the photographing will be performed. The CPU 119 then reads a gain adjustment value G0 from the $E^2$PROM 110. The CPU 119 then calculates the lens target velocity conversion coefficient A0, based on the results of these operations, using Equation 11. As set forth above, the lens target velocity conversion coefficient A0 indicates how far to shift the vibration compensation lens 113 relative to the output value of the angular velocity detection circuit 105.

$$A0=G0 \times f(\text{focal length, distance to subject}) \qquad \text{[Equation 11]}$$

The lens target velocity conversion coefficient A0 is derived as a value that is some function of the focal length and the distance to the subject being photographed times the gain adjustment value G0. The function, or functions, of the subject distance and the focal length of the photographic optical system is peculiar to each individual photographic optical system. However, the lens target velocity conversion coefficient A0 may be approximately calculated, using Equation 12, based on a pair of variables d1 and d2 which are derived as a function of the focal length. In general, the output of known value distance-measurement circuits is usually the inverse of the distance to the subject $$A0 \approx G0 \times \{d1 \times (1/\text{subject distance}) + d2\} \qquad \text{[Equation 12]}$$

Furthermore, Equation 12 can be simplified so as to reduce the computing load on the CPU 119. The focal length of the photographic optical system is divided into a number of zones, the values of d1 and d2 at the focal lengths represented by each zone can be calculated beforehand and stored as a table in a memory, and the CPU 119 need only read the pre-calculated values the memory. Table 1 shows an example of such a table for a zoom optical system having a photographic focal length ranging from 35 mm to 105 mm.

TABLE 1

Photographic Focal Length and d1, d2

| Zone | Focal Length Range | Representative Focal Length | d1 | d2 |
|---|---|---|---|---|
| 1 | 35–40 mm | 37.5 mm | 0.043 | 1.00 |
| 2 | 40–45 mm | 42.5 mm | 0.046 | 1.02 |
| . | The range omitted | | | |

TABLE 1-continued

Photographic Focal Length and d1, d2

| Zone | Focal Length Range | Representative Focal Length | d1 | d2 |
|---|---|---|---|---|
| . . . 10 | 100–105 mm | 102.5 mm | 0.074 | 1.43 |

In Table 1, the photographic focal length is divided into 10 zones, with d1 and d2 being stored for each zone. Even with the use of a table stored in memory, the computational process must be performed precisely. In terms of the computation performed by a one-chip microcomputer, i.e., the CPU 119, the computation is quite sophisticated and, even using the simplified formula noted above, requires a very long computation time. Accordingly, it is difficult to perform the computation simultaneously with the other necessary functions during vibration compensation control. To help alleviate this problem, it is preferable to calculate the lens target velocity conversion coefficient A0 prior to beginning the vibration compensation control process, in the time period during a half-depression of a shutter release button, when processing traffic is relatively light During the vibration compensation control process, which is typically during the exposure process, a vibration compensation lens target velocity has to be computed. The vibration compensation lens target velocity is calculated during a timer interrupt processing that is performed at prescribed time intervals.

First of all, the output from the angular velocity detection circuit 105 is A/D-converted, and the vibration compensation lens target velocity VC is calculated using Equation 13.

$$VC = A0 \times (A/D \text{ conversion value}) \qquad \text{[Equation 13]}$$

Thereafter, the motor 104 is controlled, via the motor drive circuit 102, to precisely move the vibration compensation lens 113 relative to the computed vibration compensation lens target velocity VC at a drive duty given by Equation 14.

$$\text{drive duty} = K1 \times VC + K2 \times \Delta V + K3 \times \Delta S + K4 \times dVC/d + K5 \times \text{\{Eq}\pm\text{Doffset}14\text{]}$$

The ± symbol in the sixth term of Equation 14 indicates that a positive Doffset is added to the calculation results of the first through the fifth terms, respectively, when the calculation results are positive, and a negative Doffset is added thereto when the calculation results are negative.

Figure 12:
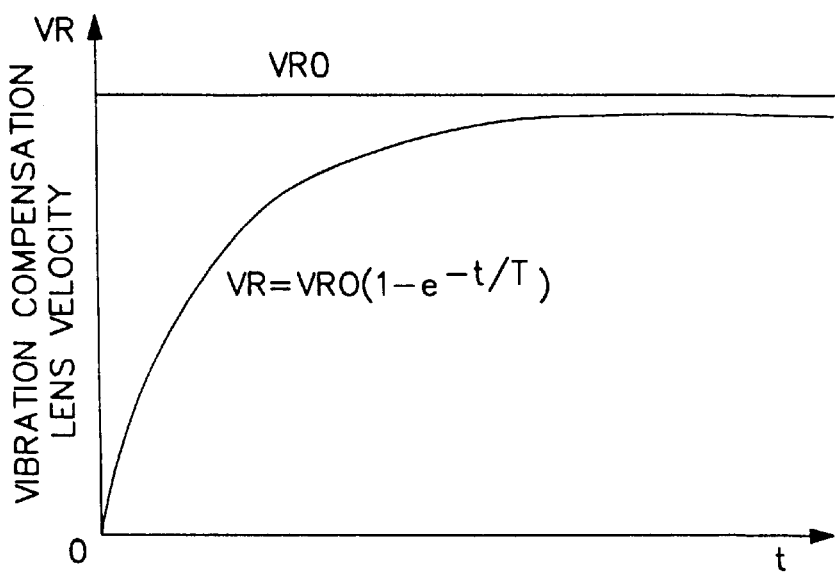
FIG. 12 is a graph showing the drive start-up characteristic for a vibration compensation lens in accordance with the second preferred embodiment of the present invention.

FIG. 12 is a graph showing the drive start-up characteristic for the vibration compensation lens velocity VR of a vibration compensation lens 113 in accordance with the second preferred embodiment of the present invention. The velocity of the vibration compensation lens 113, when current is passed through the motor 104 at the prescribed duty, is plotted on the vertical axis and the time t is plotted on the horizontal axis. The vibration compensation lens 113 velocity VR exhibits variation given by Equation 15.

$$VR \approx VR0 \times \{1 - e^{(-t/\tau)}\} \qquad \text{[Equation 15]}$$

VR0 is the normal vibration compensation lens velocity, after sufficient time has elapsed since current began to be conducted at the prescribed duty, and is a time constant which is determined by the characteristics of the motor 104 and the rotational-linear motion translation mechanism. τ usually has a value on the order of several tens of milliseconds when a coreless motor is used.

Figure 13:
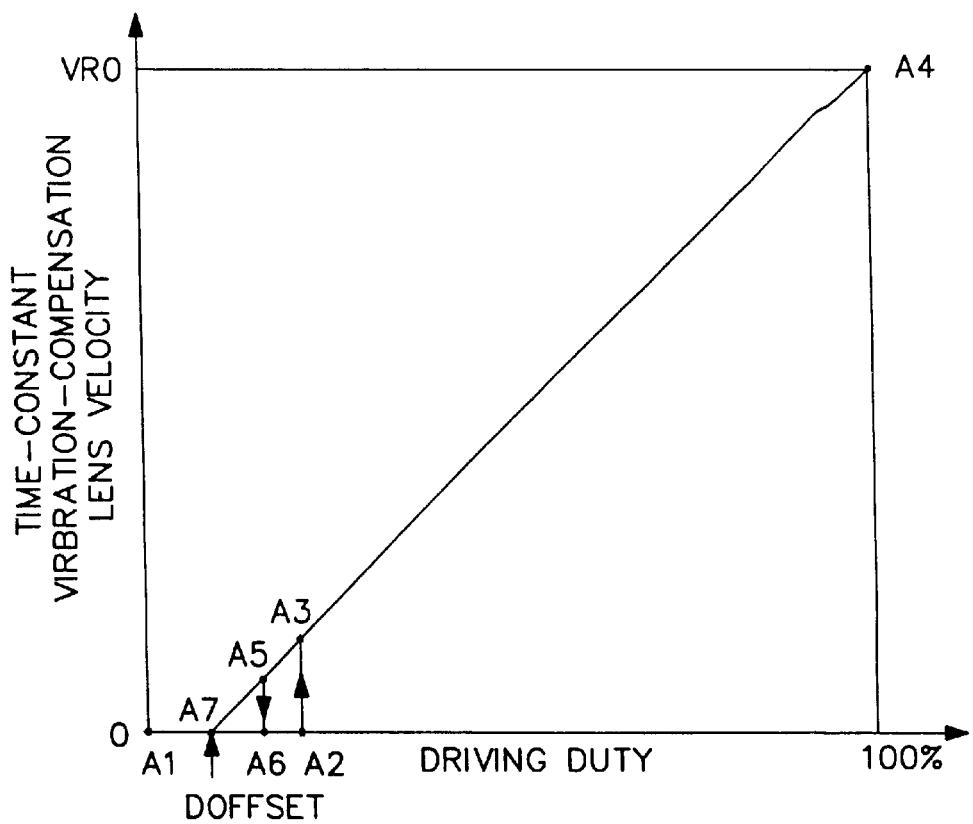
FIG. 13 is a graph showing the drive duty and normal lens velocity characteristics of the vibration compensation lens in accordance with the second preferred embodiment of the present invention.

FIG. 13 is a graph showing the drive duty and normal lens velocity characteristics of the vibration compensation lens 113 in accordance with the second preferred embodiment of the present invention. The normal vibration compensation lens velocity VR, is varied when the drive duty at which current is passed through the motor 104. The drive duty is increased from a point A1, that is, from the 0% condition. At a point A2 the motor 104 is still stopped, but when the point A2 is passed, the motor 104 suddenly begins turning and a point A3 is reached. After the point A3, the vibration compensation lens velocity VR increases along with the increase in drive duty, and the drive duty reaches 100% at a point A4. When the drive duty is decreased, the normal vibration compensation lens velocity VR0 decreases along with the decrease in the drive duty. However, unlike the case where the drive duty is increased, the motor 104 does not stop turning when the drive duty falls below point A3. The motor 104 first stops turning when the drive duty drops below point A5. Thus, when the drive duty is varied, the motor rpm, i.e., the vibration compensation lens velocity, varies along the path A1→A2→A3→A4→A5→A6→A7. If we assume that K1 is the slope of the straight line connecting points A3 and A4, and take the X segment of the straight line as a Doffset, and it is possible to shift the vibration compensation lens 113, at the vibration compensation lens target velocity VR, which is the control target in the chronologically normal condition, by driving the motor at the drive duty given by Equation 16.

$$\text{Drive duty} = K1 \times VC \pm \text{Doffset} \qquad \text{[Equation 16]}$$

Doffset is a positive constant, the ± sign indicates that a + positive, while a − should be added to the first term when the first term is negative. This takes into account that the actual vibration compensation lens 113 drive direction can be is a positive or a negative direction. The drive quantity, calculated with the first term, is a term that is based on the basic static characteristics of the motor 104 and is termed a basic drive quantity, or, alternatively, the basic drive duty. The result of any other term is called the compensation drive quantity, or, alternatively, the compensation drive duty.

Figure 14:
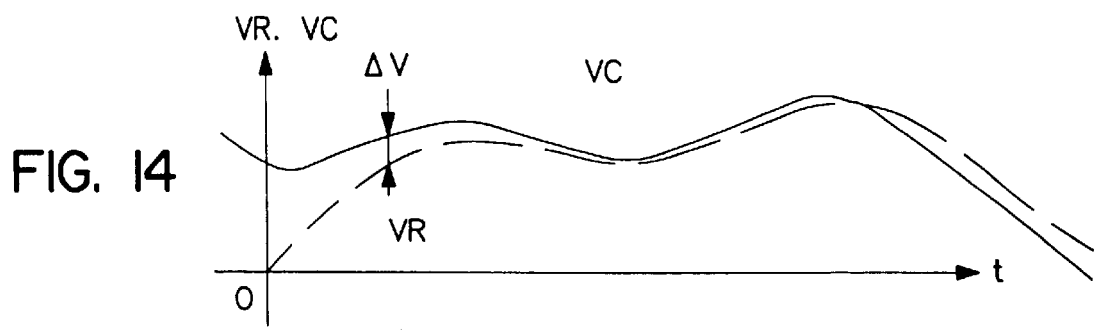
FIG. 14 is a graph showing a control equation used in the vibration compensation control in accordance with a second preferred embodiment of the present invention.

FIG. 14 is a graph showing a control equation used in the vibration compensation control in accordance with a second preferred embodiment of the present invention. Specifically, an actual vibration compensation lens velocity VR and the vibration compensation lens target velocity VC are shown from a time t=0, where the control of the motor 104 is started, based the first and sixth terms of Equation 14. A response delay appears until the actual vibration compensation lens velocity VR catches up to the vibration compensation lens target velocity VC. The response delay is dependent on the time constants of the vibration compensation lens shifting system. Due to external load factors, such as, for example, fluctuations in the power supply voltage supplied to the motor 104, or in the vibration compensation lens shifting system, a velocity coinciding with the target velocity VC is not always achieved. The second term of Equation 16 is a drive duty in response to the difference between the vibration compensation lens target velocity VC and the actual vibration compensation lens velocity VR, that is, according to the velocity error ΔV as calculated by Equation 17.

$$\Delta V = VC - VR \qquad \text{[Equation 17]}$$

Here, when K2 is too large, the tracking performance improves, but, conversely, overshooting occurs. Conversely, when K2 is too small the amount of error increases, although the vibration compensation control is very smooth, and the tracking performance deteriorates. In practice, the optimum value of K2 is derived through experimentation.

Figure 15A:
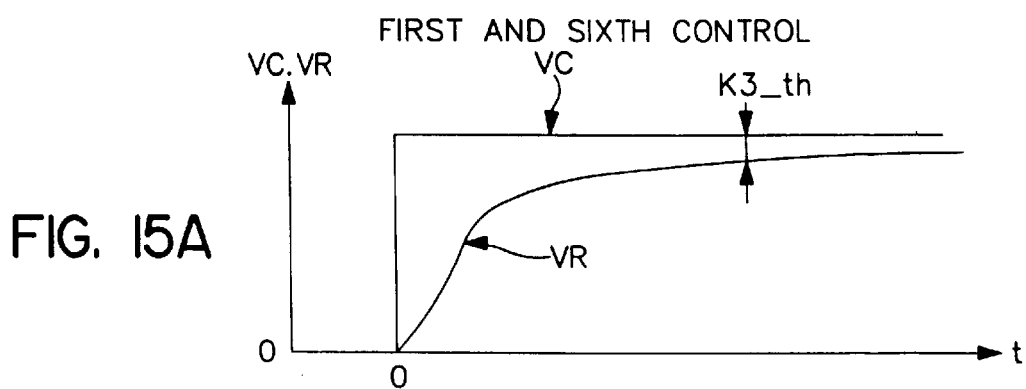
FIGS. 15A through 15C are graphs showing a control equation used in the vibration compensation control in accordance with the second preferred embodiment of the present invention.
Figure 15B:
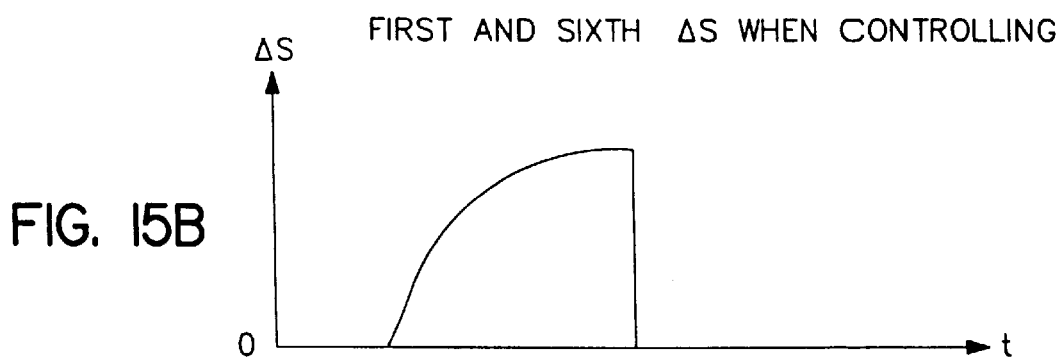
Figure 15C:
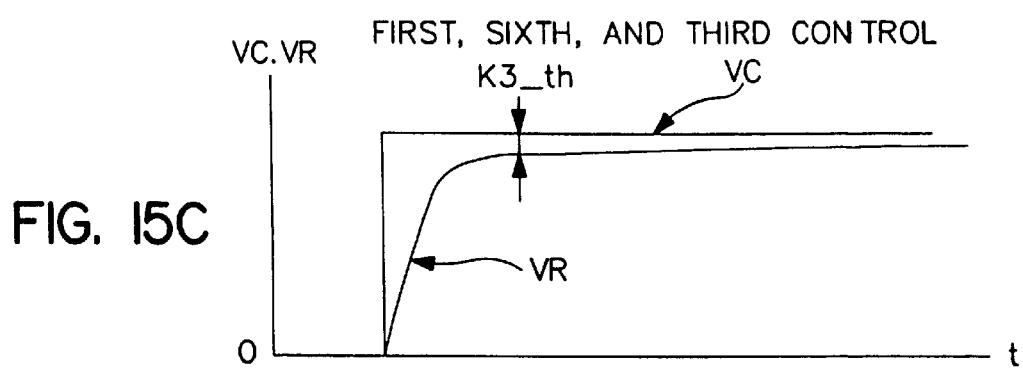

FIGS. 15A through 15C are graphs showing a control equation used in the vibration compensation control in accordance with the second preferred embodiment of the present invention. Step inputs are imparted to the vibration compensation lens target velocity VC, when control of the motor 104 has been started, using only the first and sixth terms of the Equation 14. The actual vibration compensation lens velocities VR is plotted, from a time t=0. The third term of Equation 14 primarily contributes to the improvement of the start-up characteristics.

FIG. 15A represents the vibration compensation lens velocity VR during start-up where the vibration compensation control is provided with only the first and sixth terms of Equation 14. When the absolute value of the velocity error ΔV is equal to or greater than the prescribed value K3_th, the velocity error ΔV is summated and the summation value taken as ΔS, as in Equation 18. When the absolute value of the velocity error ΔV is less than the prescribed value K3_th, the summation value ΔS is cleared, as in Equation 19.

$$\text{When } |\Delta V| \geq K3\_th, \ \Delta S = \Delta S + \Delta V \qquad \text{[Equation 18]}$$

$$\text{When } |\Delta V| < K3\_th, \ \Delta S = 0 \qquad \text{[Equation 19]}$$

FIG. 15B represents the summation value ΔS. It is assumed that ΔS=0 at the drive start time t=0.

FIG. 15C represents the case where the third-term control is added to the first term and the sixth term, or to the second term, giving a drive duty that is in response to the summation value ΔS of the velocity error. The start-up characteristic is improved as compared to the case where third-term control is not performed. When the velocity error ΔV decreases to some extent, the compensation quantity to the drive duty of the second term decreases in response thereto, and, where the external factors are large, a velocity error remains which cannot be disregarded. When K2 is increased in order to diminish the remaining velocity error, conversely, smooth vibration compensation control is inhibited due to vibration, etc. By adding the third term, and setting K3 and K3_th at suitable values, it is possible to reduce the velocity error, and to enable smooth vibration compensation control. Typically, K3 and K3_th are set at optimum values through experimentation.

Figure 16:
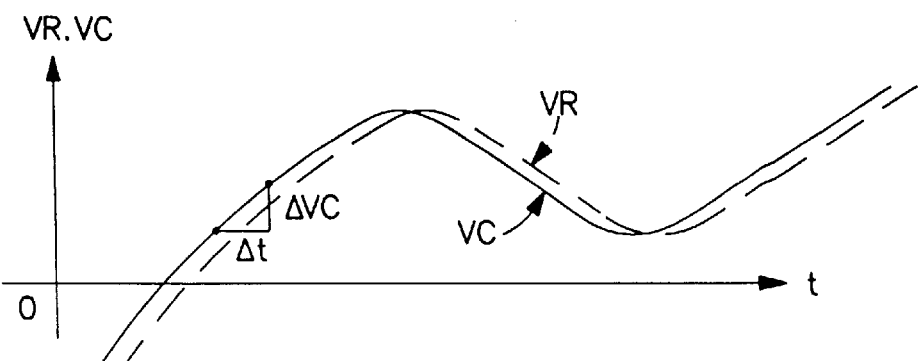
FIG. 16 is a graph showing a control equation used in the vibration compensation control in accordance with the second preferred embodiment of the present invention.

FIG. 16 is a graph showing a control equation used in the vibration compensation control in accordance with the second preferred embodiment of the present invention. Vibration compensation control can also be performed using the first, second, third, and sixth terms. In general, the response delays in the motor 104, the vibration compensation lens shifting system, and the vibration compensation control system, causes a minute time lag to develop in the vibration compensation lens position VR, as actually controlled, relative to the vibration compensation lens target velocity VC.

In order to compensate for the minute time lag, a compensation term based on the fourth term is added. The fourth term adds a time change quantity of the vibration compensation lens target velocity VC, that is, a drive duty that is in response to dVC/dt, which is the VC time differential value, to the first, second, third, and sixth terms. Here, there is no problem with approximating the time differential dVC/dt as the amount of change in the vibration compensation lens target velocity VC during the unit time Δt, as in Equation 20.

$$dVC/dt \approx \Delta VC/\Delta t = VC - VC' \qquad \text{[Equation 20]}$$

VC' is the vibration compensation lens target velocity at a time Δt prior to the VC at the current time. Furthermore, the coefficient K4 for the fourth compensation term may be derived from the delay in the vibration compensation control system, or, alternatively, an optimum value may be determined experimentally.

Even when vibration compensation control is performed using the first, second, third, fourth, and sixth terms, a minute velocity error ΔV remains. When the exposure time is short, the error can be disregarded, but when the exposure time is long, the velocity error ΔV accumulates until a large positional error is produced. The fifth term of Equation 14 provides compensations based on the position error. The vibration compensation lesn position error is ΔL, and can be calculated by the following two methods. In the first method, the vibration compensation lens target velocity VC is integrated, or, alternatively, summated from the prescribed timing (usually the start of vibration compensation control), and the vibration compensation lens target position LC is calculated by Equation 21.

$$LC = \int VC\,dt \approx \Sigma VC \qquad \text{[Equation 21]}$$

Next, the position error ΔL is calculated using Equation 22 from the difference between the calculated vibration compensation lens target position LC and the actual vibration compensation lens position LR.

$$\Delta L = LC - LR \qquad \text{[Equation 22]}$$

In the second method, the velocity difference ΔV is integrated, or, alternatively, summated from the prescribed timing, and the position error ΔL is calculated from. Equation 23.

$$\Delta L = \int \Delta V\,dt \approx \Sigma \Delta V \qquad \text{[Equation 23]}$$

The fifth term adds a drive duty, in response to the position error as calculated by one of the two methods noted above, to the first, second, third, fourth, and sixth terms. Furthermore, the optimum value of the coefficient K5 is determined experimentally so that the position error ΔL is small and the vibration compensation control becomes smooth.

As stated above, the coefficients K1, K2, K3_th, K4, K5, and Doffset in the Equation 14 are set by experiment, but, they may be continually reset, by doing additional experiments, etc., using the Equation 14. This allows the overall vibration compensation lens velocity error ΔV, or, alternatively, the vibration compensation lens position error ΔL, to be reduced.

Figure 17:
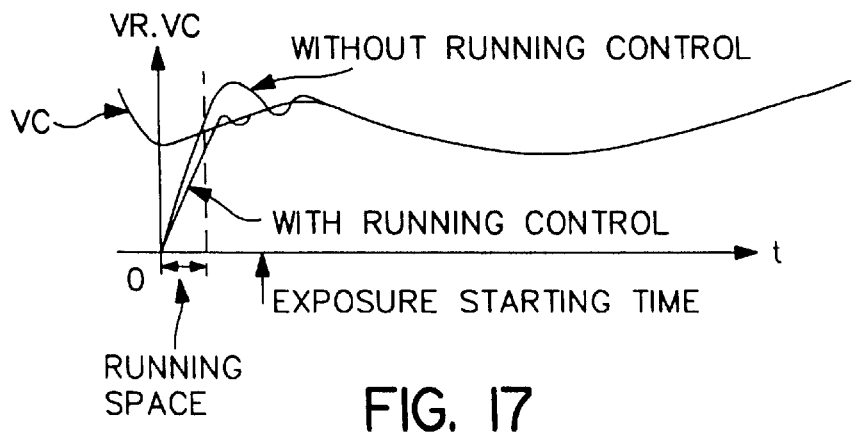
FIG. 17 is a graph showing the aided-running vibration compensation control used in the vibration compensation control in accordance with the second preferred embodiment of the present invention.

FIG. 17 is a graph showing the aided-running vibration compensation control used in the vibration compensation control in accordance with the second preferred embodiment of the present invention. In cases where a vibration compensation lens target velocity VC, such as represented in FIG. 17, is imparted, when vibration compensation control has been started from t=0, the velocity error ΔV, as in Equation 14, for the initial stage of vibration compensation control start is large due to the start-up time constant for the motor 104 or the vibration compensation mechanical system. While ΔV is large, ΔL will increase, and the fifth term of Equation 14 will also become large. Immediately after the drive is started, the vibration compensation control will exhibit overshoot or, alternatively, show a tendency to oscillate, and it will take some time for the vibration compensation control to stabilize.

The being the case, for a prescribed time from vibration compensation control start, the running space indicated in FIG. 17, the fifth term is set to 0, or alternatively. ΔL is set to 0. The fifth-term compensation may also be eliminated. This prevents overshooting and oscillation during vibration compensation control start, and the time required for stabilizing the vibration compensation control is shortened, as indicated in FIG. 17. An example of vibration compensation control without aided running vibration compensation control is also shown in FIG. 17. Preferably, the aided running zone terminates before the exposure timing, or alternatively the exposure is timed to start after the vibration compensation control has stabilized.

Next the control method for driving the vibration compensation lens 113 to a center position LS of the shift range of the vibration compensation lens 113 prior to the exposure process will be described. A vibration compensation lens target velocity must be calculated. This is done in a timer interrupt process that is performed at prescribed time intervals.

First it is assumed that the vibration compensation lens target velocity VC is related to the difference between the vibration compensation lens position LR, detected by the lens position detection circuit 103, and the center position LS, to which a prescribed velocity Voffset has been added, resulting in Equation 24.

$$VC = K10 \times (LS - LR) + Voffset \quad \text{[Equation 24]}$$

Furthermore, a prescribed limit velocity VC_C is selected such that $VC \leq VC_{13}$ C for the value calculated in Equation 24. Here, when VC is set larger than a certain value, the vibration compensation lens velocity VC can be found from the Equation 24. In such a case the drive duty may be found from the Equation 25, or a control equation with the third term, or, alternatively, by deleting the fourth term of Equation 25. The limit velocity VC_C has a limited range of, for example, 100% to –100%. Moreover, depending on how the controlling VC_C is set, it is also possible to select a value such that the vibration compensation lens velocity VR range has no limits, as actually controlled.

Next, a drive duty is calculated for the vibration compensation lens target velocity VC. First, until the vibration compensation lens position LR reaches a prescribed value Lstop for the center position LS, the motor 104 is driven with the drive duty calculated by Equation 25.

$$drive\ duty = K1 \times VC + K2 \times \Delta V + K3 \times \Delta S + K4 \times dVC/d \pm K\ Doffset \quad \text{[Equation 25]}$$

Equation 25 is a control equation similar to Equation 14, but having the fifth term removed. Each of the coefficients K1, K2, K3, K4, and Doffset are determined with a setting value as in the explanation for Equation 14. Alternatively, the same values that were set in Equation 14, and the ΔS integration start may be used. Further, a summation start timing is made the centering drive start timing. The computation may be simplified by using the Equation 14 having the third term, or fourth term deleted.

Next, the drive duty is checked for the event that the vibration compensation lens position LR is beyond a prescribed value Lstop of the center position LS using Equation 26. If the vibration compensation lens position LR is beyond a prescribed value Lstop of the center position LS, the motor 104 enters a short-break state.

$$Drive\ duty = 0 \quad \text{[Equation 26]}$$

Figure 18:
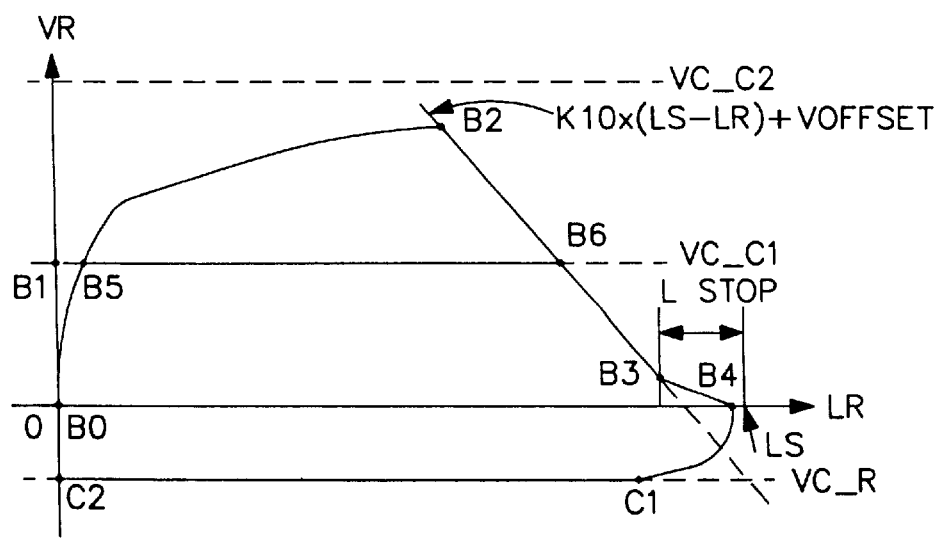
FIG. 18 is a graph of the centering control and the reset control for a vibration compensation lens in accordance with the second preferred embodiment of the present invention.

FIG. 18 is a graph showing the centering control and the reset control for the correcting lens 113 in accordance with the second preferred embodiment of the present invention. FIG. 18 specifically shows a relationship between the actual vibration compensation lens velocity LR and the vibration compensation lens position LR. The initial position of the vibration compensation lens 113 is at a reset position B0. When the vibration compensation lens 113 is at the reset position B0 the value of the vibration compensation lens position LR is 0.

In the case where the limit velocity VC_C is set at VC_C1 as in FIG. 18, firstly, the vibration compensation lens centering drive will begin from B0, and an attempt is made to bring the vibration compensation lens up to the vibration compensation lens target velocity VC. But, because of the time constants inherent in the vibration compensation control system, the vibration compensation lens velocity VR will only gradually increase, reaching B5. When the vibration compensation lens velocity VR reaches B5, the vibration compensation lens target velocity VC has not exceeded the preset limit value VC_C1, so a limit is imposed on the vibration compensation lens target velocity VC. Between B5 and B6, the vibration compensation lens target velocity becomes VC_C1, during which time the vibration compensation lens 113 will be kept at this set velocity. From B6 to B3, before the Lstop of the center position LS, the vibration compensation lens target velocity VC gradually decreases along the dotted line calculated with the Equation 24. After B3 the drive duty is set to 0, or, alternatively, the motor 104 is put into the short-brake state. Thereafter, the vibration compensation lens 113 finally stops at B4 in the vicinity of the center position LS.

Where the limit velocity VC_C has been set to VC_C2, the vibration compensation lens centering drive is started from B0, and an attempt is made to control the vibration compensation lens to the calculated vibration compensation lens target velocity VC, but because of the time constants inherent in the vibration compensation control system, the vibration compensation lens velocity VR gradually increases, reaching B5. Even after reaching B5, the vibration compensation lens velocity VR continues to increase unabated, until it reaches B2. Between B2 and B3, before the Lstop of the center position LS, the vibration compensation lens velocity VC is calculated using the Equation 14, producing a straight line by which the vibration compensation lens 113 is controlled. As the vibration compensation lens 113 approaches the center position LS, the vibration compensation lens velocity VR gradually decreases. At B3 the drive duty is set to 0, or, alternatively, the motor 104 is put into the short-brake state, and the vibration compensation lens 13 finally stops at B4 in the vicinity of the center position LS.

The control method which is used to drive the vibration compensation lens 113 to the reset position at one end of the shift range of the vibration compensation lens will be described next. The reset position is that position where the vibration compensation lens position LR is 0. Typically, the vibration compensation lens 113 is reset prior to the exposure process during a timer interrupt process that is performed at prescribed time intervals.

First, the vibration compensation lens target velocity VC is set to a prescribed constant velocity VC_R using Equation 27.

$$VC=VC\_R$$

VC_R is normally set to a negative value when the reset position B0 is taken as the vibration compensation lens position LR=0, and the direction of the center position LS is made a positive coordinate axis.

Next, the drive duty is calculated, using the Equation 25, for the vibration compensation lens target velocity VC previously calculated, and the motor 104 is controlled. Then, when the vibration compensation lens 113 stops at the reset position, the vibration compensation lens reset process terminates. Equation 25 is a control equation similar to Equation 14 in which the fifth term has been deleted. The coefficients K1, K2, K3, K4, and Doffset, are either determined in the same way as previously explained with respect to Equation 14, or the same values are used as were used in Equation 14 during vibration compensation control. The $\Delta S$ integration start or, alternatively, summation start timing is made the limit drive start timing. It is also possible to simplify Equation 25 by using a control formula in which either the third term or the fourth term has been deleted.

FIG. 18 can also be used to explain the relationship between the actual vibration compensation lens velocity VR and the vibration compensation lens position LR. By way of example, it will be assumed that the position of the vibration compensation lens 113, prior to performing the reset process, is B4. When the vibration lens reset drive starts from B4, an attempt is made to bring the vibration compensation lens 113 to the preset vibration compensation lens target velocity VC_R, but, due to the inherent time constants of the vibration compensation control system, the vibration compensation lens velocity VR gradually increases until it reaches C1. Between C1 and C2 the vibration compensation lens velocity VR is kept at the preset the target velocity VC_R. At C2, the vibration compensation lens 113 has reached the reset position, and the vibration compensation lens reset control is completed. That the reset position has been reached can be verified in that, at C2 the vibration compensation lens velocity VR precipitously decreases to 0, thus the vibration compensation lens velocity VR is at or below the prescribed value.

In the foregoing, when performing vibration compensation control at exposure time, vibration compensation lens centering control, or vibration compensation lens reset control, is performed with either Equation 14 or Equation 25, or, alternatively, with a control equation, in which the third term or the fourth term has been deleted from Equation 25. However, external factors, such as the effects of battery voltage fluctuation or of fluctuation in the vibration compensation lens shifting system, can seriously affect the control of the vibration compensation lens 113. A method of detecting the effect of external factors and flexibly varying the control coefficient K1 is described hereinafter.

A first method of detecting the effect of external factors and flexibly varying the control coefficient K1 is accomplished by making the coefficient K1 variable based on the residual capacity of the battery, as detected by the battery checking circuit 116, or based on the battery check voltage (BC voltage) which indicates the power supplying capability of the battery. Equation 28 is used to vary K1 as a function of the BC voltage. Alternatively, Equation 28 can be simplified (or approximated) by using Equation 29.

$$K1=f(BC\ voltage) \quad \text{[Equation 28]}$$

$$K1=Kbc/(BC\ voltage) \quad \text{[Equation 29]}$$

When the BC voltage is large, or, in other words, when either the residual capacity of the battery or the power supplying capability is large, K1 becomes small, so that, in the first term of the Equations 14 or 25, or, alternatively, in the control equation in which either the third term or the fourth term has been deleted from the Equation 25, the drive duty ratio becomes small relative to the vibration compensation lens target velocity VC. This compensates for the increase in the velocity of the vibration compensation lens 113. Conversely, when the BC voltage is small, caused either by the residual capacity of the battery or the power supplying capability being reduced, K1 is increased, and the first term of Equations 14 or 25, or, alternatively, in a control equation in which either the third term or the fourth term has been deleted from Equation 25, the drive duty ratio for the vibration compensation lens target velocity VC is increased. This compensates for the decrease in the vibration compensation lens velocity. The optimum value for the coefficient Kbc is determined by experimentation.

Figure 19:
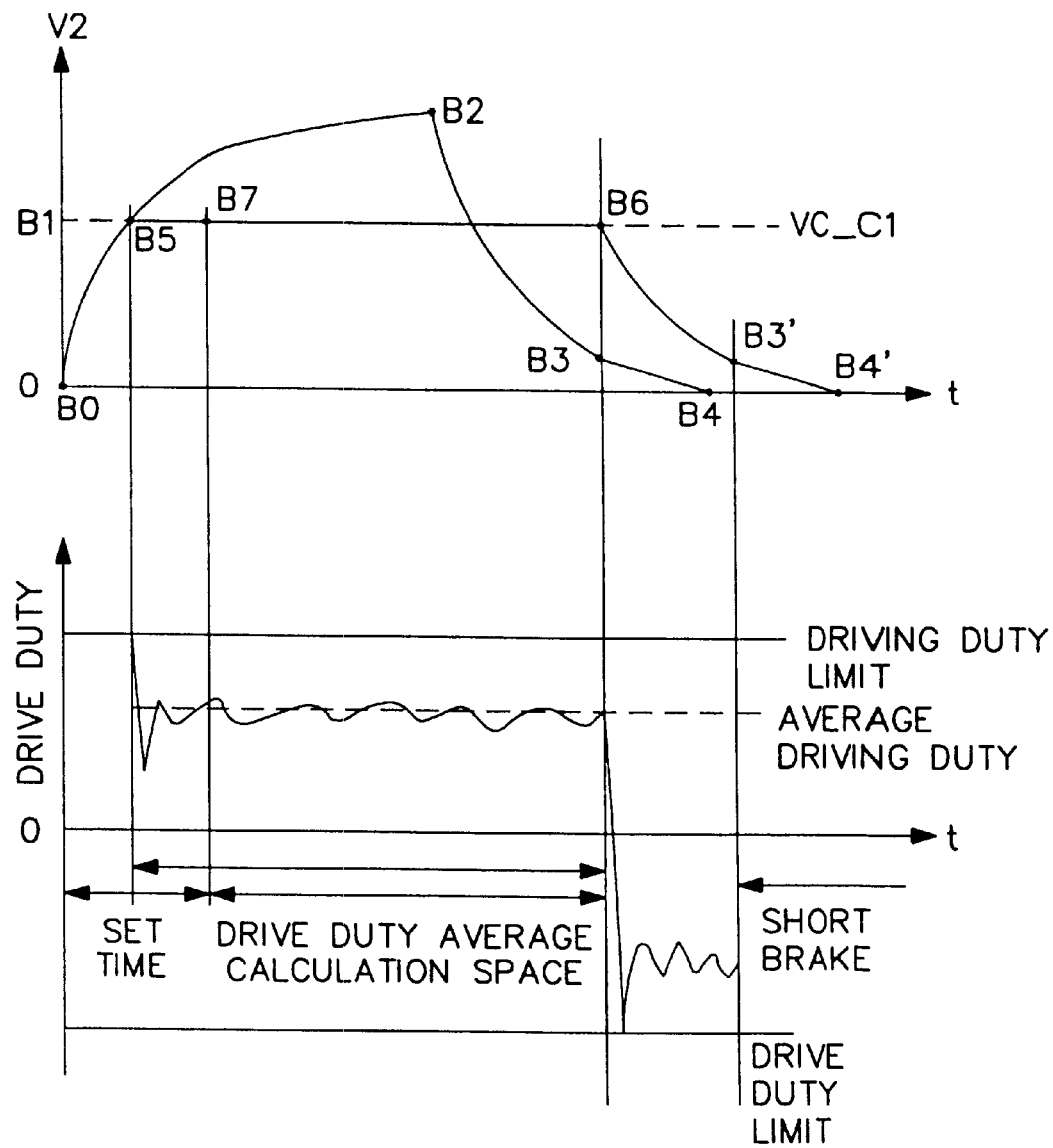
FIG. 19 is a graph showing the detection of the maximum lens velocity during the centering control of the vibration compensation lens, and an average drive duty calculation, in accordance with the second preferred embodiment of the present invention.

FIG. 19 is a graph showing the detection of the maximum lens velocity during the centering control of the correcting lens, and an average drive duty calculation, during the vibration compensation lens centering process. A second method of detecting the effect of external factors and flexibly varying the control coefficient K1 may be used during the vibration compensation lens centering process, in which the velocity limit setting value VC_C is set so that no limit impinges on the velocity. With the method, either steps are taken to set the velocity limit VC_C to VC_C2, as in FIG. 18, or, alternatively, no velocity limit is set. Thereafter, the maximum value of the vibration compensation lens velocity VR, during the vibration compensation lens centering process is detected and set as VRmax. The coefficient K1 can be found either by Equation 31 or by the simplified Equation 32.

$$K1=f(VRmax) \quad \text{[Equation 31]}$$

$$K1=Kmax/VRmax$$

The optimum value of the coefficient Kmax is determined by experimentation.

In FIG. 19, the relationship between the vibration compensation lens velocity VR and the vibration compensation lens position LR during the centering control, as represented in FIG. 18, is plotted against the time t. When the vibration compensation lens centering control is started at t=0, the vibration compensation lens velocity VR increases from B0 toward B5, and, ultimately, the vibration compensation lens velocity VR reaches a maximum value at B2, where, in FIG. 18 the dotted line, calculated by Equation 24, extends. The control coefficient K1 is calculated from the maximum value VRmax by as previously described.

In accordance with a third method of detecting the effect of external factors and flexibly varying the control coefficient K1, suitable for use during the vibration compensation lens centering process, the velocity limit setting value VC_C is set so that no limit impinges on the velocity. First, the velocity limit VC_C is set to VC_C1, as in FIG. 18. When the vibration compensation lens centering process is performed, the velocity limit is applied, and the average value of the drive duty for the period in which the vibration compensation lens velocity VR is controlled by the velocity limit value VC_C. If VC_C is taken as Dave, the control coefficient K1 can be found by either Equation 33 or simplified Equation 34.

$$K1=f(Dave) \qquad \text{[Equation 33]}$$

$$K1=Kave \times Dave \qquad \text{[Equation 34]}$$

Also, Equation 35, in which the parameter VC_C has been added, may be used.

$$K1=Kave' \times Dave/VC\_C \qquad \text{[Equation 35]}$$

The optimum value of the coefficients Kave and Kave' are determined by experimentation. In the interval when the drive duty average value is calculated (called constant-velocity domain), it is necessary for the vibration compensation lens velocity VR to be kept at the preset velocity limit value VC_C. The average drive duty between two points may be calculated, as between two subsequent prescribed time periods, or from the prescribed time period to B6, in FIG. 18.

B6, in FIG. 19, can be detected by verifying that the vibration compensation lens target velocity VC, calculated in Equation 24, is equal to or less than VC_C, see FIG. 19. When the vibration compensation lens centering control is started at t=0, the vibration compensation lens velocity VR increases from B0 toward B5, and, during the interval from B5 to B6, the vibration compensation lens is maintained so as to be equal to the limit velocity VC_C (VC_C1 in FIG. 19). B6 is the point at which the dotted line, calculated by Equation 24, as indicated in FIG. 18, and the limit velocity VC_C intersect (B6 in FIG. 19). Thereafter, the vibration compensation lens 113 is driven at the velocity calculated in Equation 24, as explained above. Between B5 and B6, the drive duty in the constant-velocity domain is shown by the lower portion of FIG. 19. The average value of the drive duty is calculated in the constant-velocity domain in the interval from B5 to B6. Alternatively, the average drive duty may be calculated from the interval from B7, after the prescribed time period from the control start (in which case the prescribed time period is set so to the constant-velocity domain at the B7 point) to B6. Thereafter, the control coefficient K1 is calculated as set forth above.

During either vibration compensation lens centering control or vibration compensation lens reset control, the velocity control may be incorrectly performed, causing the vibration compensation lens 113 to attempt to move outside of the available shift range, thereby damaging the vibration compensation device. Alternatively, during vibration compensation lens reset control, the vibration compensation lens 113 may continue to be driven, even after the reset position is reached. If a large force acts on the mechanism of the vibration compensation lens shifting system through the motor 104, the vibration compensation device may be damaged. To prevent such damage during vibration compensation lens centering control and vibration compensation lens limit control, steps are taken to provide a limit to the drive duty.

However, when the residual capacity of the battery or the power supplying capability is low, or, alternatively, when the movement of the mechanism of the vibration compensation lens shifting system is poor, it is possible that the limit value of the drive duty will be so small that the vibration compensation lens does not move at all. In order to avoid this, the drive duty limit value can be controlled to vary in response to the BC voltage. During reset control, the VRmax detected during centering control or the value of Dave may be used to calculate the duty limit value. Furthermore, the control coefficient K1, calculated according to the value of VRmax or Dave, may be used to calculate the drive duty limit value. Equations 36 through 38 may be used to calculate the drive duty limit value when using the BC voltage, or, alternatively, K1 calculated by the BC voltage.

$$\text{Drive duty limit value}=f(BC\ voltage) \qquad \text{[Equation 36]}$$

$$\text{Drive duty limit value}=K11/(BC\ voltage) \qquad \text{[Equation 37]}$$

$$\text{Drive duty limit value}=K11' \times K1 \qquad \text{[Equation 38]}$$

Equations 39 through 41 may be used to calculate the drive duty limit value when using VRmax, or K1 calculated by VRmax.

$$\text{Drive duty limit value}=f(VRmax) \qquad \text{[Equation 39]}$$

$$\text{Drive duty limit value}=K12/VRmax \qquad \text{[Equation 40]}$$

$$\text{Drive duty limit value}=K12' \times K1 \qquad \text{[Equation 41]}$$

Equations 42 through 44 may be used to calculate the drive duty limit value when using Dave, or K1 calculated by Dave.

$$\text{Drive duty limit value}=f(Dave) \qquad \text{[Equation 42]}$$

$$\text{Drive duty limit value}=K13 \times Dave \qquad \text{[Equation 43]}$$

$$\text{Drive duty limit value}=K13' \times K1 \qquad \text{[Equation 44]}$$

As the upper limit on the drive duty is 100%, the settings for the drive duty limit value extend up to 100%. The values of the coefficients K11, K11', K12, K12', K13, and K13' are selected such that the mechanism of the vibration compensation lens shifting system is not damaged, and so that the vibration compensation lens 113 can be operated.

When, for some reason, during vibration compensation lens centering control or, vibration compensation lens reset control, the velocity is controlled incorrectly, the vibration compensation lens 113 sometimes strikes the end of the vibration compensation lens control so that the vibration compensation lens shifting system is damaged. In accordance with the second preferred embodiment of the present invention, such abnormalities are detected during vibration compensation lens centering control and vibration compensation lens reset control, and, when an abnormality is detected, control is interrupted, thereby preventing damage to the mechanism of the vibration compensation lens shifting system before the fact. In addition, vibration compensation control during exposure can be suspended if a problem occurs during vibration compensation lens centering control and vibration compensation lens reset control.

One method of detecting abnormalities during vibration compensation lens centering control and vibration compensation lens reset control, is to detect when the control has not terminated even though control has been performed for the prescribed period of time. This is termed a time-up abnormality.

A second method of detecting abnormalities during vibration compensation lens centering control is to monitor the maximum value VRmax of the vibration compensation lens velocity VR. When VRmax is less than a prescribed value, it can be assumed that either that the movement of the vibration compensation lens 113 is poor, or that it is stuck. This is termed a vibration compensation lens movement abnormality.

A third method of detecting abnormalities during vibration compensation lens centering control is to monitor the minimum value VRmin of the vibration compensation lens velocity VR. When VRmin is less than a prescribed value, it can be assumed that there is something wrong with the detection of the vibration compensation lens position detection circuit 103. This is termed a vibration compensation lens position detection abnormality. In cases where the vibration compensation lens 113 has a positive direction to the center position LS, it is driven in a positive direction during centering control, so the vibration compensation lens velocity VR cannot have a negative value. However, at the time of centering control start, or immediately prior to the termination of centering control, a negative velocity is occasionally detected. Thus, the prescribed value used to detect abnormalities using VRmin needs to be selected with this behavior in mind. Alternatively, a wait period can be provided, so that the abnormality detection occurs after these periods.

Figure 20:
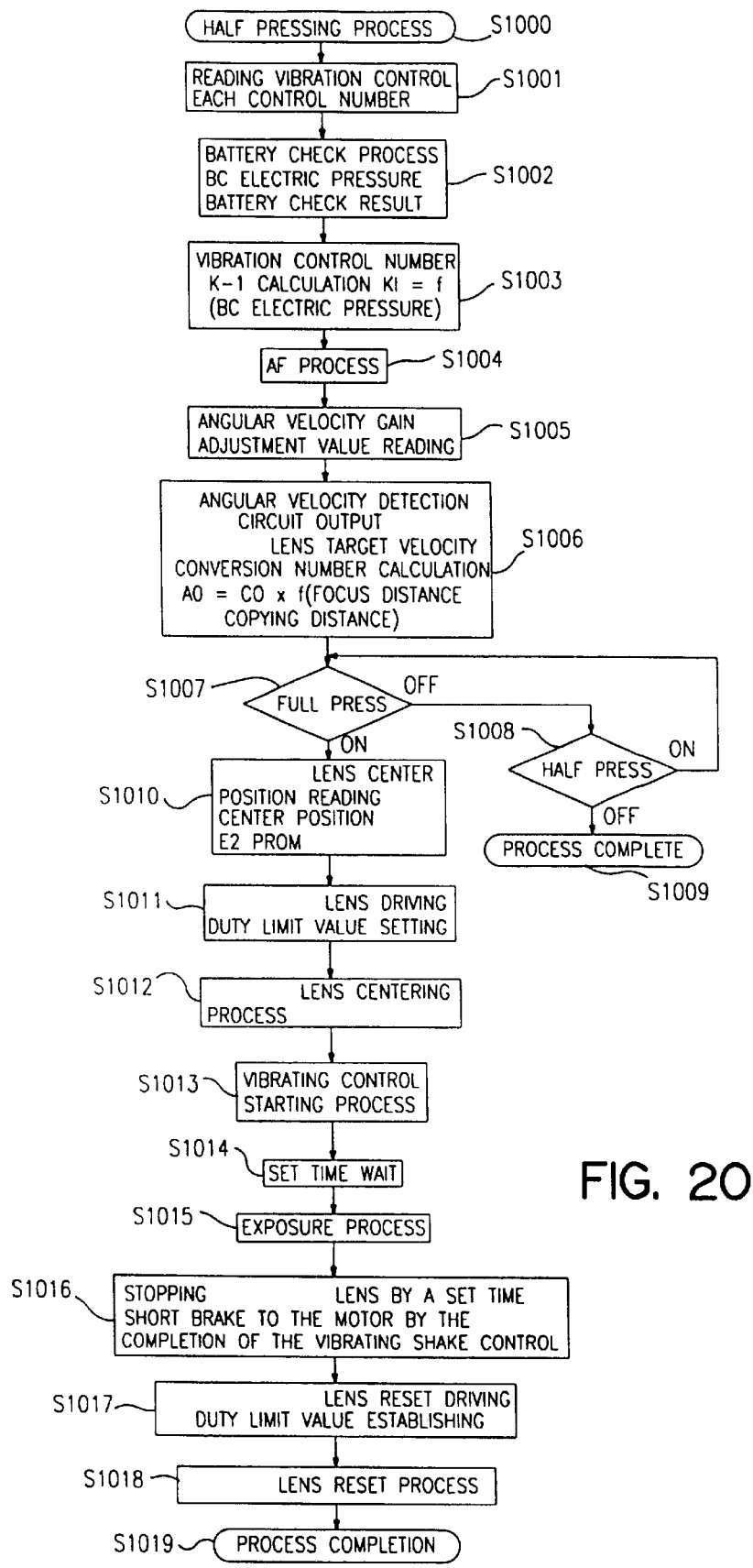
FIG. 20 is a flow chart showing the flow of a half pressing process in accordance with the second preferred embodiment of the present invention.

FIG. 20 is a flow chart showing the flow of a half pressing process in accordance with the second preferred embodiment of the present invention. When the half pressing switch is turned ON, processing is started in the CPU 119. The processing is begun from step S1000, and in step S1001 the coefficients, i.e., control numbers, used in vibration compensation control, namely K2, K3, K3_th, K4, K5, Doffset, K10, Kbc, Kmax, Kave, Kave', K11, K11', K12, K12', K13, and K13' are read from the $E^2$PROM.

Preferably, the coefficients have values which are optimized according to the characteristics of the vibration compensation lens shifting system or, alternatively, the motor 104. However, in the event that these characteristics change, control precision cannot be preserved unless matching changes are made to the coefficients. For example, when adjustments are made in each individual product during development, and, after products have been mass-produced, there may be modifications made in the vibration compensation lens shifting system or in the motor 104.

Next, in step S1002, the BC voltage is detected by the battery checking circuit 106, and in step S1003 the BC vibration compensation control coefficient K1 is calculated using Equation 28 or Equation 29. Next, in step S1004, a distance-measuring process (AF processing) is performed by the distance-measuring circuit 107. Thereafter, in step S1005, the angular velocity gain adjustment value is read from the $E^2$PROM and set as G0.

In step S1006, the distance to the subject obtained in step S1004 and G0 set in step S1005, along with the current focal length of the photographic optical system, detected by the zoom position detection circuit 108, are used to calculate the angular velocity detection circuit output-vibration compensation lens target velocity conversion coefficient A0 using Equation 11 or Equation 12. Thereafter, in step S1007, a decision is made as to whether the full pressing switch is ON, in which case the process advances to step S1010, otherwise the process advances to step S1008. In step S1008 the half pressing switch is checked, if the half pressing switch is ON the process returns to step S1007, otherwise the process terminates in step S1009.

In step S1010, the center position LS adjustment value for the vibration compensation lens is read from the $E^2$PROM 110 and put into the center position LS, and the process advance to step S1011. Depending on the precision of the vibration compensation lens shifting system, and the precision with which the vibration compensation lens 113 is attached, the predetermined center position may not be the optimum position for photographic resolution. By writing adjustment values to the $E^2$PROMs, the vibration compensation lens 113 can be accurately driven to the point of optimum photographic resolution.

Figure 23:
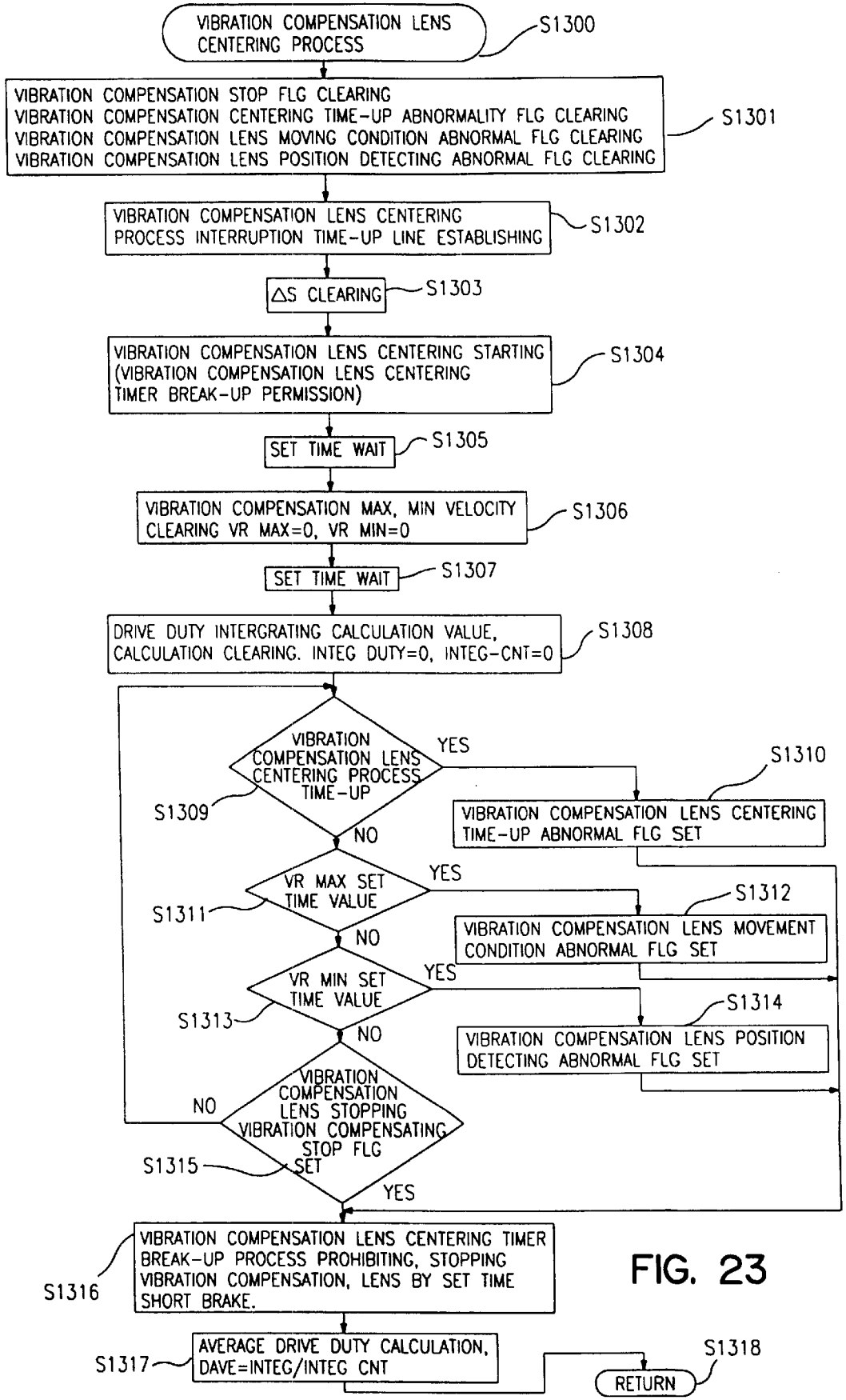
FIG. 23 is a flow chart showing the flow of the vibration compensation lens centering process in accordance with the second preferred embodiment of the present invention.
Figure 25:
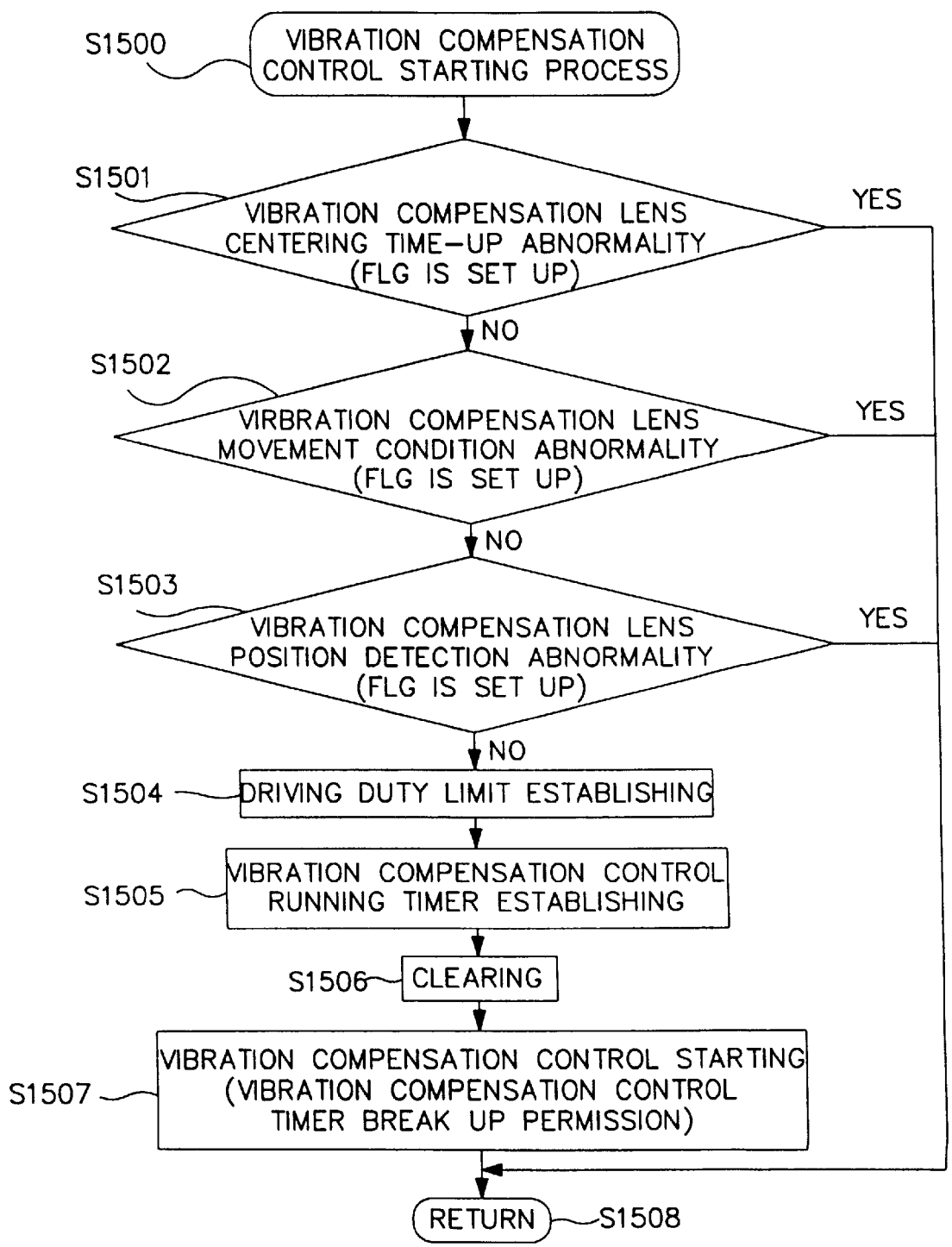
FIG. 25 is a flow chart showing the flow of the vibration compensation control starting process in accordance with the second preferred embodiment of the present invention.

Next, in step S1011, the limit value for the drive duty when performing the vibration compensation lens centering drive is set, and the process advances to S1012. In step S1011, the limit setting values for the drive duty are calculated using Equation 36, Equation 37 or Equation 38. In step S1012, the vibration compensation lens centering process, as set forth in FIG. 23, is performed, and the vibration compensation lens 113 is driven to the center position LS. In step S1013, the vibration compensation control start process, as set forth in FIG. 25, is performed, and the vibration compensation lens 113 is shifted, in response to the output detected by the angular velocity detection circuit 105, to cancel out the image plane shift resulting from the vibrations in the image plane.

Next in step S1014, the process waits a prescribed set time so that, prior to exposure, the vibration compensation control has been started, the aided running control has terminated, and the vibration compensation control is stabilized. In step S1015, the shutter circuit 109 is activated, and the exposure process is performed. Thereafter, in step S1016 the vibration compensation control, started in step S1014 is terminated, the motor 104 is placed in the short-break state for a prescribed time, and the vibration compensation lens 113 is stopped.

In step S1017, the limit value for the drive duty in the vibration compensation lens reset control is calculated, using Equation 36, Equation 37, or Equation 38, based on the BC voltage. Alternatively, when the limit velocity VC_C during centering control has been set to VC_C2, as in FIG. 18, so that no limit impinges on the vibration compensation lens velocity, the limit value for the drive duty in the vibration compensation lens reset control may be calculated using Equation 39, Equation 40, or Equation 41, based on Vrmax. Further, when the limit velocity VC_C during centering control is set to VC_C1, in FIG. 18, so that a limit does impinge on the vibration compensation lens velocity, the limit value for the drive duty in the vibration compensation lens reset control may be calculated using Equation 42, Equation 43, or Equation 44, based on Dave. In step S1018, based on the drive duty limit value calculated in step S1017, the vibration compensation lens 113 is driven to the reset position using the vibration compensation lens reset process set forth in FIG. 24. Finally, in step S1019 the processing is terminated.

Figure 21:
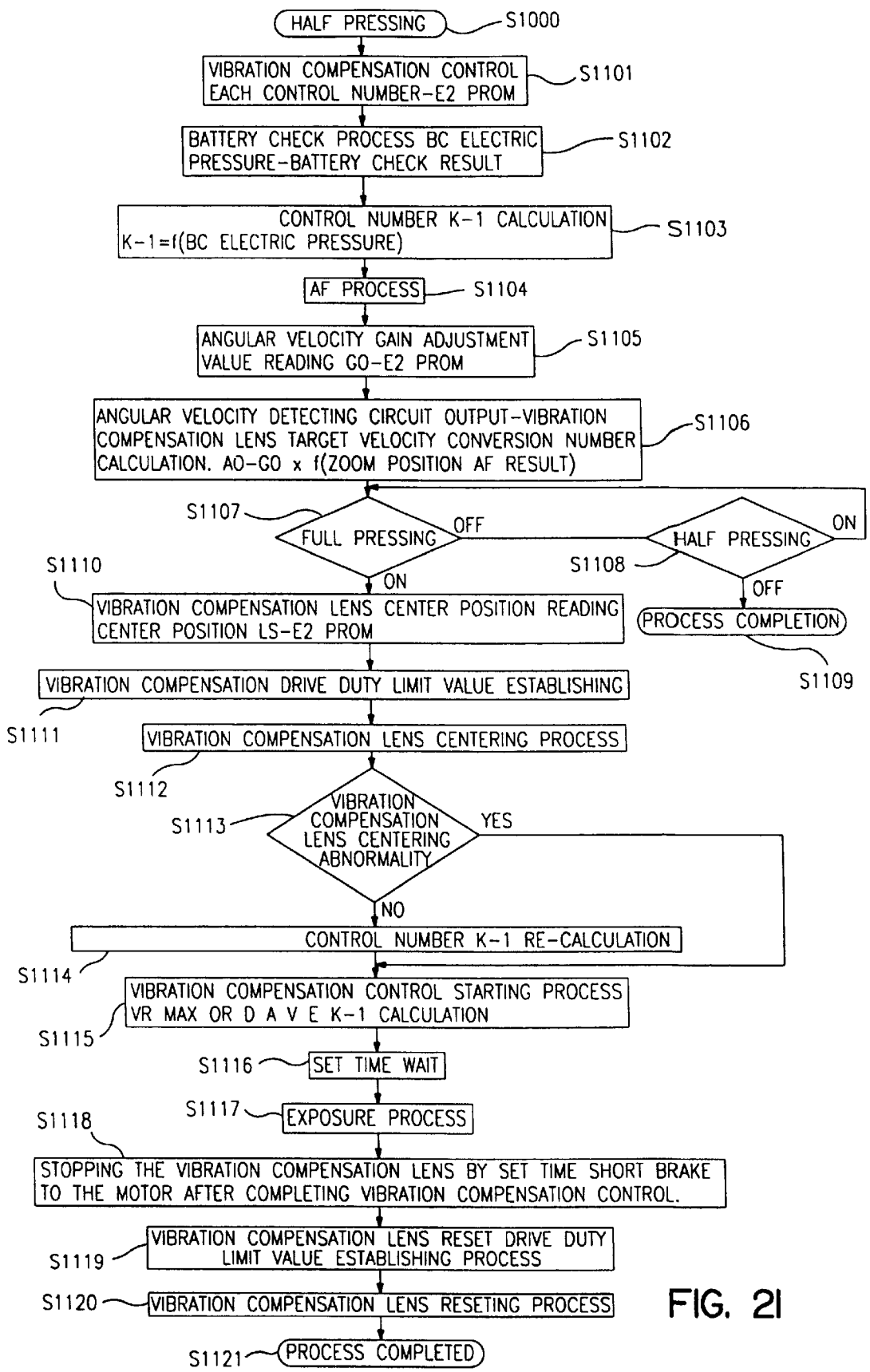
FIG. 21 is a flow chart showing the flow of another half pressing process in accordance with the second preferred embodiment of the present invention.

FIG. 21 is a flow chart showing the flow of another half pressing process in accordance with the second preferred embodiment of the present invention. Only those portions where FIG. 21 differs from FIG. 20 will be explained herein. The process proceeds as in FIG. 20 until step S1113. In step S1113 it is determined whether an abnormality occurred during the vibration compensation lens centering control performed in step S1112. When an abnormality has occurred, whether it is a time-up abnormality, a movement abnormality, or a vibration compensation lens position detection abnormality, the process advances to step S1115, otherwise the process advances to step S1114. In step S1114, when the limit velocity VC_C was set as indicated by VC_C2 in FIG. 18, so that no limit impinges on the vibration compensation lens velocity, the vibration compensation control coefficient K1 is recalculated using Equation 31 or Equation 32, based on Vrmax. Where the limit velocity VC_C is set as indicated by VC_C1 in FIG. 18, so that a limit does impinge on the vibration compensation lens velocity, the vibration compensation control coefficient K1 is recalculated using Equation 33, Equation 34, or Equation 35, based on Dave. When setting K1 with respect to the BC voltage, only fluctuations in the residual capacity of the battery or in the power supplying capability are considered in the calculation of K1, but if we use either Dave or Vrmax, derived during vibration compensation lens centering control, K1 takes into consideration such factors as fluctuations in the mechanism of the vibration compensation lens shifting system. Thus it is possible to calculate K1 with better precision, allowing precise and accurate control of the vibration compensation control processing which starts in step S1115. However, when an abnormality during the vibration compensation lens centering control is detected, there is a possibility that either VRmax or Dave is not set to an accurate value, and it is better not to recalculate K1on the basis of VRmax or Dave.

Figure 22:
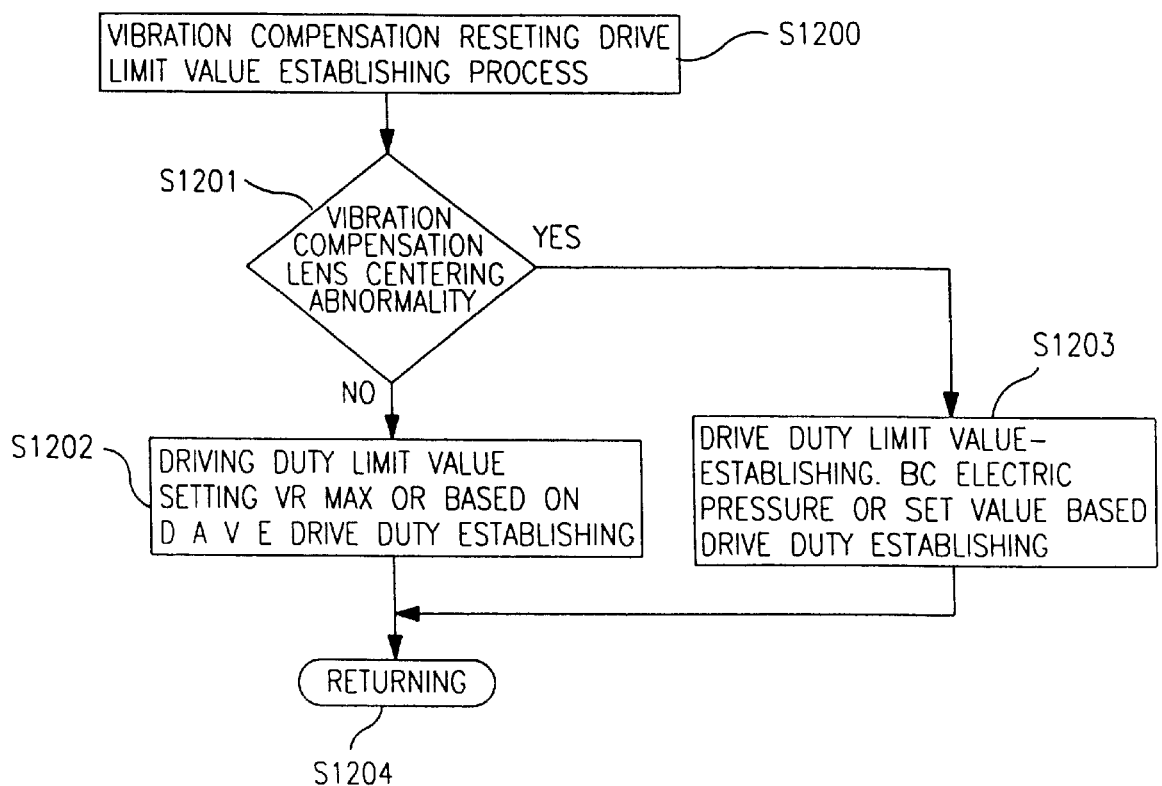
FIG. 22 is a flow chart showing the flow of the process which sets the drive duty limit value during the vibration compensation lens reset control in accordance with the second preferred embodiment of the present invention.

FIG. 22 is a flow chart showing the flow of the process used in step S1119 in FIG. 21, which sets the drive duty limit value during the vibration compensation lens reset control in accordance with the second preferred embodiment of the present invention. In step S1119 the drive duty limit value for the vibration compensation lens reset control is set prior to performing vibration compensation lens reset control in step S1120. The process is started in step S1200, and in step S1201 it is determined whether an abnormality was detected during the vibration compensation lens centering control. In the event that no abnormality was detected, the process advances to step S1202. In step S1202, if the limit velocity VC_C, set during centering control, was set as indicated by VC_C2 in FIG. 18, so that no limit impinges on the vibration compensation lens velocity, the drive duty limit value is calculated using Equation 39, Equation 40, or Equation 41, based on VRmax. If, on the other hand, the limit velocity VC_C, set during centering control, was set as indicated by VC_C1 in FIG. 18, so that a limit does impinge on the vibration compensation lens velocity, the drive duty limit value is calculated using Equation 42, Equation 43, or Equation 44, based on Dave.

If, in step S1202, an abnormality was detected, the process proceeds to step S1203 and the drive duty limit value is determined by Equation 36 or Equation 37, or, alternatively, a predetermined prescribed value based on the BC voltage.

Thus, when an abnormality is detected during the vibration compensation lens centering control, as there is a possibility that VRmax or Dave is not set to an accurate value, it is better not to calculate the drive limit duty based on VRmax or on Dave. In which case, the drive limit duty is determined by the BC voltage or, alternatively, by a predetermined prescribed value.

FIG. 23 is a flow chart showing the flow of the vibration compensation lens centering process in accordance with the second preferred embodiment of the present invention. The vibration compensation lens centering process set forth in FIG. 13 is called from step S1012 in FIG. 20 or from step S1112 in FIG. 21. The process begins in step S1300. First, in step S1301, the vibration compensation lens stop FLG is cleared, and the FLG(s) that are set when an abnormality is detected are cleared. Thereafter, in step S1302, the vibration compensation lens centering process interruption time-up time is set. Here, the setting time is always set so that the vibration compensation lens 113 is driven to the center position in the time period that has been set, so long as no abnormality has occurred since the centering control was started. In step S1303, ΔS is cleared. Next, in step S1304, the vibration compensation lens centering control is started by enabling the vibration compensation lens centering timer interrupt process as set forth in FIG. 28.

Next, in step S1305, a set amount time is waited, and in step S1306 the vibration compensation lens max velocity VRmax and the min velocity VRmin are cleared. The set time is waited to allow the lens position detection circuit 103 to start up properly. In general, changes in the position of the vibration compensation lens 113 are detected by counting the interrupter signal pulses. Because the interrupter signal is a discrete signal, when the vibration compensation lens velocity VR is detected from the number of pulses coming in during the prescribed period, or, alternatively, when the vibration compensation lens velocity VR is detected by the inverse of the period of the interrupter signal, during the initial stage when the vibration compensation lens centering control is started, an accurate value for the vibration compensation lens velocity VR cannot be detected. In fact, in some cases an impossibly large value is detected. Thus, even in cases where an interrupter is used, a prescribed time is waited after the centering control is started, and VRmax and VRmin are cleared after it has become possible to calculate an accurate vibration compensation lens velocity. Furthermore, the wait time in step S1305 is normally set from about 5 ms to 10 ms or more. VRmax and VRmin are the maximum and minimum values, respectively, for the vibration compensation lens velocity VR, and are detected in the vibration compensation lens centering timer interrupt process set forth in FIG. 28.

Next, in step S1307, there is a wait for a set length of time, and then, in step S1308, the drive duty summation value INTEG_DUTY and the drive duty summation count INTEG_CNT are cleared. Thereafter, the drive duty average value Dave is calculated based on the drive duty summation amount and the drive duty summation count, and the wait time for step S1307 is set so that the timing in step S1308 becomes the timing at B7 in FIG. 19. After the step S1308 timing, that is, after the B7 point in FIG. 19, the drive duty is summated at a prescribed time interval inside the vibration compensation lens centering timer interrupt process, described hereinafter. This value is placed in the drive duty summation amount INTEG_DUTY and, at the same time, the summation count therefor is placed in the drive duty summation count INTEG_CNT.

Next, in step S1309 the vibration compensation lens centering process break timer set in step S1302 is checked to determine if it has expired, that is, whether a prescribed amount of time has elapsed since the vibration compensation lens centering control was started. If the vibration compensation lens centering process break timer has expired, the process proceeds to step S1310 and the vibration compensation lens centering time-up abnormality FLG is set. Thereafter, the process advances to step S1316. Conversely, if the vibration compensation lens centering process break timer has not expired, the process advances to step S1311, and VRmax is checked to determine if it is below a prescribed value. If VRmax is less than the prescribed value, the process proceeds to step S1312 and the vibration compensation lens movement abnormality FLG is set. Thereafter, the process advances to step S1316.

When the movement of the vibration compensation lens 13 is poor, the maximum value VRmax of the vibration compensation lens velocity becomes a small value. Thus, in step S1311, the vibration compensation lens velocity VRmax is checked to determine if it is below the prescribed value. If VRmax is not below the prescribed value, the process advance to step S1313 and VRmin is checked to determine if it is below a prescribed value. If VRmin is below a prescribed value, the process advances to step 1314 and the vibration compensation lens position detection abnormality FLG is set. Thereafter, the process advances to step S1316.

If, in step S1313, there is an abnormality in the output from the lens position detection circuit 103, i.e., when the vibration compensation lens velocity VR is an abnormal value, such as an impossibly small value, the abnormal value is set to VRmin. VRmin is used in the S1313 to determine whether the vibration compensation lens velocity is below the prescribed value. If the vibration compensation lens velocity is not below the prescribed value, the process advances to step S1315, and it is determined whether the vibration compensation lens is stopped by looking at the vibration compensation lens stop FLG set when the vibration compensation lens position LR, set inside the vibration compensation lens centering timer interrupt process, has expired before the prescribed value Lstop of the center position LS (equivalent to point B3 in FIG. 18).

In step S1315, when the vibration compensation lens stop FLG has not been set, the process returns to S1309, and the above process is repeated until the vibration compensation lens stop FLG is set. When the vibration compensation lens stop FLG is set, the process advances to step S1316.

In step S1316, the vibration compensation lens centering timer interrupt process is disabled, the vibration compensation lens 113 is stopped by placing the motor 104 into the short-break state for a prescribed time. Thereafter, average drive duty Dave, over the interval from B7 to B6 in FIG. 19, is calculated, using Equation 46, based on the drive duty summation value INTEG_DUTY and the drive duty summation count INTEG_CNT set inside the vibration compensation lens centering timer interrupt process. The process terminates in step S1318.

$$Dave=INTEG\_DUTY/INTEG\_CNT \qquad \text{[Equation 46]}$$

Figure 24:
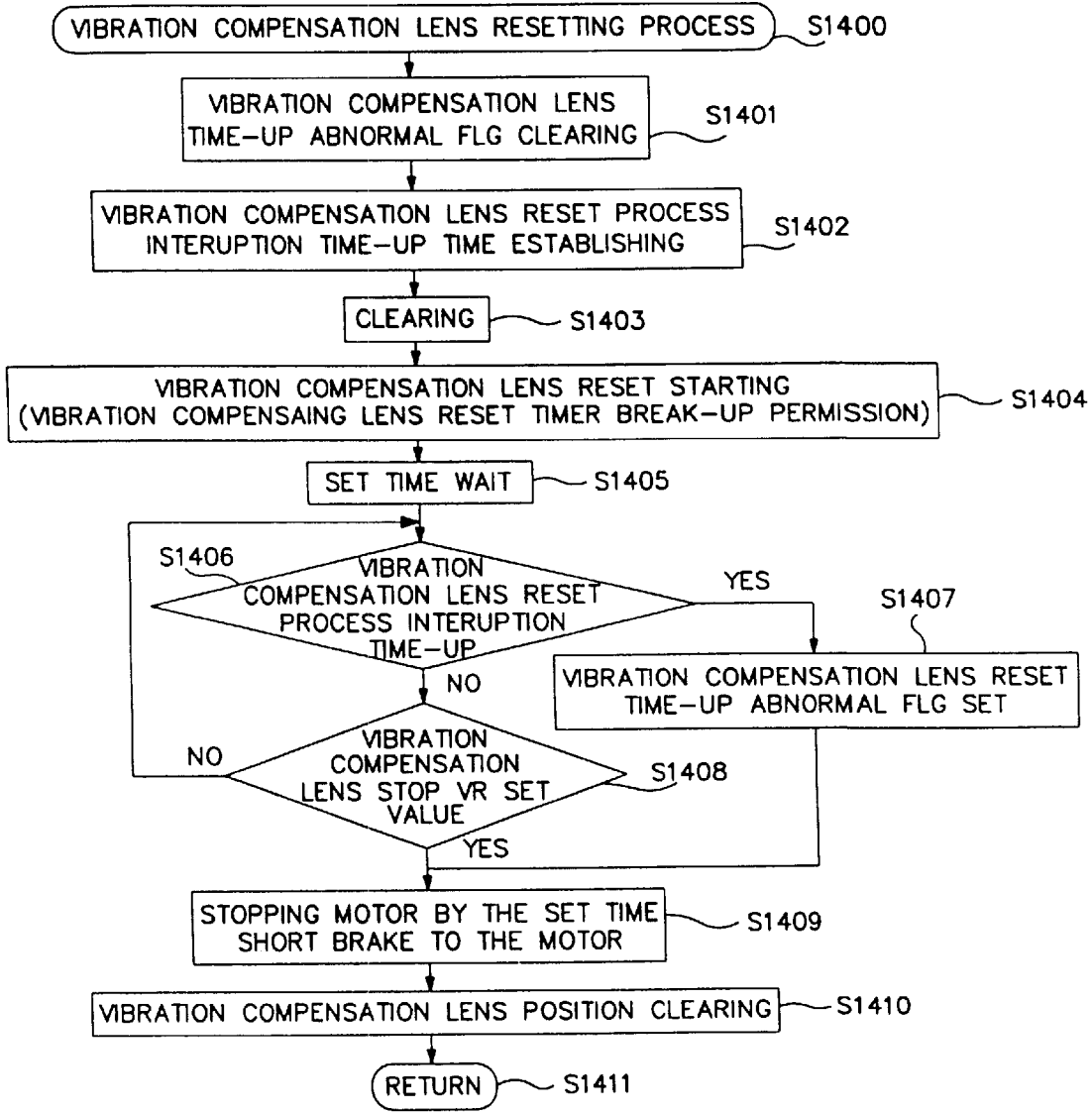
FIG. 24 is a flow chart showing the flow of the vibration compensation lens reset process in accordance with the second preferred embodiment of the present invention.

FIG. 24 is a flow chart showing the flow of the vibration compensation lens reset process in accordance with the second preferred embodiment of the present invention. The process detailed in FIG. 24 is called in step S1018 in FIG. 20, or, from step S1120 in FIG. 21. The process starts in step S1400. First, in step S1401, the vibration compensation lens reset time-up abnormality FLG is cleared, and in step S1402 the vibration compensation lens reset process break time-up time is set. The set time is selected such that the vibration compensation lens 13 can always be driven to the reset position in the time that has been set, so long as there is no abnormality. In step S1403, ΔS is cleared, and thereafter in step S1404, the vibration compensation lens reset control is started by enabling the vibration compensation lens reset timer interrupt process, as set forth in FIG. 27. Next, in step S1405, a prescribed time interval is waited.

Thereafter, in step S1406, a decision is made as to whether the vibration compensation lens reset process break timer set in step S1402 has expired, in which case the process advances to step S1407 and the vibration compensation lens reset time-up abnormality FLG is set. Thereafter, the process advances to step S1409. If, in step S1406 the vibration compensation lens reset process break timer has not elapsed, then the process advances to step S1408. In step S1408 a decision is made as to whether the vibration compensation lens velocity is at or below a prescribed value. If the vibration compensation lens velocity is above the prescribed value, then the process returns to S1406. If, in step S1408, the vibration compensation lens velocity is at or below the prescribed value, then the vibration compensation lens 113 has been driven to the reset position, the vibration compensation lens velocity has become a small value, and the process advances to step S1409.

In step S1409, the vibration compensation lens reset timer interrupt process is disabled, the motor 104 is put into the short-break state, and the vibration compensation lens 13 is stopped. Thereafter, in step S1410, the lens position detection circuit 3 is reset and the vibration compensation lens position output value is cleared. In step S1411 the process is terminated.

FIG. 25 is a flow chart showing the flow of the vibration compensation control starting process which is called from step S1013 in FIG. 20, or step S1115 in FIG. 21, in accordance with the second preferred embodiment of the present invention. The process starts the vibration compensation control that activates the vibration compensation lens 113 in response to the output of the angular velocity detection circuit 105 and thereby suppresses blur in the image plane. The process is started in step S1500. In step S1501, a vibration compensation lens centering time-up error FLG is checked. If the vibration compensation lens centering time-up error FLG is set, the process is terminated in step S1508, otherwise the process advances to step S1502. In step S1502, the vibration compensation lens movement abnormality FLG is checked. If the vibration compensation lens movement abnormality FLG is set, then the process is terminated in step S1508, otherwise the process proceeds to step S1503. In step S1503, the vibration compensation lens position detection abnormality FLG is checked. If the vibration compensation lens position detection abnormality FLG is set, the process is terminated in step S1508, otherwise the process advances to step S1504.

In step S1504, the drive duty limit value for the vibration compensation lens is set at the prescribed value. Thereafter, in step S1505 the vibration compensation control aided running timer is set. In step S1506 ΔS is cleared. Finally, in step S1507 the vibration compensation control is started by enabling the vibration compensation control timer interrupt process, and in step S1587 the process is terminated.

Thus, in steps S1501, S1502, and S1503, decisions are made as to whether any abnormalities were detected during the vibration compensation lens centering drive control, which is performed before the process was started. In the event that there was an abnormality, the process is terminated, and vibration compensation control is not performed.

Figure 26:
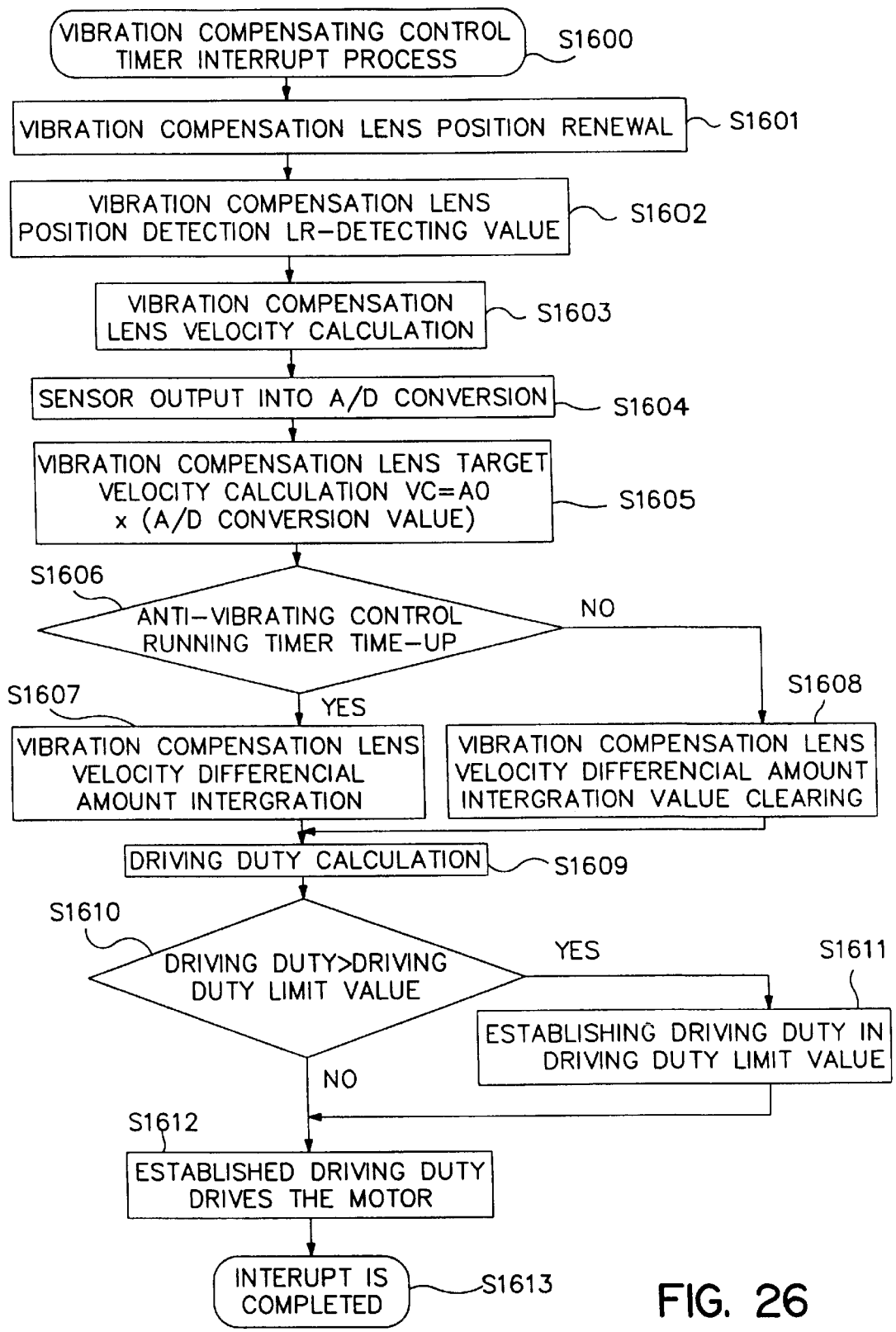
FIG. 26 is a flow chart showing the flow of the vibration compensation control timer interrupt process in accordance with the second preferred embodiment of the present invention.

FIG. 26 is a flow chart showing the flow of the vibration compensation control timer interrupt process in accordance with the second preferred embodiment of the present invention. The vibration compensation control timer interrupt process is a timer interrupt process which is carried out at a prescribed interval, for example a 1 ms interval. The process is started in step S1600. In step S1601, the vibration compensation lens position LR, set by the previous vibration compensation control timer interrupt process, is placed in LR'. In step S1602, the current vibration compensation lens position detected by the lens position detection circuit 103 is placed in LR. Next, in step S1603, the vibration compensation lens velocity VR is calculated, using Equation 45, by subtracting the previous vibration compensation lens position LR' from the most recent vibration compensation lens position LR.

$$VR=LR-LR' \qquad \text{[Equation 45]}$$

Next, in step S1604, the output from the angular velocity detection circuit 5 is A/D-converted. In step S1605, the vibration compensation lens target velocity VC is calculated, from the angular velocity detection circuit output-vibration compensation lens target velocity conversion coefficient A0, which was calculated using either Equation 11 or Equation 12, and the A/D-conversion value found in step S1604.

Thereafter, in step S1606, the vibration compensation control aided running timer, set in step S1505 in FIG. 25, is checked to determine if it has expired. If the vibration compensation control aided running timer has not expired, the process proceeds to step S1608 wherein the vibration compensation lens velocity error quantity summation amount ΔL is cleared and the process advances to step S1609. If, in step S1606 the vibration compensation control aided running timer has expired, the process advances to step S1607 and the vibration compensation lens velocity error ΔV is summated using Equation 23, ΔL is found, and the process advances to step S1609. In step S1609, the drive duty is calculated and the process advances to step S1610.

In step S1610, the absolute value of the drive duty is checked to determine if it is larger than the drive duty limit value previously set. If the absolute value of the drive duty is larger than the drive duty limit value, then in step S1611 the drive duty is set to that limit value. In either event, the process thereafter advances to step S1612. In step S1612, the motor 104 is driven with the determined drive duty, and in step S1613 the process is terminated.

Figure 27:
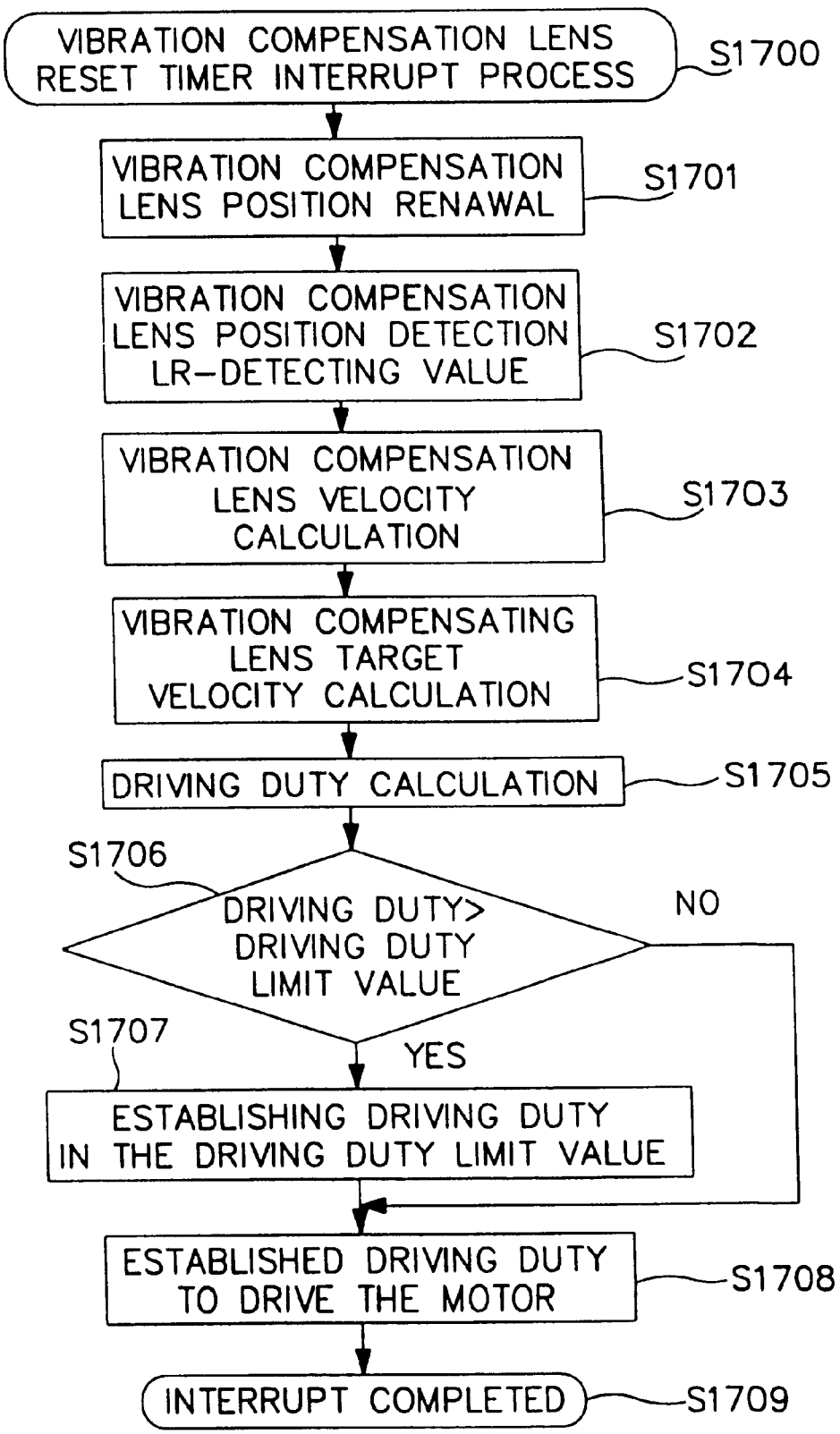
FIG. 27 is a flow chart showing the flow of the vibration compensation lens reset timer interrupt process in accordance with the second preferred embodiment of the present invention.

FIG. 27 is a flow chart showing the flow of the vibration compensation lens reset timer interrupt process in accordance with the second preferred embodiment of the present invention. The vibration compensation lens reset timer interrupt process is a timer interrupt process which is started at a prescribed interval, for example 1 ms. The process begins in step S1700. In step S1701, the vibration compensation lens position LR, set in the previous vibration compensation lens reset timer interrupt process, is placed in LR'. In step S1702 the current vibration compensation lens position LR, detected by the lens position detection circuit 3, is placed in LR. Next, in step S1703, the vibration compensation lens velocity VR is calculated, using Equation 45, by subtracting the previous vibration compensation lens position LR' from the current vibration compensation lens position LR. Next, in step S1704, Equation 27 is used to calculate the vibration compensation lens target velocity VC. Then, in step S1705, the drive duty is calculated with Equation 25 or, alternatively, using Equation 25 with the third or the fourth term deleted.

In step S1706, a decision is made as to whether the absolute value of the drive duty is larger than the drive duty limit value that has been set. If the absolute value of the drive duty is larger, the operation advances to step S1707 and the drive duty is set to that limit value. Thereafter, the process advances to step S1708. In step S1706, if the absolute value of the drive duty is not larger, then the process advances directly to step S1708. In step S1708, the motor 104 is driven with the drive duty that has been set, and in step S1709 the process is terminated.

Figure 31:
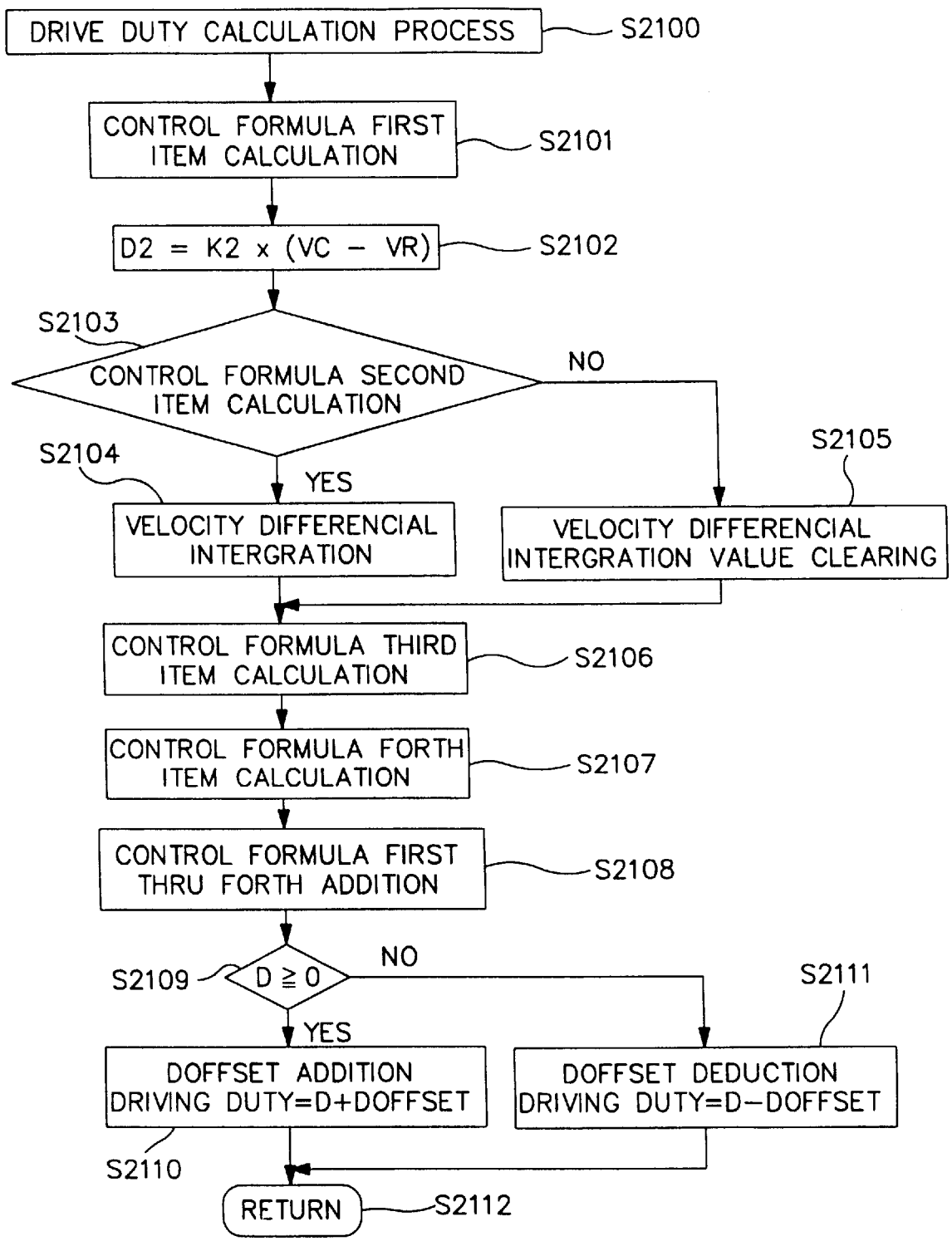
FIG. 31 is a flow chart showing the flow of the drive duty calculation process in the centering or reset control in accordance with the second preferred embodiment of the present invention.

When the Equation 25 is used for the drive duty calculation in step S1705, in which the third or the fourth term have been deleted, the steps corresponding to the deleted terms in FIG. 31 may be deleted.

Figure 28:
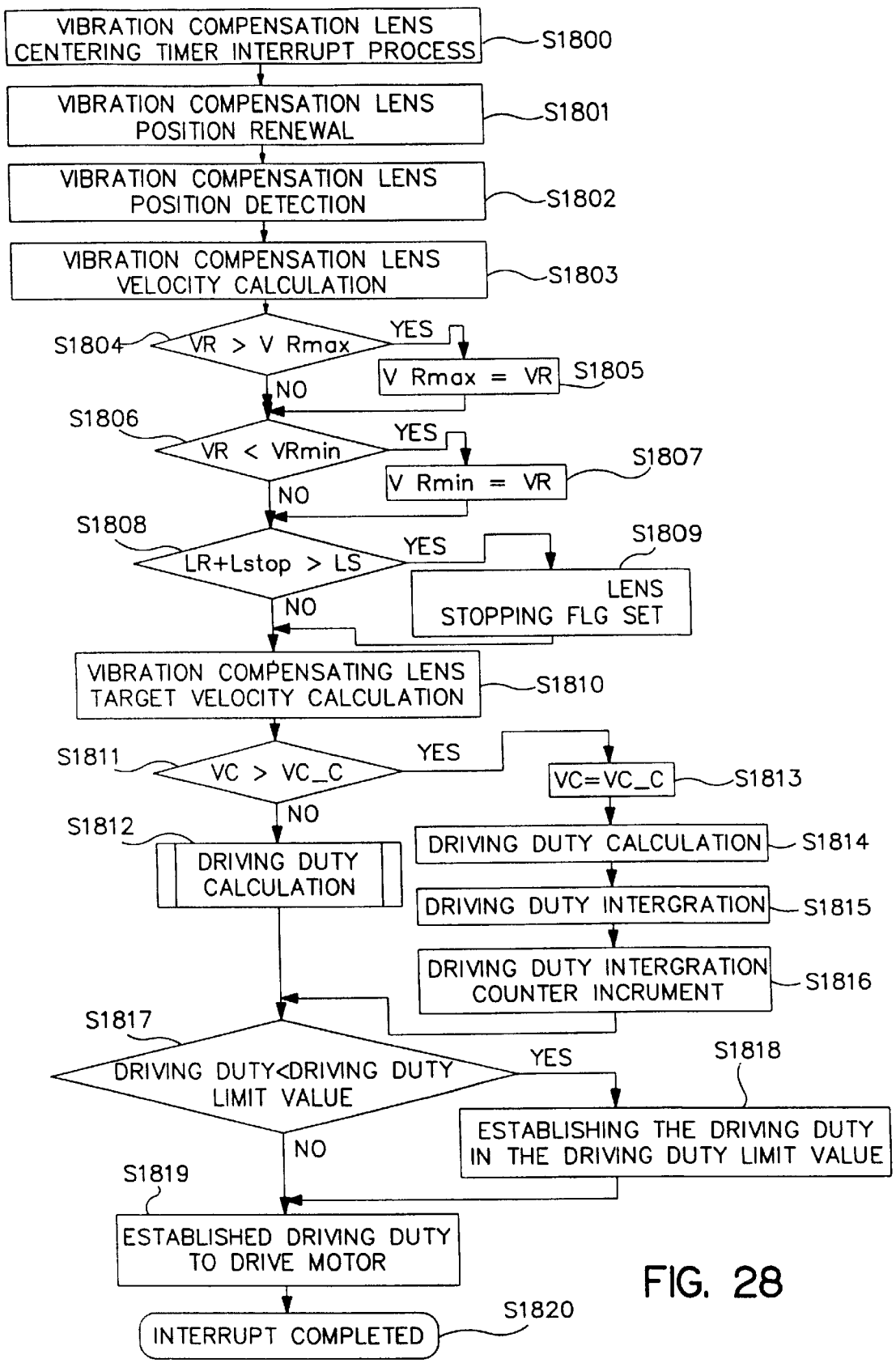
FIG. 28 is a flow chart showing the flow of the vibration compensation centering timer interrupt process in accordance with the second preferred embodiment of the present invention.

FIG. 28 is a flow chart showing the flow of the vibration compensation centering timer interrupt process in accordance with the second preferred embodiment of the present invention. The vibration compensation lens centering timer interrupt process is a timer interrupt process which is started at a prescribed time interval, for example, 1 ms. The process is started in step S1800. In step S1801, the vibration compensation lens position LR, set by the previous vibration compensation lens centering timer interrupt process, is placed in LR'. In step S1802, the current vibration compensation lens position LR, detected by the lens position detection circuit 103, is placed in LR. Next, in step S1803, the vibration compensation lens velocity VR is calculated, using Equation 35, by subtracting the previous vibration compensation lens position LR' from the current vibration compensation lens position LR. As the process is performed at a prescribed interval, for example, 1 ms, the vibration compensation lens velocity VR is calculated by detecting just how far the vibration compensation lens 113 has moved during the prescribed time interval from the difference between the previous and current vibration compensation lens positions. Next, in step S1804, a decision is made as to whether the vibration compensation lens velocity VR is greater than VRmax and if so, the process proceeds to step S1805 and VR is placed in VRmax, thereafter the process advances to step S1806. If the vibration compensation lens velocity VR is not greater than VRmax, the process advances directly to step S1806.

In step S1806, if the vibration compensation lens velocity VR is smaller than VRmin, the process advances to step S1807 and VR is placed in VRmin, thereafter, the process advances to step S1808. If the vibration compensation lens velocity VR is not smaller than VRmin, the process advances directly to step S1808. Thus, in step S1804, S1805, S1806, and S1807, the maximum and minimum values of the vibration compensation lens velocity VR are calculated.

Next, in step S1808, a decision is made as to whether the vibration compensation lens position LR was reached before the prescribed quantity Lstop (equivalent to point B3 in FIG. 18) of the center position LS. This is accomplished by determining whether LR+Lstop is equal to or greater than LS. If LR+Lstop is equal to or greater than LS, the process advances to step S1809, and the vibration compensation lens stop FLG is set. Thereafter the process advances to step S1810. If LR+Lstop is less than LS, the process proceeds directly to step S1810.

In step S1810, the vibration compensation lens target velocity VC is calculated using Equation 24. Thereafter, in step S1811, a decision is made as to whether VC is larger than VC_C. If the vibration compensation lens target velocity VC is larger than the limit value VC_C, the process proceeds to step S1813 and VC_C is set to VC. Thereafter, the drive duty is calculated using either Equation 25, or Equation 25 with either the third or the fourth term has been deleted. In Step S1815, the drive duty summation is performed by adding the drive duty to INTEG_DUTY. In step S1816, the drive duty summation count INTEG_CNT is incremented once, and the process advances to step S1817.

If, in step S1811 the vibration compensation lens target velocity VC is smaller than the limit value VC_C, the process proceeds to step S1812 and the drive duty is calculated using either Equation 25, or Equation 25 having either the third or fourth term deleted. Thereafter, the process advances to step S1817.

Thus, in steps S1811 to S1817, a limit is set on the vibration compensation lens target velocity VC. Also, the state in which the limit impinges is the domain from the vibration compensation lens centering control start until B6 in FIG. 19. Further, as was discussed in the description for FIG. 23, at B7 in FIG. 19, the INTEG_DUTY and the INTEG_CNT values are cleared, so it is possible to find the drive duty summation value for the interval from B7 to B6, and the summation count thereof.

Next, in step S1817, a decision is made as to whether the absolute value of the drive duty is larger than the drive duty limit value. If the absolute value of the drive duty is larger than the drive duty limit value, the process advances to step S1818 and the drive duty is set to the limit value therefor. Thereafter, the process advances to step S1819. Conversely, if in step S1817, the absolute value of the drive duty is smaller than the drive duty limit value, the process advances directly to step S1819. In step S1819, the motor 104 is driven with the set drive duty, and in step S1820 the process is terminated.

Figure 29:
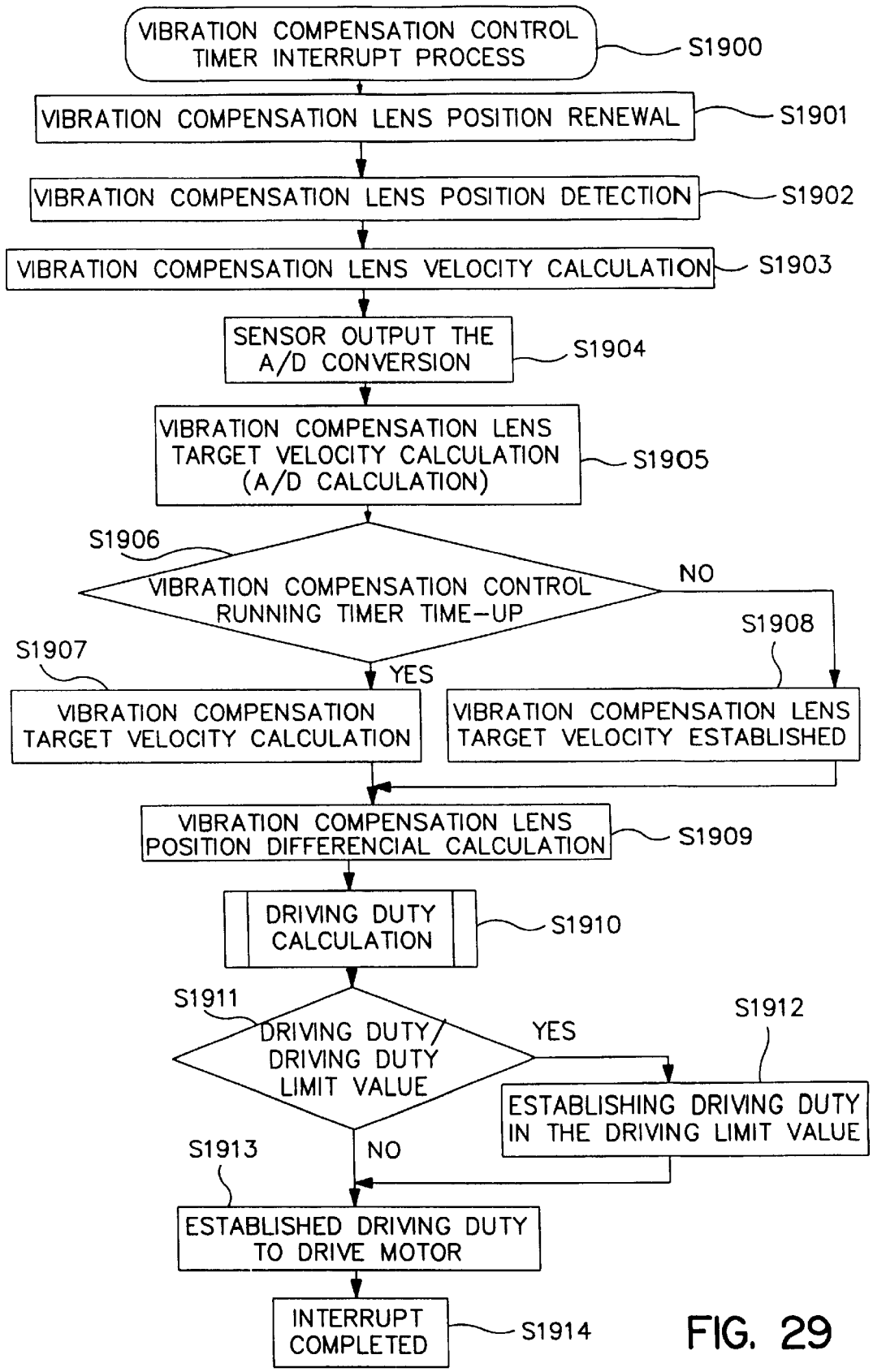
FIG. 29 is a flow chart showing the flow of another vibration compensation control start process in accordance with the second preferred embodiment of the present invention.

FIG. 29 is a flow chart showing an alternative vibration compensation control timer interrupt process in accordance with the second preferred embodiment of the present invention. Only those portions of the process in FIG. 29 which are different from the process in FIG. 26 will be discussed herein. The processes in FIG. 29 is the same as in FIG. 26, until the vibration compensation lens control velocity VC is calculated in step S1905. In step S1906, the vibration compensation control aided running timer, set in step S1505 in FIG. 25, is checked to determine if it has expired. If the vibration compensation control aided running timer has not expired, then in step S1908 the vibration compensation lens target position LC is set to the current vibration compensation lens position LR, and the process advances to step S1909. If the vibration compensation control aided running timer has expired, in step S1907 the vibration compensation lens target velocity VC is summated, using Equation 21, by adding the vibration compensation lens target velocity VC to each of the prior the vibration compensation lens target positions LC. Thereafter, the current vibration compensation lens target position LC is found, and the process advances to step S1909.

In step S1909, the position error ΔL is calculated, using Equation 22, by subtracting the vibration compensation lens position LR from the vibration compensation lens target velocity LC, and the process advances to step S1910. The processing from step S1910 onward is identical with the processing shown in FIG. 26.

Figure 30:
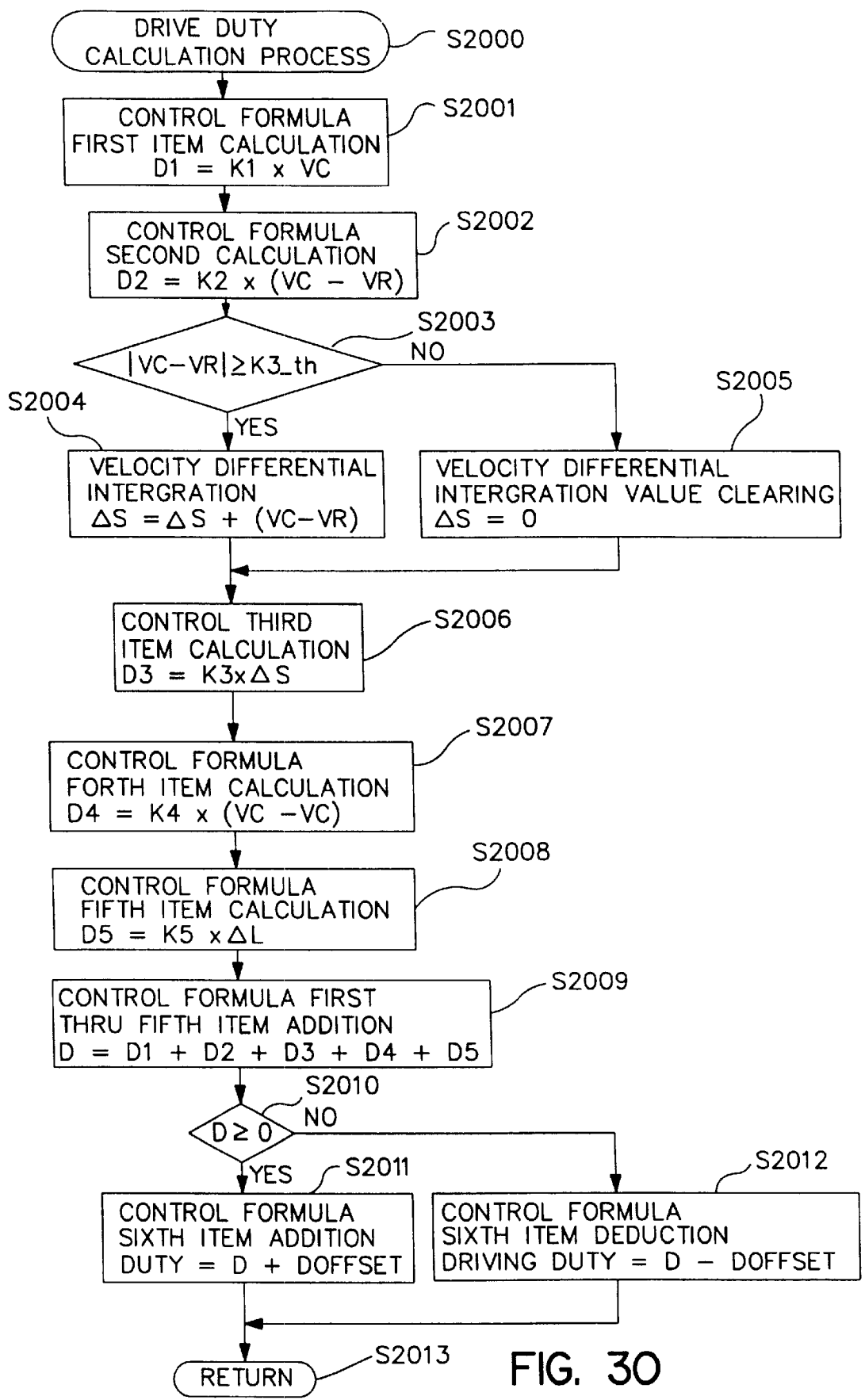
FIG. 30 is a flow chart showing the flow of the drive duty calculation process in the vibration compensation control in accordance with the second preferred embodiment of the present invention.

FIG. 30 is a flow chart showing the flow of the drive duty calculation process in the vibration compensation control of this invention. The drive duty calculation process calculates the drive duty using Equation 14 and begins in step S2000. In step S2001, the first term D1 of Equation 14 is calculated by multiplying the vibration compensation lens target velocity VC by K1 to give D1, and the process advances to step S2002. In step S2002, the second term D2 of Equation 14 is calculated by multiplying the velocity error ΔV, found by subtracting the vibration compensation lens velocity VR from the vibration compensation lens target velocity VC, by K2 to give D2, and the process advances to step S2003.

Steps S2003, S2004, S2005, and S2006 calculate the third term D3 in Equation 14. First, in step S2003, the absolute value of the difference between the vibration compensation lens target velocity VC and the vibration compensation lens velocity VR is checked against K3_th. If the result is greater than K3_th, the process advances to step S2004 and Equation 18 is used to calculate ΔS, by adding the velocity error ΔV (equivalent to VC−VR) to the summation value ΔS of the velocity errors. Conversely, if the result in step S2003 is not greater than K3_th, the process advances to step S2005 and ΔS is cleared using Equation 19. In either case the process thereafter advances to step S2006. In step S2006, ΔS is multiplied by K3 to give D3, and the process advances to step S2007.

In step S2007, the fourth term D4 of Equation 14 is calculated, using Equation 20, by subtracting the previous vibration compensation lens target velocity VC' from the current vibration compensation lens target velocity VC and multiplying the result by K4. Thereafter, in step S2008, the fifth term D5 of Equation 14 is calculated by multiplying ΔL by K5, and the process advances to step S2009. In step S2009, D is set equal to the sum of D1, D2, D3, D4, and D5, and the process advances to step S2010.

In step S2010, a decision is made as to whether D is greater than 0, and if it is then in step S2011 Doffset is added to D to give the desired drive duty, and the process is terminated in step S2013. If however, in step S2010, if D is not greater than 0, then in step S2012 Doffset is subtracted from D to give the desired drive duty, and the process is terminated in step S2013.

FIG. 31 is a flow chart showing the flow of the drive duty calculation process in the centering control or in the reset control used in steps S1812 and S1814 in FIG. 28. The process starts in step S2100. In step S2101, the first term D1 of Equation 25 is calculated by multiplying the vibration compensation lens target velocity VC by K1. Thereafter, in S2102, the second term D2 of Equation 25 is calculated by multiplying the velocity error ΔV, obtained by subtracting the vibration compensation lens target velocity VC from the vibration compensation lens velocity VC, by K2 and the process advances to step S2103.

Steps S2103, S2104, S2105, and S2106 calculate the third term D3 of Equation 25. First, in step S2103, the absolute value of the difference between the vibration compensation lens target velocity VC and the vibration compensation lens velocity VR is taken, and a decision is made as to whether that absolute value is equal to or greater than K3_th. If the result is greater than or equal to K3_th, the process advance to step S2104, and using Equation 18, ΔS is calculated by adding the velocity error ΔV (equivalent to VC−VR) to the summation value ΔS of the prior velocity errors. Conversely, if the result is less than K3_th, the operation advances to step S2105 and ΔS is cleared using Equation 19. In either case the process advances to step S2106.

In step S2106, D3 is calculated by multiplying ΔS by K3, and the process advances to step S2107. In step S2107, the fourth term D4 of Equation 25 is calculated by subtracting the previous vibration compensation target lens velocity VC' from the current vibration compensation lens target velocity VC using Equation 20. As the vibration compensation lens centering timer interrupt process is performed at the prescribed time interval, the amount of change in the vibration compensation lens target velocity during the prescribed time is found and multiplied by K4 to give D4. Thereafter, the process advances to step S2108. In step S2108, D is set equal to the summation of D1, D2, D3, and D4, and the process advances to step S2109.

Steps S2109, S2110, and S2111 add the fifth term D5 of Equation 25 when the sum of the first through the fourth terms is positive, and subtracts it when that sum is negative. First, in step S2109, a decision is made as to whether D is greater than or equal to 0, and if it is, the operation advances to step S2110 and Doffset is added to D to obtain the desired drive duty. Thereafter, the process is terminated in step S2112. If, in step S2109 D is less than 0, the process proceeds to step S2111 and Doffset is subtracted from D to obtain the desired drive duty, and the process is terminated in step S2112.

When, in steps S1812 and S1814 in FIG. 28, Equation 25 is used without the third or the fourth term, the steps corresponding to the deleted terms may be deleted.

In accordance with the second preferred embodiment of the present invention the correct compensation coefficient, which is the coefficient determinative of how much to vary the optical axis relative to the output value from the vibration detection unit, i.e., the angular velocity detecting circuit 105, is calculated based on the distance to the subject, the focal length of the photographic optical system, and a gain adjustment value that compensates for the variations in gains that are present in the individual vibration detection units. Furthermore, the computation that calculates the correct compensation coefficient is simplified, which reduces the time it takes to calculate the correct compensation coefficient such that it can be performed after the operation of the distance-measurement unit terminates but before the compensation of the vibrations.

Further, the vibration compensation control characteristics are improved, making it possible to reduce the control errors that remain due to the effects of response delays in the mechanism of the vibration compensating optical system. Control errors are also reduced with respect to error introduced by the actuator, the effects of drive computations and other computation time, the effects of power supply fluctuations, and other effects, such as those resulting from mechanical characteristic variation. This has the desirable effect of reducing the operating noise by performing smooth control.

In addition, the characteristics of the centering control, or of the reset control, are improved, so that, the effects of response delays in the mechanism of the optical-axis variation unit, the actuator, the effects of drive computations and other computation time, the effects of power supply fluctuations, and/or other effects, such as those resulting from mechanical characteristic variation are reduced. This promotes smooth and rapid control during centering and reset control. Also, the precision of stopping at the center position during centering control is improved.

Finally, by providing a limit to the drive duty with which the actuator is driven during vibration compensation control, centering control, or reset control, by using centering control and reset control to suspend vibration compensation control in the event that control has been suspended, it is possible to prevent damage to the mechanism of the vibration compensating optical system.

Although the second embodiment of the present invention has been described with respect to a specific configuration, it will be recognized that the second embodiment is not limited to the specific configuration. For example, although the second embodiment has been described with respect to the use of PWM control which varies the duty with which the vibration compensation lens 113 is driven by the motor 104, a voltage control which controls by varying the drive voltage for the motor 104 may be used by simply replacing the drive duty with the drive voltage. A voltage may be configured that corresponds to the drive duty value and is generated by a microcomputer, or the like, which has a D/A conversion function. In which case the motor drive circuit 102 drives the motor 104 with a voltage that is proportional to the measured voltage. Also, the second embodiment has been described with respect to shifting a portion of the photographic optical system, however, one of ordinary skill in the art will recognize that a variable-angle prism may be used. Similarly, it is possible to use a voice coil or other actuator instead of a motor.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A camera comprising:
   a photographic optical system having an optical axis;
   a vibration detection unit that outputs a signal indicative of vibrations in the camera;
   a photographic focal length detection unit that outputs a signal indicative of a focal length of the photographic optical system;
   a distance measurement unit that outputs a signal indicative of the distance to an object being photographed;
   a vibration compensation unit to shift the optical axis of the photographic optical system to compensate for the vibrations detected by the vibration detection unit;
   a non-volatile rewritable memory that stores a gain-adjustment value which compensates for variation in the individual outputs from the vibration detection unit; and
   a correct compensating coefficient calculation unit that calculates a correct compensation coefficient based on the output of the photographic focal length detection unit, the output of the distance measurement unit, and the gain-adjustment value stored in the non-volatile rewritable memory, the correct compensation coefficient determining an amount the vibration compensation unit changes the optical axis of the photographic optical system relative to the output of the vibration detection unit.

2. A camera, as set forth in claim 1, wherein:
   said distance measurement unit outputs the inverse of the distance to the object being photographed; and
   said correct compensation coefficient calculation unit calculates the sum of the product of the output of the distance measurement unit, a first variable which is a function of the output value of the focal length detection unit and calculates a second variable which is a function of the focal length detection unit.

3. A camera, as set forth in claim 2, wherein the range of photographic focal lengths of said photographic optical system is divided into a plurality of focal-length zones, and the first variable and the second variable are fixed values for each of the plurality of focal-length zones.

4. A camera comprising:
   a photographic lens;
   an optical axis variation unit which changes the optical axis of the photographic lens;
   an actuator which drives the optical axis variation unit,
   a displacement detection unit which outputs a signal indicative of displacements in the optical axis variation unit,
   an angular velocity detection unit which outputs a signal indicative of the angular velocities of the vibrations in the camera;
   a displacement velocity calculation unit which calculates a displacement velocity from the output of the displacement detection unit;
   a target displacement velocity calculation unit which calculates a target displacement velocity of the optical axis variation unit in response to the output of the angular velocity detection unit;
   a velocity error calculation unit which calculates a velocity error from differences between the displacement velocity and the target displacement velocity;
   a basic drive quantity calculation unit that calculates a basic drive quantity by applying a first coefficient to the target displacement velocity;

a compensation drive quantity calculation unit which calculates a compensation drive quantity, by applying a second coefficient to the velocity error; and a drive unit that drives the actuator in accordance with the basic drive quantity and the compensation drive quantity.

5. A camera, as set forth in claim 4, wherein the drive unit adds a positive compensation drive quantity to the basic drive quantity when the basic drive quantity is positive, and a negative compensation drive quantity when the basic drive quantity is positive.

6. A camera, as set forth in claim 4, wherein the first coefficient is determined by a value that is stored in a rewritable non-volatile memory.

7. A camera, as set forth in claim 4, wherein a limit is placed on the drive unit so that the drive unit is inoperable above a prescribed drive quantity.

8. A camera, as set forth in claim 4, further comprising:
a power supply to supply power to the drive unit; and,
a battery checking unit which outputs a signal indicating a power supplying capability of the power supply, and
wherein the coefficient applied to the target displacement velocity of the basic drive quantity calculation unit is varied in accordance the output value of the battery checking unit.

9. A camera, as set forth in claim 4, further comprising:
a centering drive unit which drives the actuator and drives the optical axis roughly to a center position; and,
a maximum displacement velocity calculation unit which calculates a maximum displacement velocity of the output value of the displacement velocity calculation unit during the operation of the centering drive unit; and
wherein the first coefficient is varied in accordance with the maximum displacement velocity.

10. A camera, as set forth in claim 4, further comprising:
a centering drive unit which drives the actuator and drives the optical axis roughly to the center position, the centering drive unit subjects the optical axis variation unit to constant-velocity control by varying the drive quantity with which the actuator is driven; and,
an average drive quantity calculation unit which calculates an average value of the drive quantity during the constant velocity control; and
wherein the first coefficient is varied in accordance with the average drive quantity calculation unit.

11. A camera comprising:
a photographic lens having an optical axis;
an optical axis variation unit which changes the optical axis of the photographic lens;
an actuator which drives the optical axis variation unit;
a displacement detection unit which outputs a signal indicative of displacements in the optical axis variation unit;
an angular velocity detection unit which outputs a signal indicative of angular velocities caused by vibrations;
a displacement velocity calculation unit which calculates a displacement velocity from the output of the displacement detection unit;
a target displacement velocity calculation unit which calculates a target displacement velocity of the optical axis variation unit in response to the output of the angular velocity detection unit;
a velocity error calculation unit which calculates velocity errors from differences between the displacement velocity and the target displacement velocity;

a velocity error integration unit which, when the absolute value of the velocity error is at least equal to a prescribed value, integrates the velocity error, and when the absolute value of the velocity error is less than the prescribed value, clears the integrated value;

a basic drive quantity calculation unit that calculates a basic drive quantity by applying a first coefficient to the target displacement velocity;

a compensation drive quantity calculation unit which calculates a compensation drive quantity, by applying a second coefficient to the output value of the velocity error integration unit; and a drive unit that drives the actuator in accordance with the basic drive quantity and the compensation drive quantity.

12. A camera comprising:
a photographic lens having an optical axis;
an optical-axis variation unit which changes the optical axis of the photographic lens;
an actuator which drives the optical axis variation unit; a displacement detection unit which outputs a signal indicative of displacements in the optical axis variation unit;
an angular velocity detection unit which outputs a signal indicative of angular velocities caused by vibrations;
a displacement velocity calculation unit which calculates a displacement velocity from the output of the displacement detection unit;
a target displacement velocity calculation unit which calculates a target displacement velocity of the optical axis variation unit in response to the output of the angular velocity detection unit;
a target velocity differentiation unit which calculates a differential of the target displacement velocity;
a basic drive quantity calculation unit that calculates a basic drive quantity by applying a first coefficient to the target displacement velocity;
a compensation drive quantity calculation unit which calculates a compensation drive quantity using a second coefficient and the output value of the target velocity differentiation unit; and
a drive unit that drives the actuator in accordance with the basic drive quantity and the compensation drive quantity.

13. A camera comprising:
a photographic lens having an optical axis;
an optical axis variation unit which changes the optical axis of the photographic lens;
an actuator which drives the optical axis variation unit;
a displacement detection unit which outputs a signal indicative of displacements in the optical axis variation unit;
an angular velocity detection unit which outputs a signal indicative of angular velocities caused by vibrations;
a displacement velocity calculation unit which calculates a displacement velocity from the output of the displacement detection unit;
a target displacement velocity calculation unit which calculates a target displacement velocity of the optical axis variation unit in response to the output of the angular velocity detection unit;
a velocity error calculation unit which calculates a velocity error from differences between the displacement velocity and the target displacement velocity;

a velocity error integration unit which integrates the velocity error or calculates a velocity error summation value;

a basic drive quantity calculation unit that calculates a basic drive quantity using a first coefficient and the target displacement velocity;

a compensation drive quantity calculation unit which calculates a compensation drive quantity using a second coefficient and the output value of the velocity error integration unit; and a drive unit that drives the actuator in accordance with the basic drive quantity and the compensation drive quantity.

14. A camera, as set forth in claim 12, further comprising:

a velocity error integration suspension unit which performs one of clearing the velocity error integration value and suspending the operation of the velocity error integration unit during a prescribed time period after said actuator has been driven.

15. A camera comprising:

a photographic lens having an optical axis;

an optical axis variation unit which changes the optical axis of the photographic lens;

an actuator which drives the optical axis variation unit;

a displacement detection unit which outputs a signal indicative of displacements in the optical axis variation unit;

an angular velocity detection unit which outputs a signal indicative of angular velocities caused by the vibrations;

a target displacement velocity calculation unit which calculates a target displacement velocity of the optical axis variation unit in response to the output of the angular velocity detection unit;

a target displacement position calculation unit which integrates the target displacement velocity and calculates a target displacement position;

a displacement position error calculation unit which calculates a displacement position error from the output of the displacement detection unit and the target displacement position;

a basic drive quantity calculation unit that calculates a basic drive quantity based on a first coefficient and the target displacement velocity;

a compensation drive quantity calculation unit which calculates a compensation drive quantity based on a second coefficient and the output value of the displacement position error calculation unit; and a drive unit that drives the actuator based on the basic drive quantity and the compensation drive quantity.

16. A camera, as set forth in claim 15, wherein the target displacement position calculation unit integrates an initial value based on the output value of the displacement position detection unit after a prescribed time after the driving of the actuator.

17. A camera comprising:

a photographic lens having an optical axis;

an optical axis variation unit which changes the optical axis of the photographic lens;

an actuator which drives the optical axis variation unit;

a displacement detection unit which outputs a signal indicative of displacements in the optical axis variation unit;

a displacement velocity calculation unit which calculates a displacement velocity from the output of the displacement detection unit;

a target displacement velocity calculation unit which calculates a target displacement velocity according to the difference between a center position that is roughly in the middle of the optical axis displacement range and the output value from the displacement detection unit;

a velocity error calculation unit which calculates a velocity error from the difference between the displacement velocity and the target displacement velocity;

a basic drive quantity calculation unit that calculates a basic drive quantity by applying a first coefficient to the target displacement velocity;

a compensation drive quantity calculation unit which calculates a compensation drive quantity, by applying a second coefficient to the velocity error; and a drive unit that drives the actuator in accordance with the basic drive and the compensation drive quantities to move the optical axis of the photographic lens to the center position.

18. A camera, as set forth in claim 17, wherein the drive unit adds a positive compensation drive quantity to the basic drive quantity when the basic drive quantity is positive, and adds a negative compensation drive quantity to the basic calculated drive quantity when the drive quantity is positive.

19. A camera, as set forth in claim 17, further comprising:

a power supply to supply power to the drive unit; and, a battery checking unit which measures the power supplying capability of the power supply; and wherein the first coefficient is varied in accordance with the output value of the battery checking unit.

20. A camera, as set forth in claim 17, wherein the center position is determined by a value that is stored beforehand in a rewritable non-volatile memory.

21. A camera, as set forth in claim 17, wherein an upper limit is established for the target displacement velocity.

22. A camera, as set forth in claim 17, wherein when the difference between the center position and the output of the displacement detection unit reaches a prescribed quantity, the drive unit performs one of putting the actuator in a short-brake state and making the drive quantity zero, thereby stopping the optical axis displacement unit.

23. A camera, as set forth in claim 17, wherein an upper limit is established for the basic and compensation drive quantity.

24. A camera, as set forth in claim 23, further comprising:

a power supply to supply power to the drive unit; and, a battery checking unit which outputs a signal indicating the power supplying capability of the power supply; and wherein the upper limit determined for the actuator drive quantity can be varied in accordance with the output value of the battery checking unit.

25. A camera comprising:

a photographic lens having an optical axis;

an optical axis variation unit which changes the optical axis of the photographic lens;

an actuator which drives the optical axis variation unit;

a displacement detection unit which outputs a signal indicative of displacements in the optical axis variation unit;

a displacement velocity calculation unit which calculates a displacement velocity from the output of the displacement detection unit;

a target displacement velocity calculation unit which calculates a target displacement velocity according to a difference between a center position that is roughly in the middle of the optical-axis displacement range and the output value from the displacement detection unit;

a velocity error calculation unit which calculates a velocity error from a difference between the displacement velocity and the target displacement velocity;

a velocity error integration unit which, when the absolute value of the velocity error is at least equal to a prescribed value, integrates the velocity error, and when the absolute value of the velocity error is less than the prescribed value, clears the integrated value;

a basic drive quantity calculation unit that calculates a basic drive quantity by applying a first coefficient to the target displacement velocity;

a compensation drive quantity calculation unit which calculates a compensation drive quantity, by applying a second coefficient to the output value of the integration unit; and a drive unit that drives the actuator in accordance with the basic drive and the compensation drive quantities so as to move the optical axis to the center position.

26. A camera comprising:

a photographic lens having an optical axis;

an optical axis variation unit which changes the optical axis of the photographic lens;

an actuator which drives the optical axis variation unit;

a displacement detection unit which outputs a signal indicative of displacements in the optical axis variation unit;

a displacement velocity calculation unit which calculates a displacement velocity from the output of the displacement detection unit;

a target displacement velocity calculation unit which calculates a target displacement velocity according to the difference between a center position that is roughly in the middle of the optical axis displacement range and the output value from the displacement detection unit;

a target velocity differentiation unit which calculates a differential of the target displacement velocity;

a basic drive quantity calculation unit that calculates a basic drive quantity by applying a first coefficient to the target displacement velocity;

a compensation drive quantity calculation unit which calculates a compensation drive quantity, by applying a second coefficient to the output value of the differentiation unit; and a drive unit that drives the actuator at least by the basic drive and the compensation drive quantities, and drives the optical axis to the center position.

27. A camera comprising:

a photographic lens having an optical axis;

an optical axis variation unit which changes the optical axis of the photographic lens;

an actuator which drives the optical axis variation unit;

a displacement detection unit which outputs a signal indicative of displacements in the optical axis variation unit;

a displacement velocity calculation unit which calculates a displacement velocity from the output of the displacement detection unit;

a velocity error calculation unit which calculates a velocity error from the difference between the displacement velocity and a prescribed target displacement velocity;

a basic drive quantity calculation unit that calculates a basic drive quantity by applying a first coefficient to the target displacement velocity;

a compensation drive quantity calculation unit which calculates a compensation drive quantity, by applying a second certain coefficient to the output value of the velocity error; and a drive unit which drives the actuator in accordance with a total drive quantity based on the basic drive quantity and the compensation drive quantity, and drives the optical axis to the reset position at one end of the range of the displacement thereof.

28. A camera, as set forth in claim 27, wherein the drive unit adds a positive compensation drive quantity to the basic drive quantity when the basic drive quantity is positive, and a negative compensation drive quantity when the basic drive quantity is positive.

29. A camera, as set forth in claim 27, further comprising:

a power supply to supply power to the drive unit; and, a battery checking unit which measures the power supplying capability of the power supply; and wherein the first coefficient is varied in accordance with the output value of the battery checking unit.

30. A camera, in accordance with claim 27 wherein an upper limit is established for the target displacement velocity.

31. A camera, in accordance with claim 27 wherein an upper limit is established for the total drive quantity.

32. A camera, in accordance with claim 31, further comprising:

a power supply to supply power to the drive unit; and, a battery checking unit which measures the power supplying capability of the power supply; and wherein the upper limit established for the actuator drive quantity is varied in accordance with the output value from the battery checking unit.

33. A camera comprising:

a photographic lens having an optical axis;

an optical axis variation unit which changes the optical axis of the photographic lens;

an actuator which drives the optical axis variation unit;

a displacement detection unit which outputs a signal indicative of displacements in the optical axis variation unit;

a displacement velocity calculation unit which calculates a displacement velocity from the output of the displacement detection unit;

a velocity error calculation unit which calculates a velocity error from the difference between the displacement velocity and a prescribed target displacement velocity;

a velocity error integration unit which, when the absolute value of the velocity error is at least as great as the prescribed value, integrates the velocity error and when the absolute value of the velocity error is less than the prescribed value clears the integrated value;

a basic drive quantity calculation means that calculates a basic drive quantity by applying a first coefficient to the target displacement velocity;

a compensation drive quantity calculation means which calculates a compensation drive quantity, by applying a second coefficient to the output value of the integration means; and a drive unit which drives the actuator in accordance with the basic drive quantity and the compensation drive quantity, and drives the optical axis to the reset position at one end of the range of the displacement thereof.

34. A camera comprising:
a photographic lens having an optical axis;
an optical axis variation unit which changes the optical axis of the photographic lens;
an actuator which drives the optical axis variation unit in accordance with a drive quantity;
a displacement detection unit which outputs a signal in accordance with displacements in the optical axis variation unit;
a displacement velocity calculation unit which calculates a displacement velocity from the output of the displacement detection unit;
a centering drive unit which drives the actuator and drives the optical axis to a center position;
a reset drive unit which drives the actuator and drives the optical axis to a reset position at one end of the range of the displacement thereof; and,
a maximum displacement velocity calculation unit that calculates a maximum displacement velocity of the output value of the displacement velocity calculation unit during the operation of the centering drive unit; and
wherein a limit is established for the drive quantity so that driving is inhibited above the limit of a limit drive quantity calculated according to the maximum displacement velocity.

35. A camera comprising:
a photographic lens having an optical axis;
an optical axis variation unit which changes the optical axis of the photographic lens;
an actuator which drives the optical axis variation unit;
a displacement detection unit which outputs a signal indicative of displacements in the optical axis variation unit;
a centering drive unit which subjects the optical axis variation unit to a constant velocity control by varying a drive quantity with which the actuator is driven;
an average drive quantity calculation unit which calculates an average value of the drive quantity during the constant velocity control; and,
a reset drive unit which drives the actuator and drives the optical axis to a reset position at one end of a range of displacement thereof; and
wherein a limit is established for the drive quantity of the reset drive unit so that driving is inhibited above a drive quantity calculated according to the output value of the average drive quantity calculation unit.

36. A camera comprising:
a photographic lens having an optical axis;
an optical axis variation unit which changes the optical axis of the photographic lens;
an actuator which drives the optical axis variation unit;
a centering drive unit which drives the actuator and drives the optical axis to a center position; and
a centering drive suspension unit that suspends the centering drive unit when the centering action does not terminate after a prescribed amount of time has elapsed since the action of the centering drive unit began.

37. A camera, as set forth in claim 36, further comprising:
a vibration detection unit which detects vibration, and
a vibration compensating unit which compensates for vibration by driving the actuator in response to outputs from the vibration detection unit; and
wherein the operation of the vibration compensating unit is suspended when the centering drive has been suspended by the centering drive suspension unit.

38. A camera comprising:
a photographic lens having an optical axis;
an optical axis variation unit which changes the optical axis of the photographic lens;
an actuator which drives the optical axis variation unit;
a displacement detection unit which outputs a signal indicating displacements in the optical axis variation unit;
a displacement velocity calculation unit which calculates a displacement velocity from the output of the displacement detection unit;
a centering drive unit which drives the actuator and drives the optical axis to a center position; and
a centering drive suspension unit that suspends the centering drive unit when the displacement velocity is smaller than a prescribed value after a prescribed amount of time has elapsed since the action of the centering drive unit began.

39. A camera comprising:
a photographic lens having an optical axis;
an optical axis variation unit which changes the optical axis of the photographic lens;
an actuator which drives the optical axis variation unit;
a displacement detection unit which outputs a signal indicative of displacements in the optical axis variation unit;
a displacement velocity calculation unit which calculates a displacement velocity from the output of the displacement detection unit;
a centering drive unit which drives the actuator and drives the optical axis to a center position;
a maximum displacement velocity detection unit which detects a maximum value of the displacement velocity during the operation of the centering drive unit; and
a centering drive suspension unit that suspends the centering drive action where the output value from the maximum displacement velocity detection unit is smaller than a prescribed value during the operation of the centering drive action.

40. A camera comprising:
a photographic lens having an optical axis;
an optical axis variation unit which changes the optical axis of the photographic lens;
an actuator which drives the optical axis variation unit;
a displacement detection unit which outputs a signal indicating displacements in the optical axis variation unit;
a displacement velocity calculation unit which calculates a displacement velocity from the output of the displacement detection unit;
a centering drive unit which drives the actuator to move the optical axis to a center position;
a maximum displacement velocity detection unit which detects a maximum value of a displacement velocity after a prescribed amount of time has elapsed since the action of the centering drive unit began; and
a centering drive suspension unit that suspends the centering drive unit when the output value from the maximum displacement velocity detection unit is smaller than a prescribed value during the operation of the centering drive action.

41. A camera comprising:

a photographic lens having an optical axis;

an optical axis variation unit which changes the optical axis of the photographic lens;

an actuator which drives the optical axis variation unit;

a displacement detection unit which outputs a signal indicating displacements in the optical axis variation unit;

a displacement velocity calculation unit which calculates a displacement velocity from the output of the displacement detection unit;

a centering drive unit which drives the actuator to move the optical axis to a center position; and a centering drive suspension unit that suspends the centering drive unit when the displacement velocity is smaller than a prescribed value during the operation of the centering drive unit.

42. A camera, as set forth in claim 41, wherein during the operation of the centering drive unit, the prescribed value is negative.

43. A camera comprising:

a photographic lens having an optical axis;

an optical axis variation unit which changes the optical axis of the photographic lens;

an actuator which drives the optical axis variation unit;

a displacement detection unit which outputs a signal indicating displacements in the optical axis variation unit;

a displacement velocity calculation unit which calculates a displacement velocity from the output of the displacement detection unit;

a centering drive unit which drives the actuator to move the optical axis to a center position;

a minimum displacement velocity detection unit which detects a minimum value of the displacement velocity during the operation of the centering drive unit; and a centering drive suspension unit that suspends the centering drive unit when the output value from the minimum displacement velocity detection unit is smaller than a prescribed value during the operation of the centering drive unit.

44. A camera comprising:

a photographic lens having an optical axis;

an optical axis variation unit which changes the optical axis of the photographic lens;

an actuator which drives the optical axis variation unit;

a displacement detection unit which outputs a signal indicating displacements in the optical axis variation unit;

a displacement velocity calculation unit which calculates a displacement velocity from the output of the displacement detection unit;

a centering drive unit which drives the actuator to drive the optical axis to a center position;

a minimum displacement velocity detection unit which detects a minimum value of the displacement velocity after a prescribed amount of time has elapsed since the action of the centering drive unit began; and a centering drive suspension unit that suspends the centering drive action in cases where the output value from the minimum displacement velocity detection unit is smaller than a prescribed value during the operation of the centering drive action.

45. A camera comprising:

a photographic lens having an optical axis;

an optical axis variation unit which changes the optical axis of the photographic lens;

an actuator which drives the optical axis variation unit;

a displacement detection unit which outputs a signal indicating displacements in the optical axis variation unit;

a reset drive unit which drives the actuator to drive the optical axis to a reset position at one end of the range of displacement thereof; and a reset drive suspension unit which suspends the action of the reset drive unit when that action has not terminated after a prescribed amount of time has elapsed since the operation of the reset drive unit began.

* * * * *

UNITED STATES PATENT AND TRADEMARK OFFICE
CERTIFICATE OF CORRECTION

PATENT NO.   : 6,332,060 B1
DATED        : December 18, 2001
INVENTOR(S)  : Sueyuki Ohishi et al.

It is certified that error appears in the above-identified patent and that said Letters Patent is hereby corrected as shown below:

<u>Title page,</u>
Inventors, delete "Hidenori MIYAMOTO, Yoshio IMURA and Minoru KATO"

<u>Column 45,</u>
Line 1, "claim 12" should be -- claim 13 --.

Signed and Sealed this

Third Day of September, 2002

*Attest:*

*Attesting Officer*

JAMES E. ROGAN
*Director of the United States Patent and Trademark Office*